US012794765B2

(12) United States Patent
Swartz et al.

(10) Patent No.: US 12,794,765 B2
(45) Date of Patent: Nov. 10, 2026

(54) SYSTEMS AND METHODS FOR REDUCED COMPUTER RESOURCES AND FASTER TRAVERSAL WHEN QUERYING A NETWORK GRAPH DATA STRUCTURE USING A MATRIX IN A COMPUTER-READABLE ARRAY FORMAT

(71) Applicant: Altana Technologies, Inc., Brooklyn, NY (US)

(72) Inventors: Peter Swartz, Brooklyn, NY (US); Ian Cadieu, Stamford, CT (US); Evan Smith, Brooklyn, NY (US)

(73) Assignee: Altana Technologies, Inc.

( * ) Notice: Subject to any disclaimer, the term of this patent is extended or adjusted under 35 U.S.C. 154(b) by 0 days.

(21) Appl. No.: 19/637,245

(22) Filed: Apr. 2, 2026

(65) Prior Publication Data

US 2026/0322682 A1 Oct. 15, 2026

Related U.S. Application Data

(60) Provisional application No. 63/783,102, filed on Apr. 3, 2025.

(51) Int. Cl.
*H04L 41/0677* (2022.01)
*H04L 5/00* (2006.01)
(Continued)

(52) U.S. Cl.
CPC ........ *H04L 41/0677* (2013.01); *H04L 5/0091* (2013.01); *H04L 41/12* (2013.01);
(Continued)

(58) Field of Classification Search
CPC ... H04L 41/0677; H04L 41/22; G06F 16/735; G06F 16/9024
See application file for complete search history.

(56) References Cited

U.S. PATENT DOCUMENTS

| | | | |
|---|---|---|---|
| 9,116,975 | B2 | 8/2015 | Shankar et al. |
| 9,542,440 | B2 | 1/2017 | Wang et al. |

(Continued)

FOREIGN PATENT DOCUMENTS

| | | | |
|---|---|---|---|
| EP | 1 193 625 | A1 | 4/2002 |
| EP | 3 327 991 | A1 | 5/2018 |

(Continued)

OTHER PUBLICATIONS

Anonymous, "Matrix Construction—Brightway documentation," (2025), retrieved from the Internet: URL:https://web.archive.org/web/20250210200755/, XP093404125, docs.brightway.dev/en/latest/content/overview/matrix.html, pp. 1-5.

(Continued)

*Primary Examiner* — Barbara B Anyan
(74) *Attorney, Agent, or Firm* — Foley & Lardner LLP

(57) ABSTRACT

A system may identify a node in a network graph data structure. The system may identify a matrix identifying quantities of inputs and outputs of a network operation for a networked item. The system may identify a plurality of input nodes connected by edge data structures with the node providing inputs for the network operation. For each of the plurality of input nodes, the system may generate a weight for one or more attributes of one or more technologies used by the input node based on the quantities of the inputs provided by the input node for the network operation. The system may execute a model using the weights for the input nodes and the matrix to generate an emission intensity for each input. The system may calculate an emission of the networked item based at least on the emission intensities of the inputs of the plurality of suppliers.

20 Claims, 13 Drawing Sheets

(51) Int. Cl.

| | |
|---|---|
| ***H04L 41/12*** | (2022.01) |
| ***H04L 41/14*** | (2022.01) |
| ***H04L 41/22*** | (2022.01) |
| *G06F 16/735* | (2019.01) |
| *G06F 16/901* | (2019.01) |

(52) U.S. Cl.

CPC .............. *H04L 41/14* (2013.01); *H04L 41/22* (2013.01); *G06F 16/735* (2019.01); *G06F 16/9024* (2019.01)

(56) References Cited

U.S. PATENT DOCUMENTS

| | | | | |
|---|---|---|---|---|
| 10,037,368 | B1 | 7/2018 | Nandyalam et al. | |
| 10,157,220 | B2 | 12/2018 | Mac An Tsaoir et al. | |
| 10,185,742 | B2 | 1/2019 | Geissinger et al. | |
| 10,540,410 | B2 | 1/2020 | Wei et al. | |
| 10,713,310 | B2 | 7/2020 | Wei et al. | |
| 11,238,468 | B1 | 2/2022 | Buist, III | |
| 11,657,090 | B2 | 5/2023 | Markovic et al. | |
| 12,142,140 | B2 * | 11/2024 | Shao | G01C 21/3492 |
| 12,149,441 | B2 | 11/2024 | Zhou et al. | |
| 12,360,992 | B2 | 7/2025 | Sweeney et al. | |
| 2004/0044659 | A1 | 3/2004 | Judd et al. | |
| 2005/0278287 | A1 | 12/2005 | Bao et al. | |
| 2011/0264997 | A1 | 10/2011 | Mukerjee et al. | |
| 2014/0114964 | A1 | 4/2014 | Dong et al. | |
| 2016/0125095 | A1 * | 5/2016 | Xu | G06F 16/9024 707/740 |
| 2018/0032930 | A1 | 2/2018 | Kolb et al. | |
| 2018/0197128 | A1 | 7/2018 | Carstens et al. | |
| 2019/0311065 | A1 | 10/2019 | Bross et al. | |
| 2021/0243782 | A1 * | 8/2021 | Miao | H04L 5/0091 |
| 2022/0215046 | A1 | 7/2022 | Huffner et al. | |
| 2022/0335086 | A1 | 10/2022 | Chen et al. | |
| 2022/0365976 | A1 | 11/2022 | Dudkiewicz et al. | |
| 2023/0011588 | A1 | 1/2023 | Parry et al. | |
| 2024/0290095 | A1 * | 8/2024 | Liu | G06F 16/735 |
| 2025/0373516 | A1 * | 12/2025 | Gupta | H04L 41/22 |

FOREIGN PATENT DOCUMENTS

| | | | |
|---|---|---|---|
| JP | 2005-525659 | A | 8/2005 |
| JP | 2008-130094 | A | 6/2008 |
| JP | 5672386 | B2 | 2/2015 |
| JP | 2016-042373 | A | 3/2016 |
| JP | 2016-173841 | A | 9/2016 |
| JP | 2016-526206 | A | 9/2016 |
| JP | 6001809 | B2 | 10/2016 |
| JP | 2017-037668 | A | 2/2017 |
| JP | 2018-110007 | A | 7/2018 |
| WO | WO-02/23693 | A2 | 3/2002 |
| WO | WO-2010/065418 | A1 | 6/2010 |
| WO | WO-2013/175611 | A1 | 11/2013 |
| WO | WO-2016/091174 | A1 | 6/2016 |
| WO | WO-2021/123742 | A1 | 6/2021 |
| WO | WO-2022/098886 | A1 | 5/2022 |
| WO | WO-2023/225093 | A1 | 11/2023 |

OTHER PUBLICATIONS

Azimov et al., "Context-Free Path Querying by Matrix Multiplication," (2017), arXiv.org, retrieved from the Internet: URL:https://arxiv.org/pdf/1707.01007, XP093403399, DOI: 10.48550/arxiv.1707.01007, pp. 1-9.

PCT International Search Report and Written Opinion dated Jun. 17, 2026, in International Application No. PCT/US2026/022053.

* cited by examiner

376

SYSTEMS AND METHODS FOR REDUCED COMPUTER RESOURCES AND FASTER TRAVERSAL WHEN QUERYING A NETWORK GRAPH DATA STRUCTURE USING A MATRIX IN A COMPUTER-READABLE ARRAY FORMAT

CROSS-REFERENCE TO APPLICATIONS

This application claims the benefit of priority to U.S. Provisional Application No. 63/783,102, filed Apr. 3, 2025, the entirety of which is incorporated by reference herein.

BACKGROUND

Industrial processes may be associated with various types of emissions. For example, emissions may be associated with generating inputs used in the industrial process, transporting the inputs used in the industrial process, performing the industrial process, and/or transporting outputs of the industrial process. These emissions may be difficult to aggregate, especially in cases where inputs of the industrial process are generated by a plurality of different entities.

SUMMARY

In some instances, querying a network graph data structure may present certain technical challenges. As the number of nodes and edges in the network graph data structure increases, recursively traversing the network graph data structure to track relationships between nodes and aggregate attributes can become computationally expensive. For example, each query may require a server to access and/or process large subgraphs, join data from a plurality of network entities, and perform calculations using large datasets. As a result, querying the network graph data structure may result in high latency and high computational resource consumption as the server traverses the network graph data structure. These technical challenges may be emphasized when network graph data structures are queried to calculate emissions values for networked items generated by entities of the network graph data structure, as emissions of the various inputs used to generate the networked items may be considered in addition to entity-generated emissions when generating the networked items.

By using matrices in computer-readable array formats to represent network operations within the network graph data structure, systems and methods described herein may improve querying efficiency with respect to querying network graph data structures. By encoding the quantities of inputs and outputs of each node as a matrix, the system can rapidly access and process relevant data without having to repeatedly traverse or join complex subgraphs of the network graph data structure. For example, the matrices may allow the system to leverage array-oriented operations, which may be faster and more resource-efficient than recursive graph traversal. As a result, the overall latency and processing overhead associated with emissions querying may be reduced.

In an example, conventional systems that query network graph data structures often rely on recursive traversal of nodes and edges to identify upstream and downstream relationships relevant to a given query. As the size and connectivity of the network graph data structure increase, such recursive traversal requires repeated pointer dereferencing, multi-table joins, and evaluation of large subgraphs that are unrelated to the specific network operation being analyzed, resulting in substantial latency and inefficient consumption of processor and memory resources. These inefficiencies are not caused by the complexity of the analytical objective, but by limitations in how the network graph data structure itself is accessed and traversed during query execution. The systems described herein address this technical limitation by introducing a second data structure, a matrix encoded in a computer-readable array format, that pre-encodes network operations and corresponding input-output relationships with pointers (e.g., addresses or values) that point to the locations of the edges or nodes corresponding to the respective network operations. The matrix can be used to constrain and guide access to the network graph data structure by pointing to specific locations within the graph to query (e.g., pointing to specific edges for network operations). By using the matrix to identify, prior to traversal, only those nodes and edges relevant to a particular network operation, the system can reduce recursive graph traversal, minimize unnecessary memory access, and facilitate array-oriented processing that improves query execution efficiency.

At least one aspect relates to a system for reduced computer resources and faster traversal when querying a network graph data structure using a matrix in a computer-readable array format. The system may include a server including a processor and a memory storing instructions. The instructions, when executed by the processor, may cause the server to identify a node corresponding to a location of an entity in the network graph data structure storing a network of nodes and edges between the network of nodes, the network graph data structure digitally representing types of relationships between locations of entities represented by the network of nodes and networked items, the network of nodes including pairs of nodes each including a source node connected with a destination node by an edge data structure indicating a particular networked item transferred from the source node to the destination node, identify a matrix encoded in a computer-readable array format identifying a plurality of network operations between the location of the entity and one or more other locations of entities represented in the network graph data structure, data for each of the plurality of network operations in the matrix identifying quantities of inputs and outputs of a network operation for a networked item, identify, using the matrix encoded in the computer-readable array format, a plurality of input nodes connected by edge data structures with the node corresponding to the location of the entity and providing inputs for the network operation for the networked item, for each of the plurality of input nodes, generate a weight for each of one or more attributes of one or more technologies used by a supplier of the input node used to generate the networked item based on the quantities of the inputs provided by the supplier for the network operation, execute a model using as input the weights for the plurality of input nodes and the matrix to generate an emission intensity for each input of each supplier of a plurality of suppliers used to generate the networked item, calculate an emission of the networked item based at least on the emission intensities of the inputs of the plurality of suppliers, and responsive to the emission of the networked item at the location of the entity exceeding a threshold, write a flag to an input node of the plurality of input nodes of the network graph data structure based on a relative aggregate emission of inputs provided by a supplier of the input node to the location of the entity.

In some implementations, the server is further configured to store attributes including geographic coordinates, production type, technology identifiers, network operation records, and input-output relationships in association with corresponding nodes by edge data structures connecting the attributes with the corresponding nodes, and query the edge data structures to retrieve supplier attributes of the plurality of input nodes to use as input into the model to generate the emission intensity.

In some implementations, the server is further configured to retrieve entity identifiers for each of the plurality of input nodes from attributes written into the plurality of input nodes, query an external database using the entity identifiers to retrieve a technology type identifier for each of the plurality of input nodes, and use the retrieved technology type identifiers as input into the model with the weights and the matrix to generate the emission intensity for each input of each supplier of the plurality of suppliers.

In some implementations, the server is further configured to retrieve entity identifiers for each of the plurality of input nodes from attributes written into the plurality of input nodes; query an external database using the entity identifiers to retrieve an entity emission intensity value for each of the plurality of input nodes, and use the retrieved entity emission intensity values as input into the model with the weights and the matrix to generate the emission intensity for each input of each supplier of the plurality of suppliers.

In some implementations, the server is further configured to identify, for an input node of the plurality of input nodes containing empty data fields regarding technologies used to generate networked items, and responsive to an identification of the empty data fields, match observed inputs and outputs of edges connecting the input node to another node in the network graph data structure in a reference process-technology graph to infer the technologies used at a location of the input node and associate the inferred technologies with the input node by writing the inferred technologies into the empty data fields.

In some implementations, the server is further configured to train a machine learning model using facility attributes and weighted supplier emissions as features, and using measured emission intensities from an external database as labels, and execute the trained model to predict emission intensity for an input node lacking direct measured emissions data.

In some implementations, the server is further configured to identify one or more input nodes in the network graph data structure that store technology characteristic data for the entity of each of the one or more input nodes; match the one or more input nodes to identifications of corresponding entities in a database stored on a remote computing device, the database storing real-time emission data for individual entities, correlate technology characteristic data with real-time emission data based on the matches between the one or more input nodes of the network graph data structure and the identifications of the corresponding entities in the database, and train a computer model to generate emission values for entities based on the correlated technology characteristic data.

In some implementations, the server is further configured to determine, for an unobserved input to an input node, a most granular geographic region for which a corresponding technology and emissions factor is available in an external database, and assign the unobserved input an emission intensity based on an average domestic grid-level emissions of the determined region.

In some implementations, the server is further configured to compute transfer distances between pairs of source and destination nodes using geospatial coordinates and recorded network operation modes, and determine transfer-related emissions by multiplying the computed transfer distances by mode-specific emissions factors and network operation weight obtained from network operation records.

In some implementations, the server is further configured to identify multiple entities that provide a single input to the entity using edges between nodes representing the multiple entities and the entity, determine quantities of input to the node based on data stored in data structures of the edges, weight technological characteristics of the node based on the quantities of the inputs corresponding to the technological characteristics of the entity, encoding network operations performed between the multiple entities and the entity into a technology matrix according to the weights of the technological characteristics corresponding to the inputs of the network operations, generate an average embedded emission intensity for the multiple entities by using a function on the technology matrix, and provide the average embedded emission intensity into the model with the weights and the matrix to generate the emission intensity for each input of each supplier of the plurality of suppliers. In some implementations, the server is further configured to, responsive to the emission of the networked item at the location of the entity exceeding the threshold, write a flag to an output node of the networked item connected with the node.

At least one aspect relates to a method. The method may include identifying a node corresponding to a location of an entity in a network graph data structure. The method may include identifying a matrix identifying a network operation between the location of the entity and one or more other locations of entities represented in the network graph data structure, data for the network operation in the matrix identifying quantities of inputs and outputs of the network operation for a networked item. The method may include identifying, using the matrix encoded in the computer-readable array format, a plurality of input nodes connected by edge data structures with the node corresponding to the location of the entity and providing inputs for the network operation for the networked item. In some implementations, the method may include, for each of the plurality of input nodes, generating a weight for each of one or more attributes of one or more technologies used by a supplier of the input node used to generate the networked item based on the quantities of the inputs provided by the supplier for the network operation. In some implementations, the method may include executing a model using as input the weights for the plurality of input nodes and the matrix to generate an emission intensity for each input of each supplier of a plurality of suppliers used to generate the networked item. The method may include calculating an emission of the networked item based at least on the emission intensities of the inputs of the plurality of suppliers.

In some implementations, the method further includes storing attributes including geographic coordinates, production type, technology identifiers, network operation records, and input-output relationships in association with corresponding nodes by edge data structures connecting the attributes with the corresponding nodes, and querying the edge data structures to retrieve supplier attributes of the plurality of input nodes to use as input into the model to generate the emission intensity.

In some implementations, the method further includes retrieving entity identifiers for each of the plurality of input nodes from attributes written into the plurality of input nodes, querying an external database using the entity identifiers to retrieve a technology type identifier for each of the plurality of input nodes, and using the retrieved technology type identifiers as input into the model with the weights and the matrix to generate the emission intensity for each input of each supplier of the plurality of suppliers.

In some implementations, the method further includes retrieving entity identifiers for each of the plurality of input nodes from attributes written into the plurality of input nodes, querying an external database using the entity identifiers to retrieve an entity emission intensity value for each of the plurality of input nodes, and using the retrieved entity emission intensity values as input into the model with the weights and the matrix to generate the emission intensity for each input of each supplier of the plurality of suppliers.

In some implementations, the method further includes identifying, for an input node of the plurality of input nodes containing empty data fields regarding technologies used to generate networked items, responsive to the identifying the empty data fields, matching observed inputs and outputs of edges connecting the input node to another node in the network graph data structure in a reference process-technology graph to infer the technologies used at a location of the input node and associating the inferred technologies with the input node by writing the inferred technologies into the empty data fields.

In some implementations, the method further includes training a machine learning model using facility attributes and weighted supplier emissions as features, and using measured emission intensities from an external database as labels, and executing the trained model to predict emission intensity for an input node lacking direct measured emissions data.

In some implementations, the method further includes identifying one or more input nodes in the network graph data structure that store technology characteristic data for the entity of each of the one or more input nodes, matching the one or more input nodes to identifications of corresponding entities in a database stored on a remote computing device, the database storing real-time emission data for individual entities, correlating technology characteristic data with real-time emission data based on the matches between the one or more input nodes of the network graph data structure and the identifications of the corresponding entities in the database, and training a computer model to generate emission values for entities based on the correlated technology characteristic data.

In some implementations, the method further includes determining, for an unobserved input to an input node, a most granular geographic region for which a corresponding technology and emissions factor is available in an external database, and assigning the unobserved input an emission intensity based on an average domestic grid-level emissions of the determined region.

At least one aspect relates to one or more non-transitory computer-readable media storing instructions thereon that, when executed by one or more processors, cause the one or more processors to identify a node corresponding to a location of an entity in a network graph data structure, identify a matrix identifying a network operation between the location of the entity and one or more other locations of entities represented in the network graph data structure, data for the network operation in the matrix identifying quantities of inputs and outputs of the network operation for a networked item, identify a plurality of input nodes connected by edge data structures with the node corresponding to the location of the entity and providing inputs for the network operation for the networked item, for each of the plurality of input nodes, generate a weight for each of one or more attributes of one or more technologies used by a supplier of the input node used to generate the networked item based on the quantities of the inputs provided by the supplier for the network operation, execute a model using as input the weights for the plurality of input nodes and the matrix to generate an emission intensity for each input of each supplier of a plurality of suppliers used to generate the networked item, and calculate an emission of the networked item based at least on the emission intensities of the inputs of the plurality of suppliers.

In some implementations, the instructions further cause the one or more processors to, responsive to the emission of the networked item at the location of the entity exceeding a threshold, write a flag to an input node of the plurality of input nodes of the network graph data structure based on a relative aggregate emission of inputs provided by a supplier of the input node to the location of the entity.

These and other aspects and implementations are discussed in detail below. The foregoing information and the following detailed description include illustrative examples of various aspects and implementations and provide an overview or framework for understanding the nature and character of the claimed aspects and implementations. The drawings provide illustration and a further understanding of the various aspects and implementations and are incorporated in and constitute a part of this specification. Aspects can be combined, and it will be readily appreciated that features described in the context of one aspect of the invention can be combined with other aspects. Aspects can be implemented in any convenient form, for example, by appropriate computer programs, which may be carried on appropriate carrier media (computer readable media), which may be tangible carrier media (e.g., disks) or intangible carrier media (e.g., communications signals). Aspects may also be implemented using any suitable apparatus, which may take the form of programmable computers running computer programs arranged to implement the aspect. As used in the specification and in the claims, the singular form of 'a,' 'an,' and 'the' include plural referents unless the context clearly dictates otherwise.

BRIEF DESCRIPTION OF THE DRAWINGS

Objects, aspects, features, and advantages of embodiments disclosed herein will become more fully apparent from the following detailed description, the appended claims, and the accompanying drawing figures in which like reference numerals identify similar or identical elements. Reference numerals that are introduced in the specification in association with a drawing figure may be repeated in one or more subsequent figures without additional description in the specification in order to provide context for other features, and not every element may be labeled in every figure. The drawing figures are not necessarily to scale, emphasis instead being placed upon illustrating embodiments, principles, and concepts. The drawings are not intended to limit the scope of the claims included herewith.

DETAILED DESCRIPTION

For purposes of reading the description of the various embodiments below, the following descriptions of the sections of the specification and their respective contents can be helpful:

Section A describes a computing environment and network environment that can be useful for practicing embodiments described herein.

Section B describes an artificial intelligence environment that can be useful for practicing embodiments described herein.

Section C describes a computing device for network graph data structure-based networking in accordance with embodiments described herein.

Section D describes implementing the systems and methods described herein for efficient network graph data structure querying in accordance with embodiments described herein.

A. Computing and Network Environment

Prior to discussing the specifics of embodiments of dynamic management of a network graph data structure for value chain management, it may be helpful to discuss the computing environments in which such embodiments may be deployed.

Figure 1A:
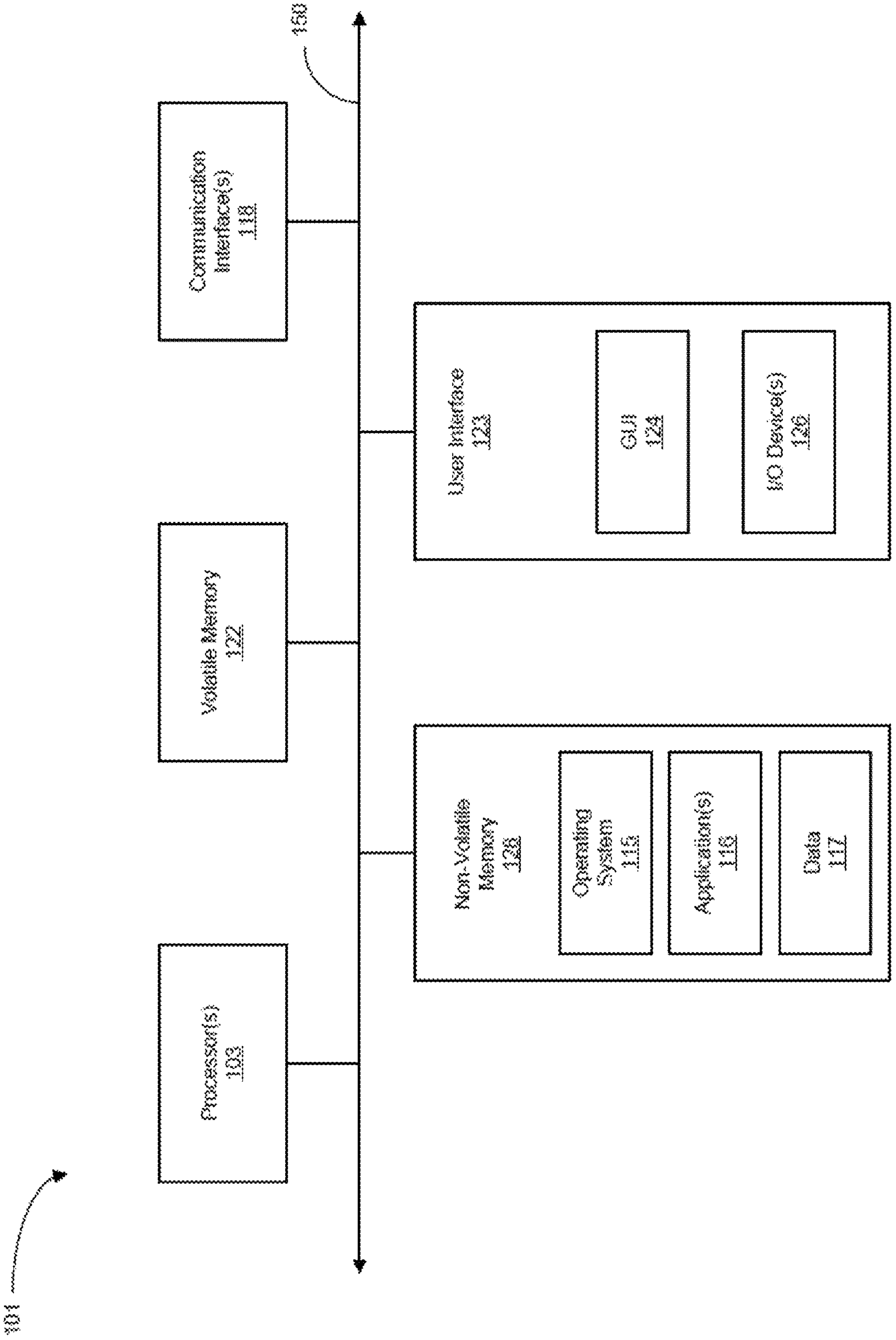
FIG. 1A illustrates an example block diagram depicting a computing device, in accordance with one or more embodiments.

As shown in FIG. 1A, computer 101 may include one or more processors 103, volatile memory 122 (e.g., random access memory (RAM)), non-volatile memory 128 (e.g., one or more hard disk drives (HDDs) or other magnetic or optical storage media, one or more solid state drives (SSDs) such as a flash drive or other solid state storage media, one or more hybrid magnetic and solid state drives, and/or one or more virtual storage volumes, such as a cloud storage, or a combination of such physical storage volumes and virtual storage volumes or arrays thereof), user interface (UI) 123, one or more communications interfaces 118, and communication bus 150. User interface 123 may include graphical user interface (GUI) 124 (e.g., a touchscreen, a display, etc.) and one or more input/output (I/O) devices 126 (e.g., a mouse, a keyboard, a microphone, one or more speakers, one or more cameras, one or more biometric scanners, one or more environmental sensors, one or more accelerometers, etc.). Non-volatile memory 128 stores operating system 115, one or more applications 116, and data 117 such that, for example, computer instructions of operating system 115 and/or applications 116 are executed by processor(s) 103 out of volatile memory 122. In some embodiments, volatile memory 122 may include one or more types of RAM and/or a cache memory that may offer a faster response time than a main memory. Data may be entered using an input device of GUI 124 or received from I/O device(s) 126. Various elements of computer 101 may communicate via one or more communication buses, shown as communication bus 150.

Computer 101 as shown in FIG. 1A is shown merely as an example, as clients, servers, intermediary and other networking devices and may be implemented by any computing or processing environment and with any type of machine or set of machines that may have suitable hardware and/or software capable of operating as described herein. Processor(s) 103 may be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations may be hard coded into the circuitry or soft coded by way of instructions held in a memory device and executed by the circuitry. A "processor" may perform the function, operation, or sequence of operations using digital values and/or using analog signals. In some embodiments, the "processor" can be embodied in one or more application specific integrated circuits (ASICs), microprocessors, digital signal processors (DSPs), graphics processing units (GPUs), microcontrollers, field programmable gate arrays (FPGAs), programmable logic arrays (PLAs), multi-core processors, or general-purpose computers with associated memory. The "processor" may be analog, digital or mixed-signal. In some embodiments, the "processor" may be one or more physical processors or one or more "virtual" (e.g., remotely located or "cloud") processors. A processor including multiple processor cores and/or multiple processors multiple processors may provide functionality for parallel, simultaneous execution of instructions or for parallel, simultaneous execution of one instruction on more than one piece of data.

Communications interfaces 118 may include one or more interfaces to enable computer 101 to access a computer network such as a Local Area Network (LAN), a Wide Area Network (WAN), a Personal Area Network (PAN), or the Internet through a variety of wired and/or wireless or cellular connections.

In described embodiments, the computing device 101 may execute an application on behalf of a user of a client computing device. For example, the computing device 101 may execute a virtual machine, which provides an execution session within which applications execute on behalf of a user or a client computing device, such as a hosted desktop session. The computing device 101 may also execute a terminal services session to provide a hosted desktop environment. The computing device 101 may provide access to a computing environment including one or more of: one or more applications, one or more desktop applications, and one or more desktop sessions in which one or more applications may execute.

Figure 1B:
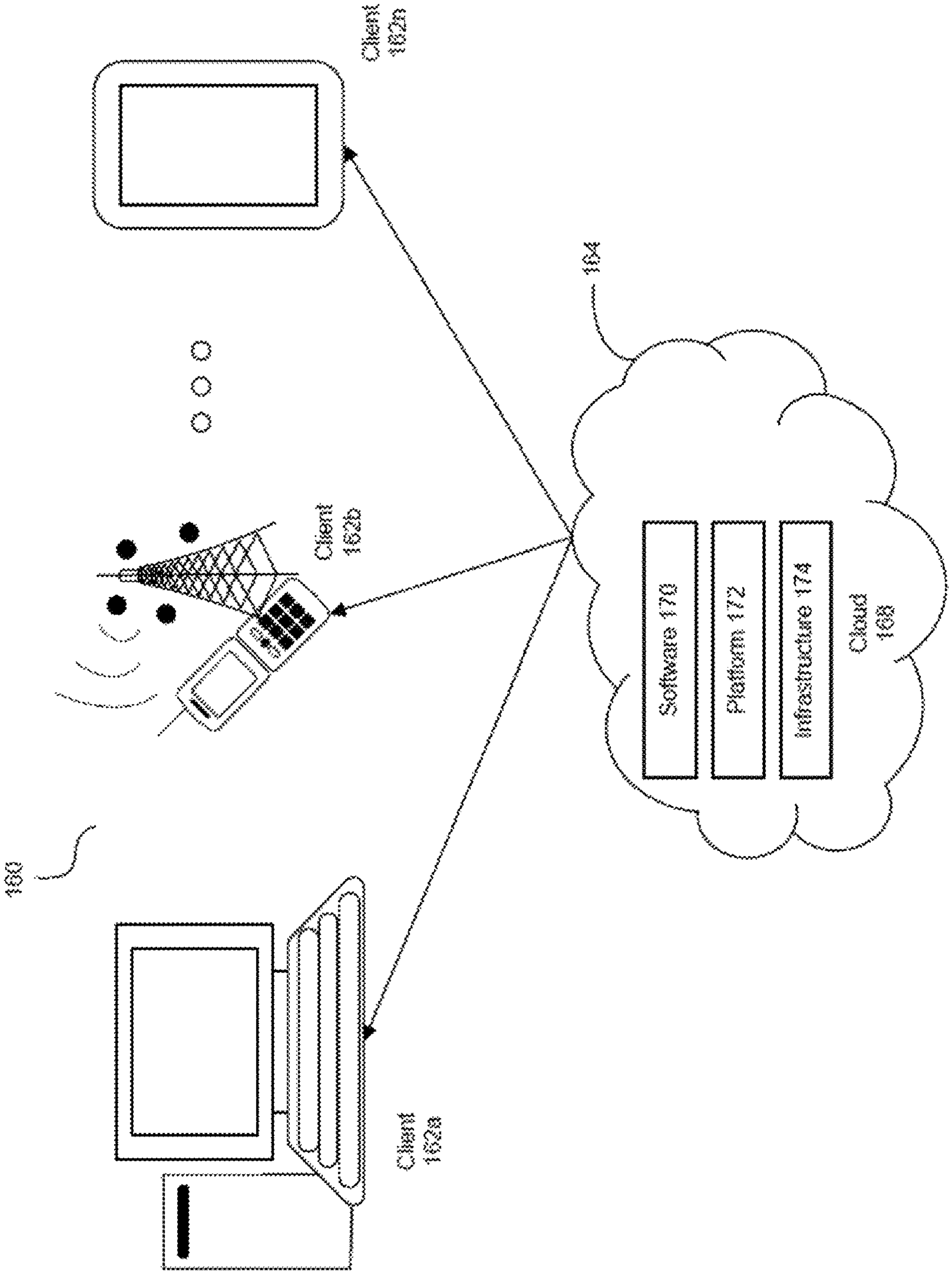
FIG. 1B illustrates an example block diagram depicting a computing environment comprising a client device in communication with cloud service providers, in accordance with one or more embodiments.

Referring to FIG. 1B, a computing environment 160 is depicted. Computing environment 160 may generally be considered implemented as a cloud computing environment, an on-premises ("on-prem") computing environment, or a hybrid computing environment including one or more on-prem computing environments and one or more cloud computing environments. When implemented as a cloud computing environment, also referred as a cloud environment, cloud computing or cloud network, computing environment 160 can provide the delivery of shared services (e.g., computer services) and shared resources (e.g., computer resources) to multiple users. For example, the computing environment 160 can include an environment or system for providing or delivering access to a plurality of shared services and resources to a plurality of users through the internet. The shared resources and services can include, but not limited to, networks, network bandwidth, servers, processing, memory, storage, applications, virtual machines, databases, software, hardware, analytics, and intelligence.

In embodiments, the computing environment 160 may provide client 162 with one or more resources provided by a network environment. The computing environment 162 may include one or more clients 162*a*-162*n*, in communication with a cloud 168 over one or more networks 164. Clients 162 may include, e.g., thick clients, thin clients, and zero clients. The cloud 108 may include back end platforms, e.g., servers 106, storage, server farms or data centers. The clients 162 can be the same as or substantially similar to computer 101 of FIG. 1A.

The users or clients 162 can correspond to a single organization or multiple organizations. For example, the computing environment 160 can include a private cloud serving a single organization (e.g., enterprise cloud). The computing environment 160 can include a community cloud or public cloud serving multiple organizations. In embodiments, the computing environment 160 can include a hybrid cloud that is a combination of a public cloud and a private cloud. For example, the cloud 108 may be public, private, or hybrid. Public clouds 108 may include public servers that are maintained by third parties to the clients 162 or the owners of the clients 162. The servers may be located off-site in remote geographical locations as disclosed above or otherwise. Public clouds 168 may be connected to the servers over a public network 164. Private clouds 168 may include private servers that are physically maintained by clients 162 or owners of clients 162. Private clouds 168 may be connected to the servers over a private network 164. Hybrid clouds 168 may include both the private and public networks 164 and servers.

The cloud 168 may include back end platforms, e.g., servers, storage, server farms or data centers. For example, the cloud 168 can include or correspond to a server or system remote from one or more clients 162 to provide third party control over a pool of shared services and resources. The computing environment 160 can provide resource pooling to serve multiple users via clients 162 through a multi-tenant environment or multi-tenant model with different physical and virtual resources dynamically assigned and reassigned responsive to different demands within the respective environment. The multi-tenant environment can include a system or architecture that can provide a single instance of software, an application or a software application to serve multiple users. In embodiments, the computing environment 160 can provide on-demand self-service to unilaterally provision computing capabilities (e.g., server time, network storage) across a network for multiple clients 162. The computing environment 160 can provide an elasticity to dynamically scale out or scale in responsive to different demands from one or more clients 162. In some embodiments, the computing environment 160 can include or provide monitoring services to monitor, control and/or generate reports corresponding to the provided shared services and resources.

In some embodiments, the computing environment 160 can include and provide different types of cloud computing services. For example, the computing environment 160 can include Infrastructure as a service (IaaS). The computing environment 160 can include Platform as a service (PaaS). The computing environment 160 can include serverless computing. The computing environment 160 can include Software as a service (SaaS). For example, the cloud 168 may also include a cloud based delivery, e.g., Software as a Service (SaaS) 170, Platform as a Service (PaaS) 172, and Infrastructure as a Service (IaaS) 174. IaaS may refer to a user renting the use of infrastructure resources that are needed during a specified time period. IaaS providers may offer storage, networking, servers or virtualization resources from large pools, allowing the users to quickly scale up by accessing more resources as needed. Examples of IaaS include AMAZON WEB SERVICES provided by Amazon.com, Inc., of Seattle, Washington, RACKSPACE CLOUD provided by Rackspace US, Inc., of San Antonio, Texas, Google Compute Engine provided by Google Inc. of Mountain View, California, or RIGHTSCALE provided by RightScale, Inc., of Santa Barbara, California. PaaS providers may offer functionality provided by IaaS, including, e.g., storage, networking, servers or virtualization, as well as additional resources such as, e.g., the operating system, middleware, or runtime resources. Examples of PaaS include WINDOWS AZURE provided by Microsoft Corporation of Redmond, Washington, Google App Engine provided by Google Inc., and HEROKU provided by Heroku, Inc. of San Francisco, California. SaaS providers may offer the resources that PaaS provides, including storage, networking, servers, virtualization, operating system, middleware, or runtime resources. In some embodiments, SaaS providers may offer additional resources including, e.g., data and application resources. Examples of SaaS include GOOGLE APPS provided by Google Inc., SALESFORCE provided by Salesforce.com Inc. of San Francisco, California, or OFFICE 365 provided by Microsoft Corporation. Examples of SaaS may also include data storage providers, e.g., DROPBOX provided by Dropbox, Inc. of San Francisco, California, Microsoft SKYDRIVE provided by Microsoft Corporation, Google Drive provided by Google Inc., or Apple ICLOUD provided by Apple Inc. of Cupertino, California.

Clients 162 may access IaaS resources with one or more IaaS standards, including, e.g., Amazon Elastic Compute Cloud (EC2), Open Cloud Computing Interface (OCCI), Cloud Infrastructure Management Interface (CIMI), or OpenStack standards. Some IaaS standards may allow clients access to resources over HTTP, and may use Representational State Transfer (REST) protocol or Simple Object Access Protocol (SOAP). Clients 162 may access PaaS resources with different PaaS interfaces. Some PaaS interfaces use HTTP packages, standard Java APIs, JavaMail API, Java Data Objects (JDO), Java Persistence API (JPA), Python APIs, web integration APIs for different programming languages including, e.g., Rack for Ruby, WSGI for Python, or PSGI for Perl, or other APIs that may be built on REST, HTTP, XML, or other protocols. Clients 162 may access SaaS resources through the use of web-based user interfaces, provided by a web browser (e.g., GOOGLE CHROME, Microsoft INTERNET EXPLORER, or Mozilla Firefox provided by Mozilla Foundation of Mountain View, California). Clients 162 may also access SaaS resources through smartphone or tablet applications, including, e.g., Salesforce Sales Cloud, or Google Drive app. Clients 162 may also access SaaS resources through the client operating system, including, e.g., Windows file system for DROPBOX.

In some embodiments, access to IaaS, PaaS, or SaaS resources may be authenticated. For example, a server or authentication server may authenticate a user via security certificates, HTTPS, or API keys. API keys may include various encryption standards such as, e.g., Advanced Encryption Standard (AES). Data resources may be sent over Transport Layer Security (TLS) or Secure Sockets Layer (SSL).

B. Artificial Intelligence Environment

Figure 2A:
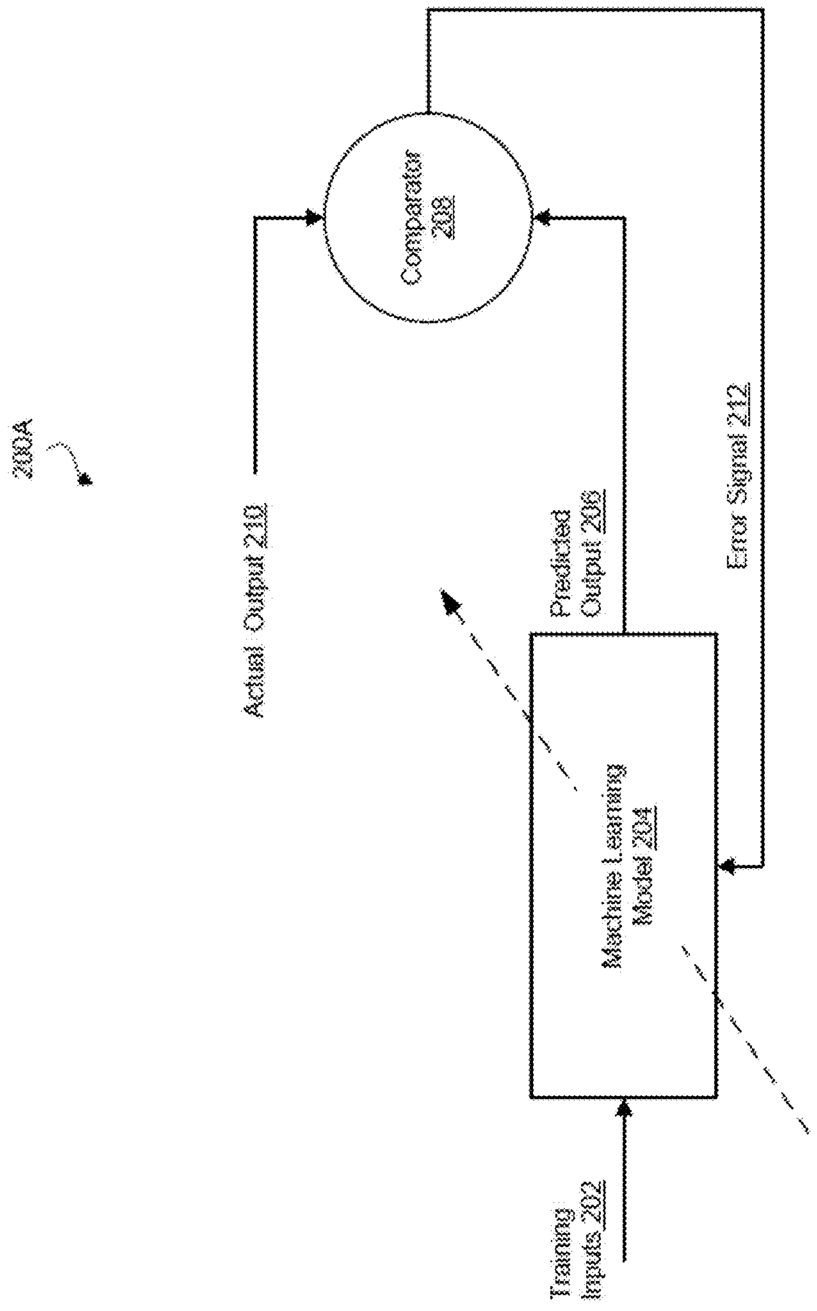
FIG. 2A illustrates an example block diagram depicting a system using supervised learning, in accordance with one or more embodiments.

Referring to FIG. 2A, an embodiment of an artificial intelligence environment 200A is depicted. The artificial intelligence environment 200A may incorporate various machine learning models to process data, identify patterns, and generate predictions or decisions. By way of example, machine learning models can comprise supervised learning models, clustering models, neural network models, deep learning models, reinforcement learning models, unsupervised models, decision trees, support-vector machines, Bayesian networks, Gaussian processes, genetic algorithms models, generative models, image and text processing models, video processing models, any other models that can be used by one or more machine learning algorithms, any other models that can learn from data (e.g., training data) to perform tasks without explicit instructions, or various combinations thereof. They can also involve combinations of the above and agentic systems that leverage models and underlying data. The neural network models can comprise, for example and without limitation, artificial neural networks (ANNs), deep neural networks (DNNs), deep belief networks (DBNs), one or more language models, large language models (LLMs), attention-based neural networks, transformer-based neural networks, generative pretrained transformer (GPT) models, bidirectional encoder representations from transformers (BERT) models, encoder/decoder models, sequence to sequence models, autoencoder models, generative adversarial networks (GANs), convolutional neural networks (CNNs), recurrent neural networks (RNNs), diffusion models (e.g., denoising diffusion probabilistic models (DDPMs)), any other models that can learn patterns and make predictions or decisions, or various combinations thereof.

The machine learning models can be configured, learned, or trained using various learning or training operations, such as unsupervised learning, weakly supervised learning, semi-supervised learning, supervised learning, or any other learning or training operations that can learn from data (e.g., training data) and generalize to unseen data, or various combinations thereof. For example, parameters of nodes of a neural network model, such as weights, biases, and/or thresholds, can be configured, learned, or trained using various learning or training operations, such as unsupervised learning, weakly supervised learning, semi-supervised learning, or supervised learning. A machine learning model can be configured using training data from various domain-agnostic and/or domain-specific data sources. The training data can include a plurality of training data elements (e.g., training data instances). Each training data element can be arranged in structured or unstructured formats; for example, the training data element can include an example output mapped to an example input. The training data can include data that is not separated into input and output subsets (e.g., for configuring the machine learning model to perform clustering, classification, or other unsupervised machine learning operations). The training data can include data describing network structure, such as a supply chain network, and the greater network situation of a given observation. The training data can include human-labeled information, including but not limited to feedback regarding outputs of the machine learning model, which can allow the machine learning model to generate more human-like outputs.

Referring back to FIG. 2A, a block diagram of an example system using supervised learning is shown. Supervised learning is a method of training a machine learning model given input-output pairs. An input-output pair is an input with an associated known output (e.g., an expected output).

Machine learning model 204 may be trained on known input-output pairs such that the machine learning model 204 can learn how to predict known outputs given known inputs. Once the machine learning model 204 has learned how to predict known input-output pairs, the machine learning model 204 can operate on unknown inputs to predict an output.

The machine learning model 204 may be trained based on general data and/or granular data (e.g., data based on a specific user 132) such that the machine learning model 204 may be trained specific to a particular user 132.

Training inputs 202 and actual outputs 210 may be provided to the machine learning model 204. Training inputs 202 may include features such as numerical data, categorical variables, text, images, audio signals, and the like.

The inputs 202 and actual outputs 210 may be received from various data repositories. For example, a data repository may contain labeled datasets with example data points and their corresponding correct outputs. The data repository may also contain data associated with specific users or general populations. Thus, the machine learning model 204 may be trained to predict outcomes based on the training inputs 202 and actual outputs 210 used to train the machine learning model 204.

The example system may include one or more machine learning models 204. In an embodiment, a first machine learning model 204 may be trained to predict data using a classification or regression technique. For example, the first machine learning model 204 may use the training inputs 202 to predict outputs 206 by applying the current state of the first machine learning model 204 to the training inputs 202. The comparator 208 may compare the predicted outputs 206 to actual outputs 210 to determine an amount of error or differences. For example, the predicted output 206 may be compared to the actual output 210 to calculate a loss function or error metric.

In other embodiments, a second machine learning model 204 may be trained to make one or more recommendations to the user 132 based on the predicted output from the first machine learning model 204. For example, the second machine learning model 204 may use the training inputs 202 and the predicted outputs from the first machine learning model 204 as its own input to predict outputs 206 in the form of personalized recommendations by applying the current state of the second machine learning model 204 to the training inputs 202. The comparator 208 may compare the predicted outputs 206 (e.g., the recommended actions or networked items) to actual outputs 210 (e.g., user choices or feedback on previous recommendations to determine an amount of error or differences.

The actual outputs 210 may be determined based on historic data of recommendations made to the user 132 and the resulting outcomes in the supply chain. In an illustrative non-limiting example, the machine learning model 204 may be continuously trained to improve its quality and accuracy in predicting and improving supply chain operations. The machine learning model 204 can take into account various inputs such as forecasted demand, inventory data, customer preferences, and distributor preferences to model, recommend, and execute operations. The actual outputs 210 may then be determined by measuring the real-world outcomes after implementing these recommendations, such as the resulting stockout rate, inventory carrying costs, and overall supply chain efficiency.

In some embodiments, a single machine learning model 204 may be trained to make one or more recommendations to the user 132 based on current user 132 data received from enterprise resources 128. That is, a single machine learning model may be trained using the training inputs 202, which include historical data and current user data, to predict outputs 206 in the form of personalized recommendations by applying the current state of the machine learning model 204 to the training inputs 202. The comparator 208 may compare the predicted outputs 206 to actual outputs 210 to determine an amount of error or differences. The actual outputs 210 may be determined based on historic data associated with the recommendation to the user 132 and their subsequent actions or outcomes. The machine learning model 204 may use the data to learn patterns and make increasingly accurate recommendations over time. For instance, if the machine learning model 204 recommends ordering 1000 units of a product and a user 132 follows the recommendation, the actual output 210 may include data on whether the quantity was sufficient, excessive, or inadequate based on subsequent demand and inventory levels. This feedback loop can allow the machine learning model 204 to continuously refine its predictions and adapt to changing conditions and user preferences in the supply chain ecosystem.

During training, the error (represented by error signal 212) determined by the comparator 208 may be used to adjust the weights in the machine learning model 204 such that the machine learning model 204 changes (or learns) over time. The machine learning model 204 may be trained using a backpropagation algorithm, for instance. The backpropagation algorithm operates by propagating the error signal 212. The error signal 212 may be calculated each iteration (e.g., each pair of training inputs 202 and associated actual outputs 210), batch and/or epoch, and propagated through the algorithmic weights in the machine learning model 204 such that the algorithmic weights adapt based on the amount of error. The error is minimized using a loss function. Non-limiting examples of loss functions may include the square error function, the root mean square error function, and/or the cross entropy error function.

The weighting coefficients of the machine learning model 204 may be tuned to reduce the amount of error, thereby minimizing the differences between (or otherwise converging) the predicted output 206 and the actual output 210. The machine learning model 204 may be trained until the error determined at the comparator 208 is within a certain threshold (or a threshold number of batches, epochs, or iterations have been reached). The trained machine learning model 204 and associated weighting coefficients may subsequently be stored in memory 116 or other data repository (e.g., a database) such that the machine learning model 204 may be employed on unknown data (e.g., not training inputs 202). Once trained and validated, the machine learning model 204 may be employed during a testing (or an inference) phase. During testing, the machine learning model 204 may ingest unknown data to predict future data (e.g., future demand, inventory levels, supplier performance, delivery times, and the like).

Figure 2B:
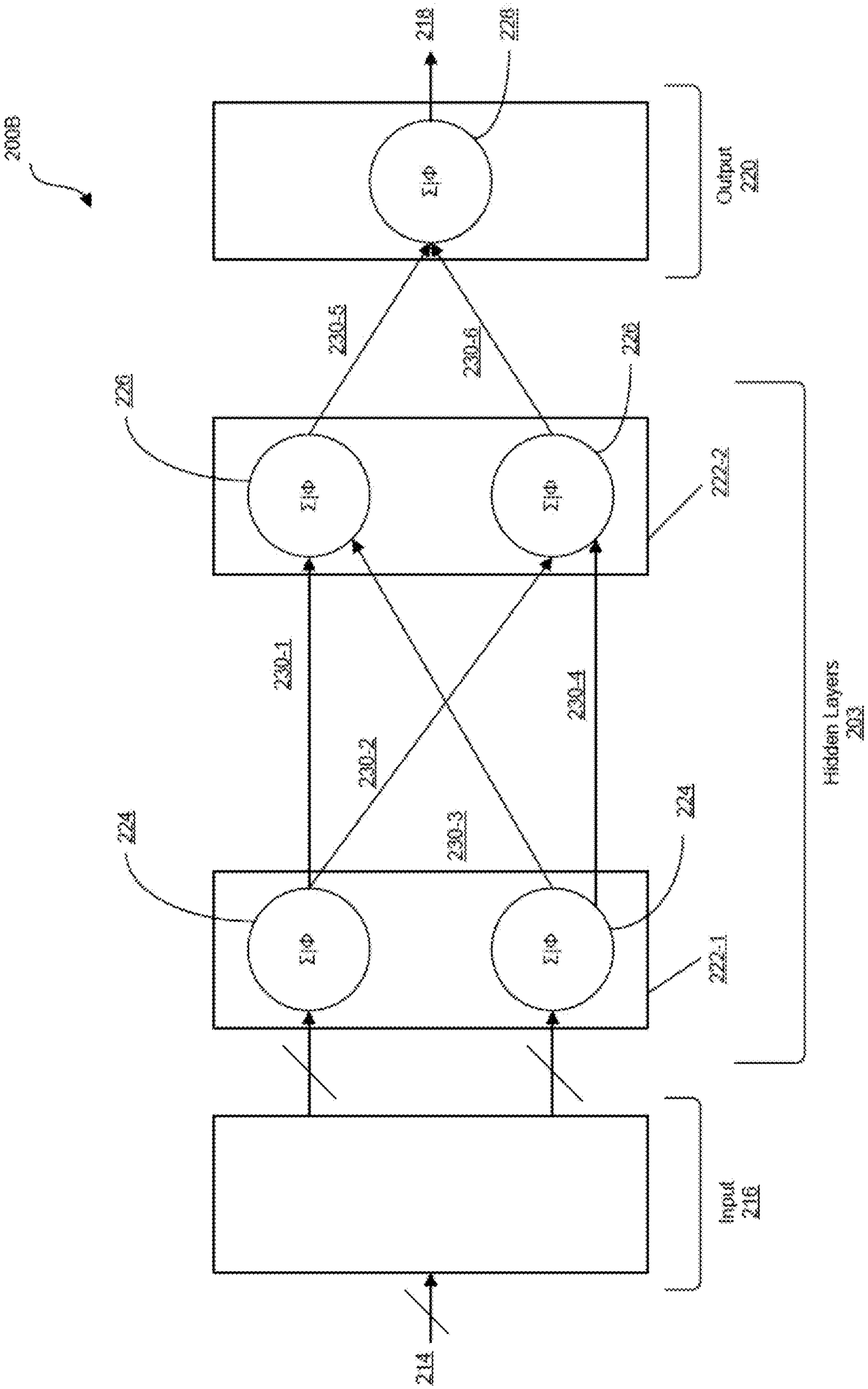
FIG. 2B illustrates an example block diagram depicting a simplified neural network model, in accordance with one or more embodiments.

Referring to FIG. 2B, a block diagram of a simplified neural network model 200B is shown. The neural network model 200B is only an example architecture. The neural network 200B can be any type of neural network, such as a feedforward neural network, a recurrent neural network, a convolutional neural network, a long short-term memory neural network, etc. The neural network model 200B may include a stack of distinct layers (vertically oriented) that transform a variable number of inputs 214 being ingested by an input layer 216 into an output 218 at the output layer 220.

The neural network model 200B may include a number of hidden layers 222 between the input layer 216 and output layer 220. Each hidden layer has a respective number of nodes (224, 226, and 228). In the neural network model 200B, the first hidden layer 222-1 has nodes 224, and the second hidden layer 222-2 has nodes 226. The nodes 224 and 226 perform a particular computation and are interconnected to the nodes of adjacent layers (e.g., nodes 224 in the first hidden layer 222-1 are connected to nodes 226 in a second hidden layer 222-2, and nodes 226 in the second hidden layer 222-2 are connected to nodes 228 in the output layer 220). Each of the nodes (224, 226, and 228) sum up the values from adjacent nodes and apply an activation function, allowing the neural network model 200B to detect nonlinear patterns in the inputs 214. Each of the nodes (224, 226, and 228) are interconnected by weights 230-1, 230-2, 230-3, 230-4, 230-5, 230-6 (collectively referred to as weights 230). Weights 230 are tuned during training to adjust the strength of the node. The adjustment of the strength of the node facilitates the neural network's ability to predict an accurate output 218.

In some embodiments, the output 218 may be one or more numbers. For example, output 218 may be a vector of real numbers subsequently classified by any classifier. In one example, the real numbers may be input into a softmax classifier. A softmax classifier uses a softmax function, or a normalized exponential function, to transform an input of real numbers into a normalized probability distribution over predicted output classes. For example, the softmax classifier may indicate the probability of the output being in class A, B, C, etc. As such, the softmax classifier may be employed because of the classifier's ability to classify various classes. Other classifiers may be used to make other classifications. For example, the sigmoid function makes binary determinations about the classification of one class (i.e., the output may be classified using label A or the output may not be classified using label A).

C. Computing device for Node Transportation Networking

Figure 3A:
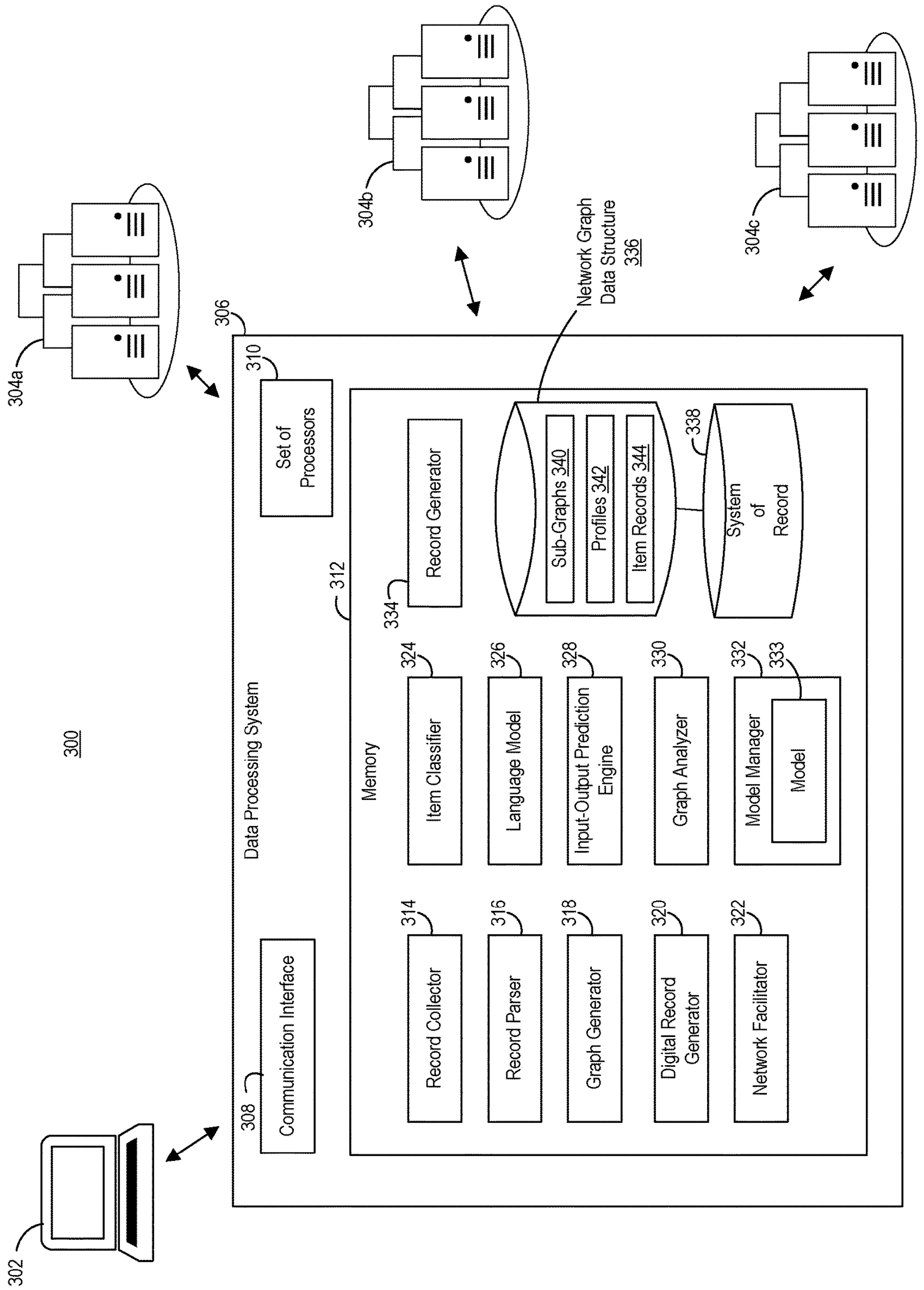
FIG. 3A is an illustration of an example system for network graph data structure-based transportation networking, in accordance with an implementation.

FIG. 3A is an illustration of an example system 300 for network graph data structure-based transportation networking, in accordance with an implementation. In brief overview, the example system 300 can include a client device 302, computing devices 304*a*-304*c* (individually, computing device 304, and together, computing devices 304), and a data processing system 306. The system 300 can include more or fewer components than illustrated in FIG. 3A, depending on the implementation. Each of the computing devices 304 can be configured to store various types of data and perform various types of operations discussed in this disclosure. The data processing system 306 can execute a language processing model (e.g., a large language model) to receive and/or process contextual information regarding database transactions or other communications from a user (e.g., a user accessing the client device 302) of the data processing system 306 and/or data received from the computing devices 304. The data processing system 306 can transmit the contextual information to the computing devices 304 for storage.

The client device 302 can be an electronic computing device (e.g., a cellular phone, a laptop, a tablet, a personal computer, or any other type of computing device). The client device 302 can include a display with a microphone, a speaker, a keyboard, a touchscreen, or any other type of input/output device. A user can access a platform provided by the data processing system 306 through the client device 302 to view outputs of machine learning models and/or otherwise access a portions of a network graph data structure (e.g., a knowledge graph or a graph data structure storing nodes and edges) provided generated and/or provided by the data processing system 306. In one example, the user can transmit a request including an identification of a networked item to the data processing system 306. The data processing system 306 can receive the request and retrieve data from a network graph data structure hosted or maintained by the data processing system to generate context or other requested information regarding the identified networked item. The data processing system 306 can transmit the generated context or requested information back to the client device 302. The data processing system 306 can receive and/or transmit such data over a network (e.g., a synchronous or asynchronous network).

The computing devices 304 can each be or correspond to facilities or locations in a transportation network. The facilities can be or include physical locations or sites within a value chain in which operations or processes take place to generate, modify, assemble, store, distribute, or otherwise deliver products or services. Facilities may include manufacturing plants, warehouses, distribution centers, transportation hubs, retail outlets, data centers, or other relevant infrastructure locations. Collectively, these facilities can facilitate the efficient movement and transformation of goods and services across various stages of the value chain, from initial sourcing and supply, through intermediate processing or logistics, and ultimately to the end user or consumer. The transformation and movement can each be a network operation indicating an operation performed on networked items as they move or are transformed across a network of facilities.

For example, a value chain for a consumer electronics product such as a smartphone may include the transportation and transformation of the smartphone across different facilities of the value chain. In the value chain, a first facility in the value chain can be a manufacturing plant, where components are initially assembled into finished products, such as the smartphone. The components of the smartphone can each originate at other facilities of the value chain, such that each facilitate may include multiple inputs to generate one or more outputs for the value chain for a single product. The smartphone can be transported to another facility in the value chain, such as a warehouse facility, which can store completed products awaiting orders from distributors or retailers. From the warehouse facility, the smartphone may be transported to another facility, such as a distribution center or transportation hub, where products are sorted, packaged, and dispatched to retail outlets or directly to end users.

A second example can be a value chain for food products. In this example, facilities may include food processing plants, which can transform raw agricultural produce into packaged and marketable food networked items. From these processing plants, the products may be transported to cold storage or refrigerated warehousing facilities for product freshness and safety. subsequently, transportation hubs or logistics centers can coordinate the distribution of the food products to supermarkets, grocery stores, or directly to consumers, completing the flow from farm to table for the value chain for the food products.

Facilities within a value chain can provide electronic documentation about their roles and operations in the value chain by transmitting relevant data from their respective computing devices 304 to the data processing system 306. For example, a manufacturing plant can use its computing device 304 to transmit detailed production reports that include finished quantities, malfunction logs, quality assurance metrics, and resource consumption data to the data processing system 306. Similarly, warehouse and storage facilities can utilize their respective computing devices 304 to regularly provide inventory updates, storage conditions, inbound delivery notifications, outbound shipment records, and product-handling information to the data processing system 306. By electronically transmitting ongoing documentation regarding inventory status, product movements, batch numbers, expiration dates, and environmental conditions (for example, temperature or humidity sensor readings), these facilities allow the data processing system 306 to maintain continuous visibility into different value chains in which the facilities are a part and the network operations performed by the facilities.

Additionally, logistics hubs and distribution centers may similarly rely upon their computing devices 304 to relay shipping and transportation documentation to the data processing system 306. The computing devices 304 for the logistics hubs and distribution centers can transmit information, such as shipment tracking data, freight bills, estimated delivery timelines, route details, transport conditions, and real-time status updates on transit delays or incidents can be to the data processing system 306.

The data processing system 306 may include one or more processors that are configured to maintain and update a network graph data structure, such as for transportation network management. The data processing system 306 may include a communication interface 308, a set of processors 310, and a memory 312. The data processing system 306 may communicate with the computing devices 304 via the communication interface 308, which may be or include an antenna or other network device that enables communication across a network and/or with other devices. The memory 312 may include a record collector 314, a record parser 316, a graph generator 318, a digital record generator 320, a network facilitator 322, an item classifier 324, a language model 326, an input-output prediction engine 328, a graph analyzer 330, a model manager 332, a record generator 334, a network graph data structure 336, and/or a system of record 338.

The set of processors 310 may be or include an application-specific integrated circuit (ASIC), a set of field programmable gate arrays (FPGAs), a set of digital signal processors (DSPs), circuits containing one or more processing components, circuitry for supporting a microprocessor, a group of processing components, or other suitable electronic processing components. In some embodiments, the set of processors 310 may execute computer code or modules (e.g., executable code, object code, source code, script code, machine code, etc.) stored in the memory 312 to facilitate the operations described herein. The memory 312 may be or include any volatile or non-volatile computer-readable storage medium capable of storing data or computer code.

One or more of the computing devices 304 or the data processing system 306 can include or utilize at least one processing unit or other logic devices such as a programmable logic array engine or a module configured to communicate with one another or other resources or databases to perform one or more of the operations described in this disclosure. As described herein, computers can be described as computers, computer devices, computing devices, or client devices. One or more of the computing devices 304 may each contain their own computer resources (e.g., processor, memory, etc.), share computer resources, or be part of a distributed computer system. The components of the computing devices 304 or the data processing system 306 can be separate components or a single component. The example system 300 and its components can include hardware elements, such as one or more processors, logic devices, or circuits. The computing devices 304 or the data processing system 306 can each be a server or computer that is configured to store various types of data, such as data stream data, image data, audio data, other types of content data, etc. For example, the computing devices 304 or the data processing system 306 can each store records for different accounts in memory (e.g., in a database in memory), where such media may include non-transitory machine-readable media used to store program instructions for performing one or more operations described in this disclosure.

The record collector 314 may include instructions that, when executed by the set of processors 310, cause the set of processors 310 to aggregate and retrieve or receive data from different sources, such as the computing devices 304. The record collector 314 may perform such operations by implementing various retrieval methods such as polling, change data capture (CDC), or event-driven mechanisms to fetch real-time data updates. For handling real-time data collection, the record collector 314 may employ message queues like Apache Kafka or RabbitMQ to buffer incoming data streams and prevent data loss during high-volume periods. In some cases, the record collector 314 can receive and/or manage data reception of electronic documents or records that the computing devices 304 transmit to the data processing system 306.

The record collector 314 may store the collected electronic documents or records within the system of record 338. The collected records may be stored in a structured manner, enabling efficient indexing, querying, and retrieval of information. For example, the computing devices 304 of the different facilities involved in one or more value chains may transmit records to the data processing system 306. Examples of records that the data processing system may receive can include, in addition to any other types of records:

- Manufacturing facility records, such as production run reports, quality control data, defect logs, maintenance schedules, machine downtimes, and resource utilization reports.
- Warehouse and inventory management records, such as detailed inventory counts, storage condition logs (e.g., temperature and humidity readings), product expiration dates, batch numbers, incoming delivery details, and outbound shipment data.
- Logistics and transportation records, including shipment tracking records, freight bills, customs declarations, delivery confirmation receipts, transportation delay reports, real-time GPS coordinates, carrier performance metrics, and incident or accident documentation.
- Records relating to retail or distribution centers, such as inventory sales data, return processing documents, reorder logs, store stock levels, and customer demand forecasts.
- Event-driven notifications, such as alerts of supply chain disruptions, inventory shortages, equipment failures, or transportation route changes.
- Operational transaction data, including purchasing or procurement orders, invoice records, payment confirmations, and financial transaction logs.
- Compliance or regulatory records documenting adherence to applicable regulations, standards, certifications, inspection reports, and audit trails from each facility.
- Ownership/directorship information, including ownership and directorship by companies and individuals. Moreover, the sanctioned/denied/risk status of these related entities, their physical locations, nationalities, and similar information.
- Records including sanctions lists, denied party lists, geographic information (e.g., if a network operation is a denied or sanctioned region), etc.

The record collector 314 may receive such records as sets of data or electronic documents or files and store the records in the system of record 338.

In one example, the record collector 314 can be, include, or interface with an application programming interface (API) that facilitates communication between the data processing system 306 (e.g., via the communication interface 308 of the data processing system) and other computing devices, such as the client device 302 and/or the computing devices 304. The record collector 314 may communicate with the client device 302 and/or the computing devices 304 across a network.

For instance, the record collector 314 can establish a connection with one of the computing devices 304. The record collector 314 can establish the connection with the computing device 304 over the network. To do so, the record collector 314 can communicate with set of servers across the network. In one example, the record collector 314 can transmit a syn packet to the computing device 304 (or vice versa) and establish the connection using a TLS handshaking protocol. The record collector 314 can use any handshaking protocol to establish a connection with the computing device. The data processing system 306 can communicate with the computing device over the established connection.

Over the established connection, the computing device 304 can transmit one or more records for a facility. The records can include, for example, one or more shipment tracking records, bills of materials, freight bills, delivery confirmation receipts, transportation delay reports, real-time GPS coordinates, carrier performance metrics, or incident or accident documentation. The record collector 314 can receive the records and store the records in the system of record 338.

The record parser 316 may include instructions that, when executed by the set of processors 310, cause the set of processors 310 to parse the records received by the record collector 314 and/or retrieved from the system of record 338. In some cases, the record parser 316 can parse the records using machine learning (including techniques such as natural language processing, image processing, and usage of contextual graph information) techniques, such as by extracting relevant operational data elements and facility-specific details from the electronic records transmitted by computing devices 304 of different facilities within the value chain. For example, the record parser 316 may use natural language processing techniques such as named entity recognition to identify (e.g., automatically identify) facility names, locations, equipment identifiers, product batch numbers, or shipment tracking numbers from textual records. Relationship extraction methods may be employed to identify connections between different entities, for instance, associating product batch information with manufacturing dates, quality inspection results, or origin/destination details from logistics records. Additionally, the record parser 316 may apply text classification or rule-based parsing methods to categorize records based on facility roles (e.g., manufacturing, warehousing, transportation, etc.). In some cases, the record parser 316 can normalize extracted data into standardized formats to aggregate, index, analyze, and report across datasets from multiple facilities consistently and efficiently. In some embodiments, domain-adapted machine learning models trained specifically on facility-generated documentation and supply chain terminology may further enhance the parsing accuracy and comprehensiveness of the data extraction process. The record parser 316 can identify or extract such information from the different records and store the extracted or identified data in the system of record 338.

The system of record 338 can be a relational or any other type of database that is configured to store records collected by the record collector 314 and/or data parsed or extracted from such records by the record parser 316. The system of record 338 may store structured and normalized operational data parsed from electronic records transmitted by computing devices 304 associated with facilities throughout the value chain. Examples of such operational data stored in the system of record 338 may include production run details, quality inspection results, detailed inventory levels, shipment tracking logs, logistics incidents and delays, product batch identifiers, facility locations, and transactional or compliance documentation. By maintaining this comprehensive and structured data repository, the system of record 338 can facilitate the data processing system 306 performance of efficient support queries, analytics, reporting, real-time decision-making, and/or proactive management of the overall value chain operations. The system of record 338 can also be configured to provide interfaces or data-access layers that allow other components or services within or external to the data processing system 306 to easily access and retrieve such stored information for downstream processing, visualization, or further analysis. In some cases, the system of record 338 can include the network graph data structure 336 and/or include different notes or comments about the network graph data structure 336.

The graph generator 318 may include instructions that, when executed by the set of processors 310, cause the set of processors 310 to generate the network graph data structure 336. The graph generator 318 can generate the network graph data structure 336 based on (e.g., based only on) records and/or parsed data stored in the system of record 338. For example, from the stored records and/or parsed data, the graph generator 318 can generate one or more nodes that each represent a different facility that is involved in at least one value chain. The graph generator 318 can generate edges between pairs of nodes representing pairs of facilities that represent or indicate the transportation of networked items or components used to create or transform individual the networked items. An edge between a pair of nodes representing a pair of facilities can indicate the output from one facility of the pair of nodes that is input into another facility of the pair of nodes. The graph generator 318 can additionally or instead generate nodes that represent different networked items (e.g., items that are transformed and/or transported across a value chain). The graph generator 318 can generate edges between the nodes for the networked items to the facilities that are involved in the transportation and/or creation of the respective networked items. The graph generator 318 can generate the edges by storing identifications of the nodes connected by the edges in the respective nodes. The graph generator 318 generate the nodes and/or edges between nodes in the network graph data structure 336.

The network graph data structure 336 can be or include a graph data structure configured to store different nodes of value chains for different networked items. The nodes can each be or include a separate data structure with node field-value pairs that each correspond to a different type of data regarding a facility represented by the node. For instance, the individual nodes can each include node field-value pairs for a name or identifier of the facility represented by the node, a type of node (e.g., manufacturing, warehousing, transportation, etc.), a description of the function of the node, a location (e.g., geographic location) of the node, a region of the node, an owner of the node, etc. Each node field-value pair can include an identification of the type of the node field-value pair and a value for the node field-value pair. The graph generator 318 can identify values for the node field-value pairs from the records and/or parsed data of the system of record 338 and store the values in the corresponding node field-value pairs.

The network graph data structure 336 can be or include one or more sub-graph data structures 340. Each of the sub-graph data structures can represent a value chain for generating a networked item. For instance, each sub-graph data structure 340 can be linked by an edge with a profile data structure or networked item profile 342 for a networked item that is generated by a value chain that the sub-graph data structure 340 represents. The individual sub-graph data structures 340 can each include a chain of nodes. The chain of nodes can be or include a sequence of connected nodes forming a path of one or more instances of the networked item from a source node (e.g., a source node or initial node of the chain of nodes or the sub-graph data structure 340) to a destination node (e.g., a destination node or last node of the chain of nodes or the sub-graph data structure 340). The path can represent network operations of one or more instances of the networked item through the sequence of connected nodes. In some cases, each node of the sequence of connected nodes represents an entity performing a network operation on the one or more instances of the networked item. Each edge between one or more pairs of the sequence of connected nodes can represent movement, transfer, or transport of the one or more instances of the networked item from a first node (e.g., a source node) of the pair of nodes to a second node (e.g., a destination node) of the pair of nodes.

In some cases, the graph generator 318 can perform entity resolution techniques to modify the network graph data structure 336. For example, the graph generator 318 can extract of facility-related references from electronic records parsed by the record parser 316. For instance, the record parser 316 can identify a facility's name, location, and equipment identifiers from shipment tracking logs and quality inspection reports. Once these references are extracted, the graph generator 318 can move to a resolution phase. In the resolution phase, the graph generator 318 can match each extracted reference to existing entities within the system of record 338 or, if no match is found, create a new entity to represent the facility or item. The graph generator 318 can generate nodes in the network graph data structure 336 for new entities that the graph generator 318 identifies. In doing so, the graph generator 318 can ensure that each node in the network graph data structure 336 corresponds to a unique, defined entity, minimizing duplication and enabling accurate representation of relationships within the network graph data structure 336.

The digital record generator 320 may include instructions that, when executed by the set of processors 310, cause the set of processors 310 to generate networked item profiles 342 and/or networked item digital records (e.g., passports) for different networked items for which value chains are represented in the network graph data structure 336. The networked item profiles 342 can be or include nodes or profiles that store data the networked items represented by the networked item profiles 342. For example, the networked item profiles 342 can be or include separate data structures that represent the respective networked items. The data structures can each be or include one or more attribute field-value pairs that each correspond to attributes of the respective networked items. Examples of attribute field-value pairs can include classifications, carbon footprint for manufacturing the networked items., revenue, origin, etc. The digital record generator 320 can generate networked item profiles 342 for different networked items using data stored for the networked items from the system of record 338. The graph generator 318 can store the networked item profiles 342 in the network graph data structure as profiles 342 as nodes of the network graph data structure 336. In doing so, the graph generator 318 can generate edges between the networked item profiles 342 and nodes representing facilities (e.g., the origin or initial facilities) of value chains involving the networked item or that are used to generate networked items of the respective networked item profiles 342.

The digital record generator 320 can generate networked item digital records for different networked items. The networked item digital records can be or include a view into the network graph data structure 336 that includes one or more sets of nodes or sub-graph data structures indicating one or more value chains of the networked items associated with the networked item digital records. The networked item digital records can each correspond to one or more networked items. The digital record generator 320 can generate the networked item digital records to each have a unique identifier (e.g., a passport identifier or a digital record identifier) that operates as an address for the networked item digital record. The digital record generator 320 can generate the networked item digital records to include identifications of one or more networked item profiles 342, identifications of individual nodes, and/or identifications of different sub-graph data structures or value chains for networked items. In some cases, the networked item digital records can include the profiles, nodes, and/or sub-graph data structures themselves.

The digital record generator 320 can generate the networked item digital records based on user selections that the digital record generator 320 receives, such as from the client device 302. For example, a user can provide an input to generate a networked item digital record for a networked item. The user can then provide an input selecting a networked item profile for the networked item and one or more sub-graph data structures indicating sets of nodes representing value chains in which the networked item is involved. The digital record generator 320 can receive the selections and generate a networked item digital record for the networked item by generating an identifier for the networked item digital record as well as identifying identifiers for each of the selected networked item profile and the sub-graph data structures and/or nodes of the sub-graph data structures. The digital record generator 320 can store a file including the identifiers and/or the data structures of the selected networked item digital record and the sub-graph data structures or nodes. The digital record generator 320 can store the file in the network graph data structure 336 as one of a plurality of networked item digital records 344.

The network facilitator 322 may include instructions that, when executed by the set of processors 310, cause the set of processors 310 to facilitate the transfer of networked items across a network nodes. The network facilitator 322 can do so, for example, by responding to requests from computing devices regarding whether networked items satisfy a set of rules. For instance, the network facilitator 322 can store a set of rules that indicate criteria that networked items can satisfy during the transfer or transportation of the networked items between facilities, in some cases across the border. In response to a request, the network facilitator 322 can identify a networked item digital record for the networked item from the network graph data structure 336. The network facilitator 322 can identify the networked item digital record, for example, by identifying the networked item digital record based on the networked item digital record containing an identification of the networked item or by identifying an address of the networked item digital record that was contained in the request. The network facilitator 322 can retrieve the networked item digital record and identify a networked item profile for the networked item and/or the nodes containing data regarding one or more transformations and/or transportations of the networked item. The network facilitator 322 can retrieve data from the respective profiles and/or data structures. The network facilitator 322 can apply the set of criteria to the retrieved data to determine whether the data for the networked item satisfies the set of criteria. Responsive to determining the set of criteria is satisfied, the network facilitator 322 can generate a flag indicating the transfer or transport of the networked item is allowed. Otherwise, the network facilitator 322 can restrict the transfer or transport of the networked item by generating an alert or otherwise operating a machine to restrict the movement of a vehicle from transferring or accepting the networked item.

The item classifier 324 may include instructions that, when executed by the set of processors 310, cause the set of processors 310 to generate classifications for networked items. The item classifier 324 can generate classifications for networked items in response to requests from computing devices, such as the client device 302. For example, the item classifier 324 can receive a request containing an identification of a networked item. The request can be for a classification (e.g., a harmonized system (HS) code for the time) for the networked item. The item classifier 324 can receive the request and identify one or more sub-graph data structures from the network graph data structure 336 that correspond to the networked item (e.g., correspond to facilities that facilitate the transformation and/or transport of the networked item and/or components of the networked item). The item classifier 324 can use edges between the sub-graph data structures to identify different information about the networked item, such as a source node (e.g., source facility) for the networked item and/or a destination node (e.g., a destination facility) for the networked item.

The item classifier 324 can use the retrieved data from the network graph data structure 336 to generate either a prompt or a prompt augmented for the language model. The language model 326 can be or include a large language model, a transformer, a neural network, etc., that is trained to generate responses to input containing different types of content, such as images, text, or videos. The item classifier 324 can generate a prompt containing the identification of the networked item and/or any information retrieved from the network graph data structure 336 regarding the networked item in response to the request. In some cases, the item classifier 324 can include features (e.g., textual, numeric, categorical, graph-based features, or image features) of the networked item in the prompt. This description may be augmented with graph context (buyers and suppliers of the good, their extended relationships) as well as characteristics such as the weight, value, and similar of the good. The item classifier 324 may receive the description in the request or by retrieving the text description from the networked item profile for the networked item stored in the network graph data structure 336. The item classifier 324 can generate such a prompt and input the prompt into the language model 326. The item classifier 324 can execute the language model 326 based on the input to cause the language model 326 to output a classification for the networked item and/or a confidence score for the classification for the networked item.

The item classifier 324 can compare the confidence score for the classification to a threshold. Responsive to determining the confidence score exceeds the threshold, the item classifier 324 can generate a visual representation of the classification and/or the confidence score for the classification. The item classifier 324 can transmit the visual representation of the classification to the client device that transmitted the request.

In cases in which the item classifier 324 determines the confidence score is less than the threshold, the item classifier 324 can retrieve further information regarding the networked item. The item classifier 324 can do so, for example, by querying a network (e.g., the Internet) for one or more databases that store data regarding networked items that contain matching identifiers to the identifier received in the request. The item classifier 324 can retrieve information regarding the networked item from such databases enrich the prompt with the retrieved data. The item classifier 324 can input the enriched prompt into the language model 326 and execute the language model 326 to generate a classification and/or a confidence score for the classification. The item classifier 324 can repeat this process any number of times until determining or identifying a confidence score for a classification that exceeds the threshold.

The item classifier 324 can use any type of machine learning model to generate classifications for networked items of network operations. The item classifier 324 can do so using the retrieved data from the network graph data structure 336. The item classifier 324 can use the retrieved data to generate a feature vector for input into any type of machine learning model. For example, the item classifier 324 can generate a feature vector of numeric values from the records. The item classifier 324 can do so by inserting extracted numeric values from the records and/or converting text or other attributes from the records into the numbers for inclusion in the feature vector. The item classifier 324 can insert the feature vector into a neural network configured or trained to generate classifications of network items of networked operation. The item classifier 324 can execute the neural network based on the input to cause the neural network to generate a classification for the networked item and a confidence score for the classification. Responsive to determining the confidence score does not exceed a threshold, the data processing system can retrieve further data about the networked item and execute the neural network again to determine a classification and a new confidence score. The data processing system can repeat this process until identifying a classification and a corresponding confidence score that exceeds or satisfies a threshold. The item classifier 324 can use any type of machine learning model for classification.

The input-output prediction engine 328 may include instructions that, when executed by the set of processors 310, cause the set of processors 310 to generate predictions for inputs and/or outputs of nodes of the network graph data structure 336. For instance, the input-output prediction engine 328 can be or include one or more machine learning models (e.g., neural networks, support vector machine, random forests, etc.) that are each configured to generate a prediction regarding an input to a node and/or an output of a node. Examples of inputs can be or include different types of energy (e.g., coal, electricity, gas, etc.) the facilities represented by the nodes use for operation, the amount of energy the facilities use for a defined time interval, components that the facilities receive from other facilities, types of transportation through which the facilities receive inputs, the facilities that provide the inputs, etc. The outputs can be the types of networked items or components the facilities produce, environmental emissions or outputs the facilities produce, etc. The input-output prediction engine 328 can predict such inputs and/or outputs based on any type of data or metadata regarding the facilities, such as based on identification of the technology the facilities use, identifications of the inputs and/or outputs of the facilities, the number of employees, the geography or region of the facilities, the number of network operations that the facilities are involved in, etc. The input-output prediction engine 328 can generate predictions based on such inputs or outputs. The input-output prediction engine 328 can store the predictions in the data structures or nodes of the network graph data structure 336 for which the input-output prediction engine 328 generated the predictions.

In some cases, the input-output prediction engine 328 can store and/or include an input-output matrix. The input-output matrix can map input items with classifications or directly to determine relevance for target item generation. This matrix can operate as a lookup table that facilitates fast identification of pertinent input/output relationships without requiring extensive graph traversal. The system can perform classification-based queries against this matrix, in some cases using item classifications or other types of data (e.g., textual description, numeric characteristics, categorical values, and/or graph connections) as keys to identify which inputs should be included in or discarded from the sub-graph generation process. Generating and using the input-output matrix in this way can transform the conventionally recursive and computationally expensive process of dependent graph traversal into an efficient and direct lookup operation that scales with the size of the network graph data structure.

Additionally, the input-output prediction engine 328 can implement one or more semantic models, such as generative models, foundational neural net models, transformer models, convolutional or recurrent neural networks, BERT models, SBERT models, etc., that analyze textual descriptions of items to make more nuanced determinations about input-output relationships. These semantic models can provide an additional layer of intelligence beyond classification matching using the input-output matrix, facilitating the data processing system 306's ability to understand contextual relationships between items based on their descriptive content. The semantic analysis can aid in resolving ambiguous cases where matrix-based filtering alone might be insufficient, ensuring that the generated sub-graphs capture the most accurate and relevant dependency relationships for the corresponding target items.

Moreover, the model manager 332 can continuously increase the accuracy of the models involved in evolving operational environments through continuous learning. For example, the model manager 332 can train and retrain large language models or other type of machine learning model or generative model, including those with graph based and contextual features, using records of actual network operations and item transfers. The model manager 332 can use the trained large language models or machine learning models to enable the input-output matrix to adapt to changing operational patterns. This dynamic updating capability ensures that the sub-graph generation process remains accurate as new items are introduced, relationships change, or operational procedures evolve. The continuous learning approach prevents the degradation of system accuracy.

The graph analyzer 330 may include instructions that, when executed by the set of processors 310, cause the set of processors 310 to generate metrics for the network graph data structure 336. The graph analyzer 330 can generate the metrics for individual nodes in the network graph data structure 336, individual networked item profiles of the network graph data structure 336, individual sub-graph data structures of the network graph data structure 336, etc. The graph analyzer 330 can generate the metrics based on the data stored in the network graph data structure 336 for the respective nodes, sub-graph data structures, and/or networked item profiles. The graph analyzer 330 can generate the metrics and store the metrics in network graph data structure 336 and/or the system of record 338.

The model manager 332 may include instructions that, when executed by the set of processors 310, cause the set of processors 310 to generate manage the different computer models (e.g., optimization models, machine learning models, etc.) stored by the data processing system. The model manager 332 may execute and/or train the different machine learning models and/or other types of computer models to generate outputs based on data stored in the network graph data structure 336, the system of record 338, and/or any other data sources.

The model manager 332 may be or include a task agent that is configured to execute different applications and/or models stored by the data processing system 306 to perform different tasks. For instance, the task agent can be or include one or more large language models and/or other types of machine learning models. The task agent can determine the intents of queries (e.g., natural language queries) and use the intents to determine one or more tasks to perform. The task agent can identify a relevant sets of instruction, model, and/or application of the components 314-330 and/or 334 to use to perform a task, execute the identified set of instructions, model, and/or application, determine if the task are completed based on the execution, identify another set of instructions responsive to determining the task is not completed, and repeat this process until determining the task and/or each task is completed.

The model manager 332 may include a model 333. The model 333 can include one or more of the models described herein as being processed or executed by the data processing system 306, such the language model 326 and/or the models for classification of the input-output prediction engine 328. The model manager 332 can execute and/or train the model 333 to perform different tasks, such as classifying networked items, generating risk scores for network operations, generating risk scores for entity nodes, etc. The model manager 332 can train such models using data from the network graph data structure 336 and/or ground truth information (e.g., from the network graph data structure 336 or from another source, such as the system of record 338 or an external database or data source). The model manager 332 may do so as a task agent or any type of model or application that the data processing system 306 can execute.

The record generator 334 may include instructions that, when executed by the set of processors 310, cause the set of processors 310 to generate records (e.g., user interfaces, databases, tables, files, etc.). The record generator 334 can generate records containing data that is requested by different computing devices. In some cases, the record generator 334 can generate the records to include data generated by one or more of the network facilitator 322, the item classifier 324, the language model 326, the input-output prediction engine 328, and/or the graph analyzer 330. The record generator 334 can (e.g., through the record collector 314) transmit such records to the requesting computing devices and/or store the records in the system of record 338 and/or the network graph data structure 336.

Figure 3B:
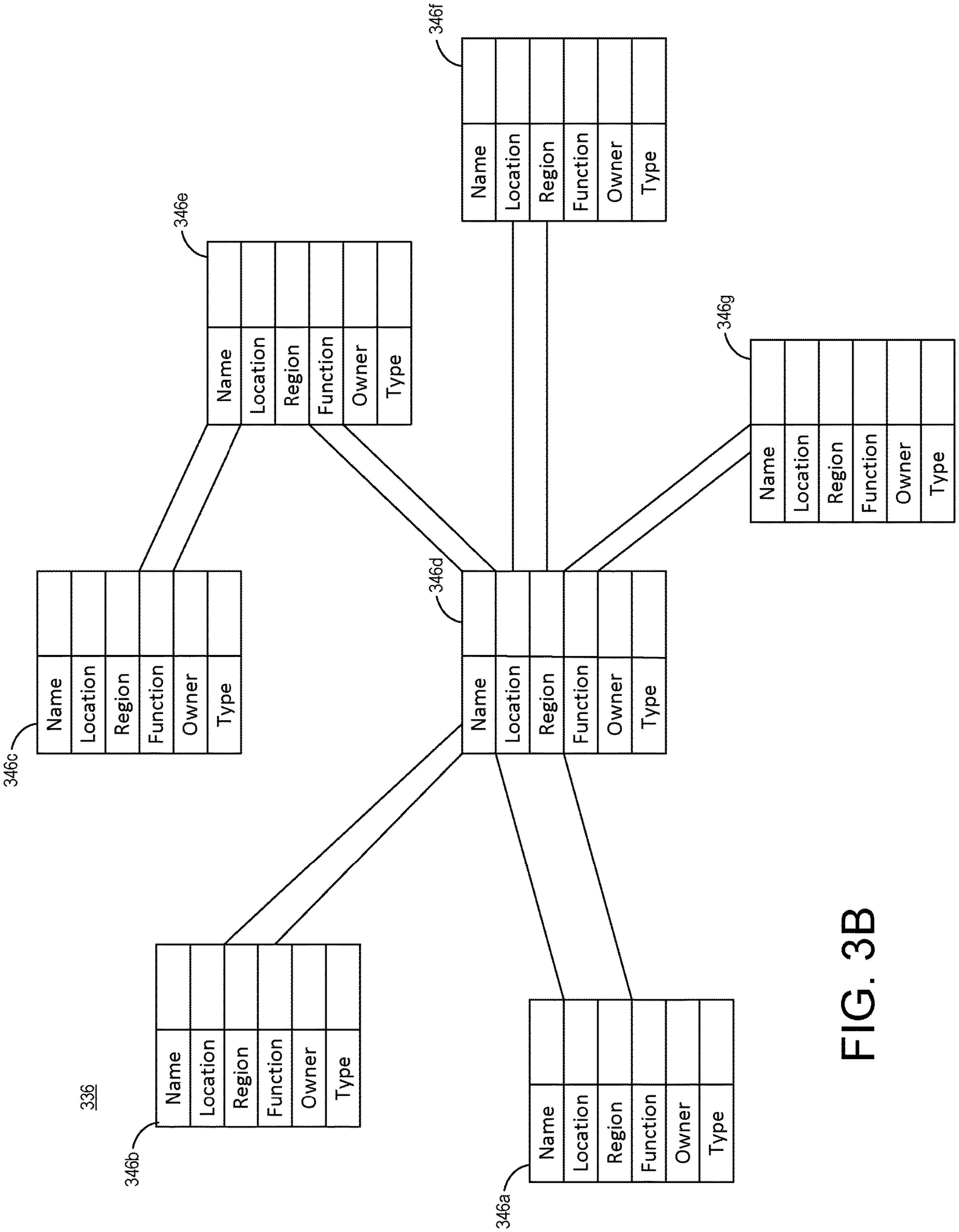
FIG. 3B illustrates an example network graph data structure, in accordance with an implementation.

FIG. 3B illustrates an example of the network graph data structure 336 storing nodes representing the networking of the transportation and/or transformation of different networked items across a network, in accordance with an implementation. As illustrated, the network graph data structure 336 can include one or more nodes 346*a*-*g* (individually, node 346 and together, nodes 346) that represent different facilities. The nodes 346 can be connected by edges that each represent network operations (e.g., transfers, transformations, or transportation instances) between the respective nodes 346. The nodes 346 can each include one or more node field-value pairs for different types of characteristics or attributes of the facilities represented by the nodes 346. The nodes 346 can include one or more attributes such as, for example, name, location, region, function, owner, type, etc.

The edges of the network graph data structure 336 can be or include data structures (e.g., edge data structures). For example, the edge data structures can each include one or more edge field-value pairs for different types of characteristics or attributes of the network operations represented by the edges. The edges can include one or more attributes such as, for example, identifier or name of the networked item being transported or transferred, quantity (e.g., number of networked items of a shipment and/or weight of an individual network item and/or weight of the total networked items being transferred in the network operation), a time and/or date of the network operation, a classification (e.g., an HS classification) of the networked item, a description (e.g., a text string description) of the networked item, a method of transport, etc. The edge data structures can each include identifiers of the nodes that the edges are connecting, in some cases forming the edge in a structured manner.

Master Data Objects

The network graph data structure 336 can include master data objects that store data for specific types of networked items represented in the network graph data structure 336. Non-limiting examples of networked items for which the network graph data structure 336 may store master data objects include products, organizations, locations, customers, users, suppliers, orders, directors, shareholders, shipments, and customs entries. Details regarding these data objects are below.

| Product |
| --- |
| The "output" Product is the primary focus in the Catalog and in the overall value chain management system design |
| Input Products are also linked to the output Product via a Bill of Materials |
| Products can be linked across value chains networks, and specifically through the Systems of Record of "active" registered organizations, via product passports |
| **Attributes** |
| Revenue (for output Products) |
| Spend (for input Products) |
| Bill of Materials |
| Certificate of Origin |
| Free trade agreement qualification |
| Product Carbon Footprint |
| HS codes (by jurisdiction) |
| Duty/tariff owed by jurisdiction and date |
| Deforestation impact |
| Forced labor risk |
| Material Safety Data Sheet |
| Third Party Certifications |
| Images |
| Reports/Attestations generated within the system |
| The system ID and system-generated QR Code |
| Any other attributes can be specified by users involved (e.g., the parties involved) in the need for the product passport. |
| **Organizations** |
| Registered Organization |
| This organization type is meant to capture the general sense of a "counterparty" entity in a global b2b or B2g interaction. I sell to Crystal and Stone Co., and not the Smith family. I import my goods with the customs agency and not the government. I buy jet engines from Acme Co. and not the parent company Globex. I fly on Jets Airways and not the regionally-licensed subsidiary. |
| Registered organizations include 1) any customer-provided company counterparty node listed in their Catalog, and/or 2) system-created registered organizations generated through AI systems operating on customer and third party data, but not in reliance on, or re-constituting, any one corporate firmographic dataset. |
| Registered organizations can have one or more Legal Organizations, Legal Entities, and Facilities linked to them. |
| Government, non-profits, academic institutions, etc. can be registered organizations - not just corporate entities |
| Attributes of registered organizations: |
| Website |
| Brands |
| Legal Organizations linked through ownership |
| Facilities |
| User registries |
| Sanctions/denied party status |
| Revenue |
| A canonical legal entity provided by a third party corporate register |
| **Locations** |
| Facility |
| A system-generated entity that is comprised of a 1) physical address, and 2) a business relationship edge (mostly shipments, but summary buyer-supplier edges work too) |
| Area |
| Polygon |
| Attributes: |
| Land use |
| Deforestation risk |
| Customers |
| Customers are registered organizations, and can be linked to one or more output Products in the Catalog |
| Suppliers |
| Suppliers are registered organizations, and can be linked to one or more input Products in the Catalog |
| Orders |
| Shipments |
| Customs Entries |

Insight Objects

The network graph data structure 336 can include or be associated with insight objects. The insight objects can store data generated from metrics or analytics performed on the nodes or objects of the network graph data structure 336. Examples of insights for which the network graph data structure 336 may store insight data objects include exposure, event, opportunity, and change. Details regarding these data objects are below.

- Exposure
  - Compliance risk
  - Business interruption risk
  - Geopolitical risk
- Event
  - AI event
    - Subcategories thereof
  - System network event
    - Placeholder for events generated based on the network graph data structure 336 and/or network
- Opportunity
  - Placeholder for an insight type that is an opportunity, such as a "recommended supplier" or "recommended customer"
- Change
  - A graph change that affects a customer's VC network Task Objects The network graph data structure 336 can include or be associated with task objects. The task objects represent or include data for any type of data object of the network graph data structure 336 or associated with the network graph data structure 336. In some cases, task objects can be grouped or linked into a larger "job" data structure representing different actions to be performed to accomplish a job associated with the job data structure. Details regarding task data objects are below.

- Tasks can be collaborative pages that allow for internal and external collaboration/communication and role-based abilities to:
  - Edit, annotate, and append Master Data Objects
  - Disposition Insight Objects
  - Share or request Passports, including designating data and documents to share or request within the Passport
- Examples of tasks can include
  - Exposure Assessment, which may be subdivided into two tasks that include:
    - Network Validation
    - Exposure Validation
  - Event Assessment, which may be subdivided into two tasks that include:
    - Network Validation
    - Event Characterization
  - Duty/tariff assessment
  - Free trade agreement qualification
  - Proving deforestation free production
  - Calculating and proving embodied carbon impact
  - Classification
  - Connection
    - Facilitation (cross-border voluntary trade facilitation)
    - Survey (upstream and downstream data gathering)
    - Reporting (customer and/or regulator) as recipient
  - Screening
    - For screening entities not in my System of Record for exposures
  - Network Update Network Validation action associated with a Change insight In some cases, the data processing system may include different AI agents that facilitate users requesting an agent to establish or generate a workspace or different tasks.

Figure 3C:
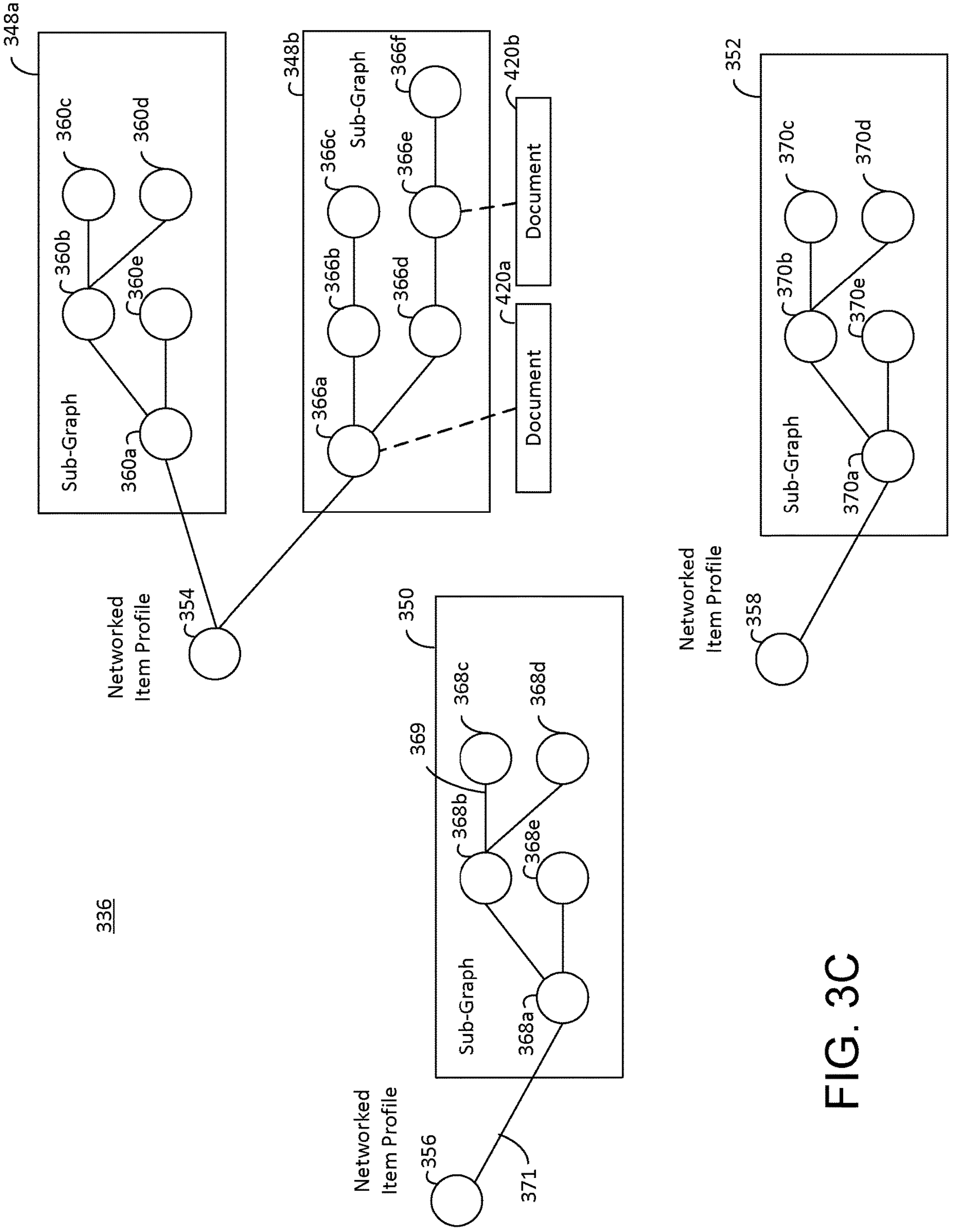
FIG. 3C illustrates example sub-graph data structures of the example network graph data structure of FIG. 3B, in accordance with an implementation.

FIG. 3C illustrates another view of the network graph data structure 336 storing nodes representing the networking of the transportation and/or transformation of different networked items across a network, in accordance with an implementation. As illustrated, the network graph data structure 336 can include one or more sub-graph data structures 348*a-b*, 350, and 352. Each sub-graph data structure can represent or otherwise correspond to a value chain including a path for generating a respective networked item.

The respective sub-graph data structures 348*a-b*, 350, and 352 can each include a chain of nodes that represent different locations of facilities of a path for generating a networked item. For example, the sub-graph data structure 348*a* can include nodes 360*a-e* (together, nodes 360, and, individually, node 360). One or more, or all, of the nodes 360 can be the same as or similar to the nodes 346. The nodes 360 can be linked by edges to indicate the outputs and/or inputs of the nodes 360 to other nodes of the sub-graph data structure 348*a* to generate a networked item. The nodes 360*c, d*, and *e* can each be a source node of the sub-graph data structure because the nodes 360*c, d*, and *e* do not receive any inputs from another node (e.g., specifically for the sub-graph data structure 348*a*). The node 360*a* can be the last facility (e.g., the destination node) of the value chain represented by the sub-graph data structure 348*a* because the node 360*a* may not provide any inputs to another node of the sub-graph data structure 348*a*. The destination node 360*a* can be linked with a node 354 associated with the networked item generated by the value chain of the sub-graph data structure 348.

The sub-graph data structure 348*b* can be configured in a similar manner to the sub-graph data structure 348*a*. For example, the sub-graph data structure 348*b* can include nodes 366*a-f* (together, nodes 366, and, individually, node 366). One or more, or all, of the nodes 366 can be the same as or similar to the nodes 346. The nodes 366 together can represent a value chain for generate the same networked item as the nodes 360 of the sub-graph data structure 348*a*. The nodes 366 can include one or more common nodes (e.g., the same node) to the nodes 360, such as nodes that are configured to generate the same outputs as each other. The sub-graph data structure 348*b* can be linked with the node 354 for the profile of the networked item that the nodes 366 are configured to generate together.

A document 420*a* can be linked with the node 366*a* of the sub-graph data structure 348*b* and/or a document 420*b* can be linked with the node 366*e* of the sub-graph data structure 348*b*. The document links are optional. More or fewer document links with nodes can be included than shown. The documents 420*a* and/or 420*b* can be records (e.g., electronic records) that were used to generate the respective nodes 366*a* and/or 366*e*. For example, the documents 420*a* and/or 420*b* can be or include attestations about the nodes 366*a* and/or 366*e*, attestations about networked items and/or outputs generated by the nodes 366*a* and/or 366*e*, bills of materials provided or associated with the respective nodes 366*a* and/or 366*e*, or any other types of documents or electronic records containing data about the respective nodes 366*a* and/or 366*e* and/or from which the data (e.g., attributes) of the nodes 366*a* and/or 366*e* was generated.

The sub-graph data structure 350 can be configured in a similar manner to the sub-graph data structure 348*a*. For example, the sub-graph data structure 350 can include nodes 368*a-e* (together, nodes 368, and, individually, node 368). One or more, or all, of the nodes 368 can be the same as or similar to the nodes 346. The nodes 368 together can represent a value chain for generating or creating the same networked item as the nodes 360 of the sub-graph data structure 348*a*. The nodes 368 can include one or more common nodes (e.g., the same node) to the nodes 360, such as nodes that are configured to generate the same outputs as each other. The sub-graph data structure 350 can be linked with the node 356 for the profile of the networked item that the nodes 370 are configured to generate together.

The node 368*a* can be connected with the node 356 for the profile of the networked item that the nodes 368 are configured to generate together. The node 368*a* can be connected with the node 356 by an edge 371. The edge 371 can be or include a data structure (e.g., an edge data structure) that is configured to identify the type of the connection. In this case, the edge 371 can store data indicating that the node 368 is the final node of the sub-graph data structure 350, an identifier of the sub-graph data structure 350 itself, an identifier of the networked item generated by the sub-graph data structure 350, an indication that the edge connects a node for a location or facility of the sub-graph data structure 350 with a node for a profile (e.g., a profile node) instead of representing a network operation, etc. The different sub-graph data structures 348*a*, 348*b*, and/or 352 may each be connected with a node for a profile of a networked item with a similar edge to the edge 371.

The nodes 368*b* and 368*c* may be connected by an edge 369. The edge 369 can be or include a data structure (e.g., an edge data structure) that includes data indicating a network operation between the entity represented by the node 368*c* (e.g., a source node) and the entity represented by the node 368*b* (e.g., a destination node). The network operation can be a transfer or a transportation of an instance of the network item (e.g., a portion of the networked item that will be eventually be transformed into the networked item or the networked item itself) from the entity of the node 368*c* to the entity of the node 368*b*. Together, the nodes 368*b* and 368*c* can be a pair of nodes because they are connected by an edge (e.g., the edge 369). The nodes 368*b* and 368*c* can be connected by any number of edges, as each edge may correspond to a different network operation. In some cases, the nodes 368*b* and 368*c* may be connected by different sets of edges that each correspond to a particular sub-graph data structure. Such may be the case when the nodes 368*b* and 368*c* are connected to generate different networked items as part of different value chains (e.g., in different sub-graph data structures). Thus, the edges may be specific to the sub-graph data structures in which the edges are depicted. The nodes of the different sub-graph data structures 348*a*, 348*b*, and/or 352 may respectively be connected with each other with edges similar to the edge 369.

The sub-graph data structure 352 can be configured in a similar manner to the sub-graph data structure 350. For example, the sub-graph data structure 352 can include nodes 370*a-e* (together, nodes 370, and, individually, node 370). One or more, or all, of the nodes 370 can be the same as or similar to the nodes 346. The nodes 370 together can represent a value chain for generate the same networked item as the nodes 368 of the sub-graph data structure 350. The nodes 368 can include one or more common nodes (e.g., the same node) to the nodes 370, such as nodes that are configured to generate the same outputs as each other. The sub-graph data structure 352 can be linked with the node 358 for the profile of the networked item that the nodes 368 are configured to generate together.

Figure 3D:
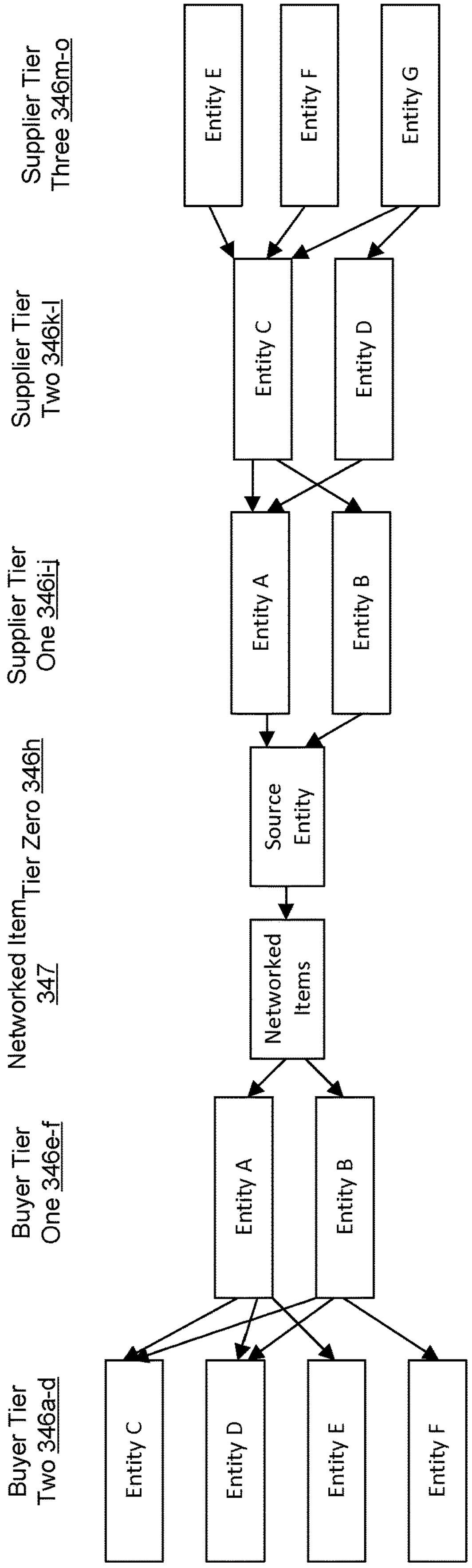
FIG. 3D illustrates an example sub-graph data structure of the example network graph data structure of FIG. 3B, in accordance with one or more embodiments.

FIG. 3D is a sub-graph data structure 372 that represents an example value chain for the production of networked items (e.g., vehicle gearboxes). The sub-graph data structure 372 can represent supply and consumption tiers for generating or creating networked items and then distributing the generated networked items, in some implementations. For example, the sub-graph data structure 372 can include supplier nodes 346*m-o* that provide inputs to supplier nodes 346*k-l* as indicated by the edges and arrows between the nodes 346*m-o* and the nodes 346*k-l*. The supplier nodes 346*k-l* can use or transform the inputs to generate outputs that are input into the nodes 346*i-j*. The nodes 346*i-j* can use or transform the inputs to generate outputs that are input into the node 346*h*, as the source entity node. The source entity node 346*h* can generate the networked items 347 based on (e.g., by transforming) the inputs from the nodes 346*i-j*. The source entity node 346 can transfer the networked items 347 to nodes 346*e-f*. The nodes 346*e-f* can distribute or transfer the networked items 347 or a transformed version of the networked items 347.

The data processing system 306 can implement the systems and methods described herein to generate the network graph data structure 336 representing one or more value chains in the sub-graph data structures 340, such as sub-graph data structures 340 with the following characteristics:

Accurate: The network graph data structure 336 may accurately describe the physical production and transportation processes, even if they are described in disparate messy documents in multiple languages.

Granular down to the part-site level: the part-site level is necessary to truly manage supply chains. Previous approaches have focused on the business network level or connection level, but these approaches fail to understand the fundamental physicality (locations and products) of the underlying value chains. The network graph data structure 336 may include specific details to ascertain what was the specific flow of a given product from raw materials to production, distribution, and sale. Failure to achieve this part-site level view results in such high levels of false-positives (erroneous links) that value chain analysis is impossible-participants are stuck in a mire of analyzing irrelevant business relationships.

Dynamically updating: the supply chain is constantly changing. To provide actionable intelligence, the network graph data structure 336 may evolve as production networks, site locations, and corporate relationships evolve. Thus, the system can automatically update while not losing track of relationship histories.

Consistent: To facilitate collaboration between participants whether their role in a value chain is suppliers, buyers, transporters, regulators, banks, insurers, or more, all participants may operate on a shared source of truth. One-off customer specific representations may fail to enable value chain management-they cannot be used as a basis for collaboration. The supply chain graph has to be consistent and linkable across all parties.

To achieve these attributes the network graph data structure 336 may have the following characteristics.

1. Assembly: The intelligence on global value chains be assembled while respecting data sovereignty, security, and privacy. In other words, the system can have shared value-chain intelligence without sharing data.
2. Construction: The information can be harmonized into a network representation with the correct nodes and links.
3. Customization: Users can customize the resultant value chain maps with their organization specification information, groupings, and similar.
4. Value-chain specificity: The information can allow understanding of specific value chains at the part-site level of understanding. In other words, value chain understanding that is not at the company level, but rather facility-to-facility network operations can be understood in the context of the inputs they provide for the final product.

Nodes may include not only companies, but facilities, ports, products, individuals, vessels, countries, geographies, and more. Edges may cover movement of goods, locations of facilities, ownership of companies, directorship of companies, and more. Value chain management can include constructing a network graph data structure that covers more than just corporate relationships, but also the fundamental input-output relationships of product production. Such a part-site specific graph may allow part-site specific understanding of value chains at scale.

The network graph data structure 336 illustrated in FIGS. 3B and 3C can be constructed from both commercial and proprietary data. To do so, the system can obtain publicly and commercially available supply chain data. The system can focus upon datasets that describe physical movement of goods from facility to facility, rather than more abstract “business relationships.” In other words, documents such as bills of lading, manifests, customs declarations, and purchase orders. These documents can contain information on the sender, receiver, their addresses, the goods transported (both in free text and harmonized-system product category form), the ports, the vessels, and more. The system can augment the documents with commercially available information on corporate registries, embargoes lists, tariff incentives, free trade agreement qualification, and more. Such information can be identified with publicly/privately reported business relationships as appropriate.

However, public and commercially available data can be limited. For instance, such data may only be available for certain geographies and certain modes of transport. Operating on public data alone may not achieve the visibility necessary to solve the world’s value chain problems—a disconnected, erroneous, or low-fidelity network doesn’t help the participants. To understand value chains, system may need to be able to understand and connect the multiple stages of production from raw extraction through final distribution.

Figure 3E:
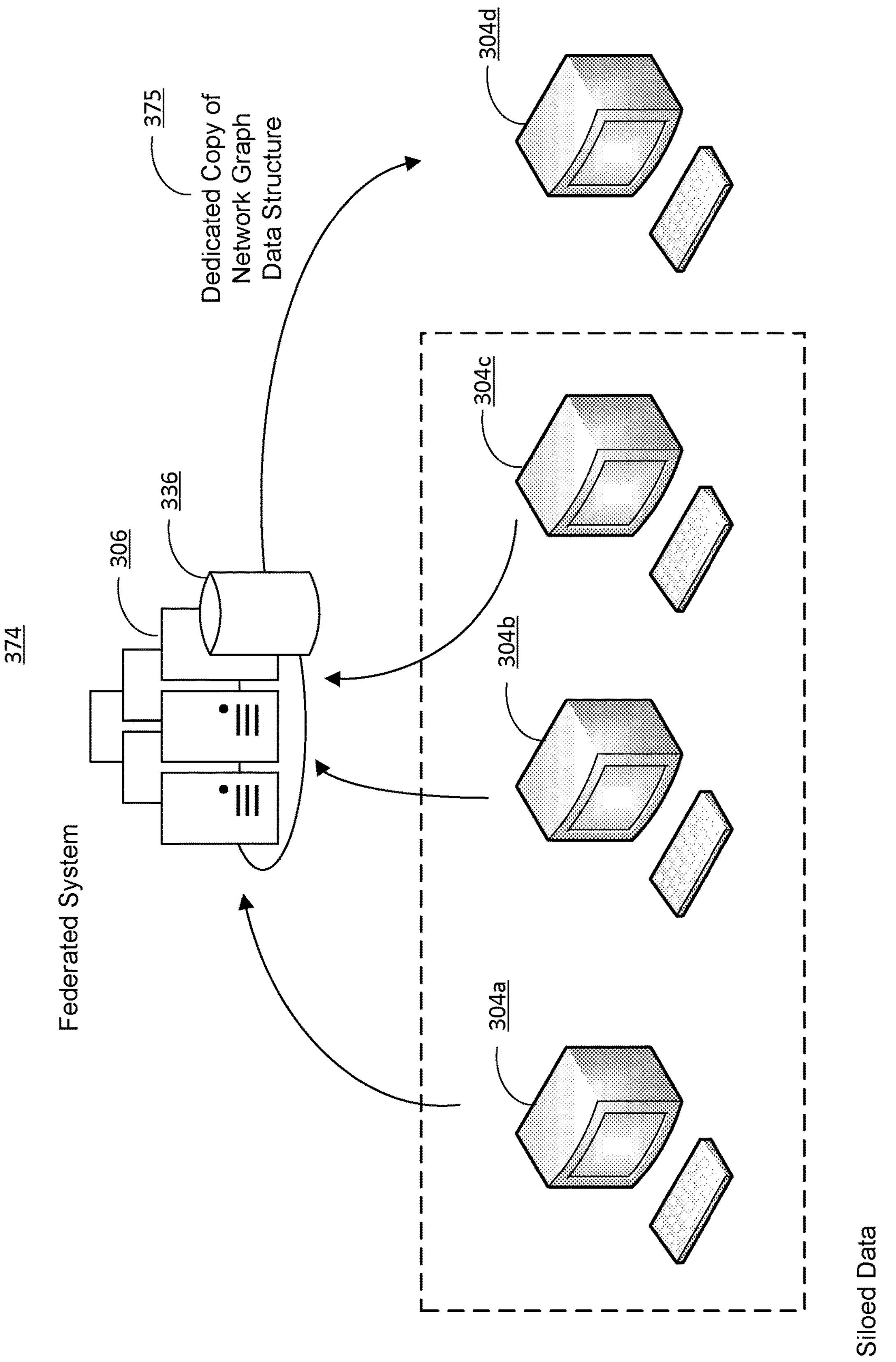
FIG. 3E illustrates a hub and spoke infrastructure for managing a network graph data structure that allows sharing of insights without transmission of sensitive data, in accordance with one or more embodiments.

To do so, in some cases, the data processing system 306 can implement a federated system that permits each participant to have their own private “spoke” in which their data is secure and safe, but where derived analytics can be shared across desired participants. FIG. 3E demonstrates such a hub and spoke federated system 374, where all participants benefit from the derived analytics but sensitive information stays only with the participant that owns the information. Every participant can have a private enclave, in their jurisdiction of choice, where only they can see the entirety and fidelity of the data they put into the platform. Such participants are depicted in FIG. 3E as computing devices 304*a-c*, respective. Product details such as names, revenue, bills of materials, costs, supplier and customer experiences, and analytics on their supply chain are always private, never shared and only exist within each enclave. Third-party data procured by participants such as ESG scores, revenue importance, and custom calculations similarly privately enriches the individualized deployments. This functionality allows participants to wire in their own private information to the network graph data structure so they see a unified view of their world connected into the global map. Each participant benefits from seeing their data, kept for their private usage in their private enclave, bound to more visibility than any one country, let alone one company, has access to.

The data processing system 306 can leverage both classic machine learning and modern deep learning, including graph based approaches. Table 1 below provides an example of transformations of raw messy shipment information into canonicalized standardized representations.

| Type | Original raw text | Canonicalized representation |
|---|---|---|
| Company | from warehaus rivilogistics by Globex | Globex |
| Company | Акме Ко вКазахстане | Acme Co. |
| Address | 2 a calle 8 s n 53370 naucalpan de juarez naucalpan de juarez | Calle 8 No. 2 A, Industrial Alce Blanco, Naucalpan De Juarez, Mexico, 53370, Mexico |
| Product | Ladies 90% cotton 7% tencel 3% elastane woven denim pant | 6204.62.8011 (US Harmonized Tariff System Code) Articles of apparel and clothing accessories, not knitted or crocheted - women's or girls' suits, ensembles, suit-type jackets, blazers, dresses, skirts, divided skirts, trousers, bib and brace overalls, breeches and shorts (other than swimwear): - trousers, bib and brace overalls, breeches and shorts: of cotton: - other: other: other: other - other: women's trousers and breeches: blue denim (348) |
| Product | كواشف تحديدفئات وفصائلأو عوامل الدم | 3006.20.00 (Gulf Cooperation Council Harmonized System Code) منتجات الصيدلة:محضرات وأصناف صيدلة مذكورة فـي الملاحظة 4 من هذا الفصل: ـ كواشف تحديد فئات وفصائل أو عوامل الدم \| Blood-grouping reagents |

Participants can publish and share minimal information on linkages to allow mutual engagement and tracing of value chains. By sharing this minimal information on linkages, all participants can benefit from connectivity of the network graph data structure 336—the ability to traverse through multiple tiers. This connectivity can provide essential value to all participants, as it allows the participants to understand and manage their value chains across all stages of production. For this reason, the network graph data structure 336 can enable a collaborative supply chain graph, while preserving contributors' privacy, and competitive advantages.

The shared graph of intelligence assembled via the hub and spoke architecture can be constructed from documents with erroneous or woefully incomplete information. They frequently lack the detail necessary to go down to the part-site level. The data processing system can extract signal from the noise through the following steps: (1) recognizing and matching entities such as companies, addresses, ports, and products in many languages, robust to misspellings; identifying and correcting erroneous information, such as incorrect addresses, values, product categories (e.g., HS codes), and more; (2) imputing missing information, whether that is missing product categories, address components, values, or otherwise; and (3) solving these challenges can involve state-of-the-art machine translation, entity resolution, link resolution, deduplication, cross-linking of information, and domain specific optimizations to connect the data together in both a granular and scalable manner.

The data processing system 306 can perform the following operations to generate Table 1 and similar tables:

- map the raw fields to standardized fields;
- use one or more artificial intelligence (AI) systems to parse fields with multiple values (e.g., name+address) concatenated into one field;
- use AI systems to structure unstructured fields (e.g., address not structured by administrative granularity) into structured representations (e.g., a structured address);
- use AI driven search systems to take obscure/opaque/vague descriptions and expand them (e.g., take a goods description that is just a parts number from a company specific parts database and replace it with a detailed description of that product); and
- use AI systems to match to canonical representations based on a semantic understanding of the entity (e.g., company, address, product) regardless of what language/misspellings it has.

The data processing system 306 can perform this canonicalization based on the features (textual, numeric, categorical, graph) and contextual information such as involved parties, involved products, etc., in the raw document. The end result is both a canonical description of the entity and a canonical ID by which the entity can be referenced. If no canonical entity already exists, the data processing system 306 can create one.

The data processing system 306 can identify and correct erroneous or missing information functions in a similar manner. For example, the data processing system 306 can use AI systems to predict the field's information. If it differs from the provided original information, the data processing system 306 can flag and correct the discrepant information (e.g., an erroneous product code or monetary value). If it's empty, the data processing system 306 can predict the correct value. In both cases, there is a measure of confidence in the prediction that is calibrated for at least a threshold accuracy/quality. One particularly notable correction is for supplier addresses. In some cases, customers have supplier lists that either have no address information or provide the supplier's HQ, not the true production facility address. The distinction, and the data processing system 306's systemic correction of this error can be used accurate construction of part-site specific value chains.

Users of the network graph data structure 336 may customize the network graph data structure 336 with their organization and user-specific information. Users may do so, for example, through:

1. Addition of organization-specific scores and values: For example, internal parts numbers for products, ESG scores for different facilities, previous return rates on investment in trade financement.
2. Organization/user-specific groupings of entities: the ability to group multiple entities (e.g., companies, facilities, products) represented in the network graph data structure into one grouping. For example, an organization may wish to see all the activity of a given supplier cohort grouped together, ignoring distinctions between the underlying companies.
3. Attachment of source documents and files: Backing files serving as backing information for the entities.
4. Storage of notes: Specific additional information provided by users and organizations on the entities.

The data processing system 306 can provide above capability in customer private-enclave-specific (e.g., spoke specific) instances. In doing so, the data processing system 306 can provide each customer with the capability to customize the network graph data structure 336 as necessary for their organization. The sensitive information described herein may stay in each private deployment and, in some cases may never transmitted back to the hub.

Additionally, understanding physical production and acting upon the physical production can require understanding the steps from raw material extraction through final distribution. Within their private enclave, customers may have their bill of materials for their products. However, they may not have the recursive bill of materials—the inputs for their inputs or the inputs resulting from their outputs. This information may be required to understand the original and intermediate processing that led to the product, as well as the intermediate and final consumption, as illustrated in FIG. 3D.

To construct this understanding, the data processing system 306 can integrate, in the private enclave, the customer's bill of material information. Combined with the customer's supplier list, this gives the first tier understanding of production facilities and inputs for each customer product. Then, the data processing system 306 can apply an AI-based understanding of input-output relationships to understand value chains to understand the network of production conditional on the good being produced. The data processing system 306 can use the network graph data structure 336 to filter a set of relationships to only include the value chain for a vehicle gearbox, for example, while disregarding all irrelevant links and associations related to other goods at the same facility. The data processing system 306 can do so by producing and applying a recursive map of the relationship between inputs and outputs, a function estimating the "bill of materials" for all physical goods. Using deep learning, graph information/modeling, and generative AI, the data processing system 306 can derive this input-output relationship for all goods, thus allowing the refinement of site-specific exchange of goods to be conditional on specific products. This understanding can then be refined, in some cases, by a human collaborating with internal and external parties.

The resultant graph of global value chains may be, post-harmonization, gigantic in size, in some cases including billions of transactions linking 100*s* of millions of entities. The data processing system 306 can identify the most relevant parts of the network graph data structure, individual entities, shipments or sub-networks ("sub-graph data structures") involving companies, addresses, products, shipments, ports. The data processing system 306 can do so using cutting edge AI, exceptional engineering, deep product understanding, and insightful design to achieve these tasks. The underlying systems and industrial ecosystems represented by the network graph data structure are complex, and easy answers are uncommon. The data processing system 306 can implement the systems and methods described herein to generate and process the network graph data structure 336 for:

Compliance: Complying with and enforcing environmental (e.g., Scope 3, deforestation, etc.), human rights (e.g., forced labor), tax/tariff/duty, export controls, sanctions, national security, and other laws and regulation across multiple country's regulatory environments.

Sourcing and procurement: Analyzing existing and potential suppliers and buyers at scale across 10*s* of thousands or more relationships.

Resiliency: Proactively and reactively understanding potential disruption to value chains at the scale of multinational corporations or nations. Analyses include understanding bottlenecks, exposure to current or potential adverse events (e.g., a factory being destroyed), multi-tier exposure to geopolitically risk geographies, and more. Such resiliency is critical to continued corporate operation as well as economic and national security.

Insurance: Usage of the above resiliency information to offer and price novel forms of business-interruption coverage. Understanding resiliency at scale enables origination and pricing of insurance that could not profitably previously be offered due to lack of information on the extended value chain. Contingent business interruption insurance, insuring against extended disruptions in the value chain, was previously unavailable at desired volumes due to the difficulty of understanding extended value chain relationships. Insurers can now offer such insurance while understanding extended risk and concentrations, and insureds can benefit from the surety that such insurance brings.

Trade facilitation and prevention of illicit activity across borders: Logistics parties, multinational corporations, and governments can collaborate together to ensure facilitation of legitimate cargoes and targeting of illicit activity. Positive value chains are promoted and aided in filing of required paperwork, negative value chains (such as narcotics production) are impeded.

The data processing system 306 has several features that facilitates generation and processing of a network graph data structure that represents a real-time version of multiple value chains. For example, the data processing system 306 can use security features such that the represented data remains safe using information security programs, secure software development lifecycle, and segmenting customer accounts. The data processing system 306 may be deployed into various secure environments across the globe. These controls help service the goal of securing data.

Another advantage is that the system supports granular role-based access controls to put individual organization's administrators in control of who in the organization can see which details, as well as external collaboration with other parties.

In some cases, in the context of sensitive applications, the data processing system 306 can support selection and vetting of which specific users (e.g., government-associated users) can access private deployments. The most standard use case is for public sector deployments where all access must be done by vetted/security-cleared individuals, often from that nation.

In some cases, the data processing system 306 may never share raw data between spokes without explicit instructions for collaboration between trusted parties. The default may be that no direction is enabled. Rather, the system can facilitate sharing of network visibility, analytics, and shared AI models without moving raw data.

The data processing system 306 can provide individual customers a private enclave where they, and only they, can see the entirety of the data their organization puts into the platform. Product details such as name, revenue, bill of materials, costs, supplier and customer experiences, and analytics on the customer's supply chain are always private, never shared and only exist in the private enclave. They are processed and harmonized with the network graph data structure's broader multi-tier view while remaining within that individual enclave.

To facilitate the value chain network function, and connections between buyers and suppliers in multi-tier value chains, the data processing system 306 can facilitate minimal linkages necessary for engagement. After normalizing and canonicalizing the entities to the network graph data structure in the private-enclave, the data processing system 306 can anonymously connect the minimal details of a supply chain linkage to the central network graph data structure. These details include: the sender and receiver companies and locations; an intentionally vague description of the goods such as an HS code or summarized description; and the month of the transaction.

The source of the derived links derived via this canonicalization and anonymization may not be revealed to any other clients. This shared intelligence may allow each customer to in turn receive and connect to linkages provided by others.

The data processing system 306 can be, include, or otherwise interact with a federated learning system to generate the network graph data structure 336 and generate metrics and intelligence across users or entities. Federated learning is a field of machine learning focused on how to learn in a privacy preserving manner that does not share nor combine data. One example of use of federated learning is customization of suggestions when an individual types on a cell phone. The system learns across many devices by learning on the device and never transferring the raw data, only the trained model, back to a central hub. All users thus benefit without ever sharing any typing history such as passwords, loved ones' names, or full messages back to the cloud.

The data processing system 306 can implement federated learning across a number of features of generating and processing the network graph data structure 336. In doing so, the data processing system 306 can preserve user privacy while providing the benefits of aggregating data from a large number of data sources. Examples of how the data processing system 306 uses federated learning include the following:

Value chain construction: Many facilities receive shipments of coffee, but these are very unlikely to be relevant to a particular product's specific value chain for any product that is not in the coffee category. As such, the data processing system 306 can implement a process which smartly builds product value chains from the network graph data structure creating specific and granular understanding down to the material category, type of input (e.g., ingredients, capital goods, packaging). Customers can engage and refine these value chains which further contributes to quality of this machine learning construction. The customer provided feedback, as well as rich product descriptions, and relationships may all be private to the users that provide the data. The data processing system 306 can train across the feedback on those classifications in a privacy preserving manner and such that each user may benefit from other customers' refinements. This technique has shown significant improvement in quality of value chain construction both within and across industries when compared to expert review.

A value chain can be constructed as a network graph data structure to provide the technical foundations of value chain management. The network graph data structure can be used to identify missing information or deficiencies and identify risk probabilistically. Users can collaborate in a risk/impact-oriented manner on top of the network graph data structure For example, the network graph data structure 336 can be used to generate or support product passports and trade facilitation.

Harmonized System (HS) Classification: Assigning HS codes to products may determine tariff rates and other global trade related requirements. Determining the appropriate HS code for a product is difficult, however, and most practitioners outside of customs don't know how to classify products correctly. The data processing system 306 can include suite of tools for both assigning HS codes to products as well as explaining these according to the general rules of interpretation, and using previous CROSS/BTI rulings to support a classification. To properly do this requires detailed product descriptions that are private to individual users. As such, the data processing system 306 can use federated learning to achieve these processes, while preserving the privacy of users' information, and enabling users to benefit from other users' refinements of the classifications.

Tariff/duty calculation: assessing the correct tariff requires calculation based on the HS code, the country of origin, free trade agreement qualification, input material origin, and similar. The data processing system 306 uses federated learning to assemble all this information without compromising data privacy and security Free trade agreement qualification: similarly, qualifying for a free trade agreement requires multi-tier understanding of the value chain of the goods, the companies, facilities, countries, and processes involved, and the production of a certified representation of the good's production and certification. The data processing system 306 uses federated learning to assemble all this information without compromising data privacy and security Trust scores: Shipment fraud and illicit goods may affect all players in the logistics and shipping space. To facilitate cross border trade, the data processing system 306 can generate a trust score based on customers' shipment interdiction history, proximity to embargoes, shipper history, and other attributes. These details may be private to customer relationships, however, all participants in the space would benefit from being able to identify contraband and smuggling better. The data processing system 306 can use federated learning across entities working in these areas to better identify shipment fraud and facilitate expedited clearance while preserving the privacy of specific customer history and never pooling any customer data together.

The hub and spoke of generating and processing the network graph data structure 336 can be applied for multiple internal departments/agencies to collaborate within or between governments. For example, the hub-spoke architecture described herein can facilitate secure collaboration within and across government agencies and governments themselves. The data processing system 306 can generate private copies of the entire architecture, and thus a private network/"intranet" of value chain information and collaboration may be generated. This architecture can thus enable collaboration between different departments/ministries without different rights to access different data. Furthermore, they can enable shared intelligence across national boundaries for sensitive national security and economic security use cases that require multi-national collaboration between cooperating/allied nations. Combined with the role-based access controls and government-ready secure deployments described above, the data processing system 306 can enable secure collaboration.

In some cases, the data processing system 306 may not synchronize any information, including derived information such as network visibility, analytics, or AI models, back to the hub from national deployments. In other words, national security users benefit from the platform provided by the data processing system 306 in support of their missions, and are given new abilities to collaborate with the private sector in service of security, economic growth, and resiliency through a shared source of truth, but maintain the classification levels and security of their agencies and departments.

In some cases, to preserve privacy and security, the data processing system 306 can transmit copies (e.g., versions, dedicated copies, dedicated version, etc.) of the network graph data structure 336 to the different computing devices 304 of the hub-and-spoke system. The copies can be dedicated copies for the respective computing devices 304, such that the computing devices 304 only receive data that the computing devices 304 are authorized (e.g., via stored permission of profiles for the computing devices 304) to receives. For example, the data processing system 306 can generate a copy 375 of the network graph data structure 336. The data processing system 306 can generate the copy 375 by identifying the data of the network graph data structure, such as the types of data, edges connected with specific nodes, specific nodes, etc., that the computing device 304*d* is permissioned or authorized to receive, view, or access. The data processing system 306 can identify such data by applying a schema or a set of rules or permissions stored in a profile for the computing device 304*d* or the entity associated with the computing device 304*d*. The data processing system can use such permissions to retrieve that that the computing device 304*d* is authorized to access, and generate a copy 375 of the network graph data structure 336 only with the retrieved data. The data processing system can transmit the copy 375 of the network graph data structure 336 to the computing device 304*d*. In this way, the data processing system 306 can preserve the privacy of certain types of data for different nodes, while still providing different spokes of the federated system with access to the network graph data structure 336.

By implementing the systems and methods described herein, the data processing system 306 can generate a network graph data structure using a hub-spoke federated learning system with privacy preserving techniques to provide industry-wide insights while protecting confidential information.

Figure 3F:
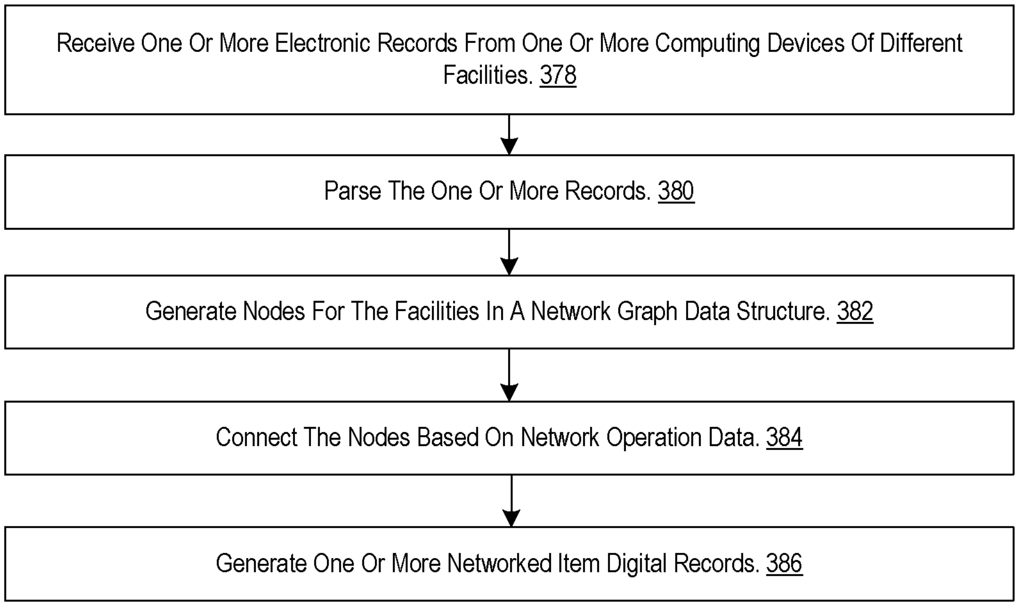
FIG. 3F illustrates an example flowchart of a process for network graph data structure-based transportation networking, in accordance with an implementation.

FIG. 3F illustrates an example flowchart of a process 376 for network graph data structure-based networking, in accordance with an implementation. A data processing system (e.g., the data processing system 306, shown and described with reference to FIG. 3A) can perform the process 376 to generate and/or update a network graph data structure representing the network between facilities for networked item transformation and/or transportation. The process 376 can include any number of operations or additional operations and the operations may be performed in any order.

At operation 378, the data processing system can receive one or more electronic records. The data processing system may receive the electronic records from one or more computing devices of different facilities that are involved in a network of value chains representing the transport and/or transformation of networked items.

At operation 380, the data processing system can parse the one or more electronic records. The data processing system can parse the records using natural language processing techniques and/or language processing models to identify specific entities or data included in the electronic records. The data processing system can store the parsed data in a database, such as a system of record that maintains the data for the network of value chains.

At operation 382, the data processing system can generate nodes in a network graph data structure. The data processing system can generate the nodes based on the electronic records and/or the parsed data such that each of the facilities corresponds to a different node in the network graph data structure. Each of the nodes can include node field-value pairs for different characteristics or attributes of the facilities represented by the respective nodes.

At operation 384, the data processing system can connect nodes in the network graph data structure. The data processing system can connect the nodes in the network graph data structure with edges. Each edge can represent a different network operation or transaction. For example, an edge between two nodes can represent transport of a networked item or component from one facility to another facility. The data processing system can generate any number of edges between pairs of nodes.

Each edge can be or include a data structure. The data structure can include data about the relationship indicated by the edge between the nodes. For instance, the data structure can include an identification of the networked item transported between nodes, a time and/or date of the transportation, a quantity, etc.

At operation 386, the data processing system can generate one or more networked item digital records. The data processing system can generate the networked item digital records in response to one or more requests to generate the passports, for example. The data processing system can generate a networked item digital record by identifying one or more nodes or sub-graph data structures of the network graph data structure to include in the networked item digital record. The data processing system can identify such nodes or sub-graph data structures based on identifications of the nodes or sub-graph data structures in a request. The data processing system can generate the networked item digital record to include identifications of each of the identified or nodes or sub-graph data structures and/or the data structures of the nodes or sub-graph data structures themselves. In some cases, the data processing system can include an identification of a networked item profile or the networked item profile itself in the networked item digital record. The data processing system can generate and store such networked item digital records in the network graph data structure or a separate database in a file. Subsequently, the data processing system can transmit the networked item digital record to another computing device to either provision the computing device with access to the data structures (e.g., the nodes, the networked item profiles, the sub-graph data structures, etc.) identified in the network graph data structure and/or provision a copy of the data structures included in the networked item digital record to provide a view of the data represented in the networked item digital records.

Implementations of the current solution provide systems and methods of addressing technical challenges in network systems, focusing on the real-time construction of node graphs, faster and more accurate data retrieval methods, federated system controls, and communication across network systems. First, the solution tackles the complexity involved in representing large-scale permutations of input-output relationships within node graphs. These graphs can be constructed in real-time and accommodate dynamic updates to maintain an accurate end-to-end matrix of relationships. Second, improvements to data retrieval processes are implemented by structuring node graphs into sub-graph data structures that represent specific value chains for specific networked items across networking systems. These improvements allow for targeted access to pertinent data and reduce computational overhead through intelligent navigation and traversal of the edges of the graph. Federated systems offer data privacy by implementing controls over node graph sharing. Data can be segmented within private enclaves, accessible only to authorized entities, while insights are shared without the transmission of raw or proprietary data. Furthermore, the architecture facilitates seamless communication and collaboration between systems and users across value chains over the complex network. This configuration enables efficient data updates and retrieval over the network, providing real-time synchronization, reduced latency, and improved coherence within interconnected systems.

The technological problem addressed by real-time construction of a node graph centers on the complexity and scalability of mapping intricate input-output relationships within large-scale systems. Conventional systems often encounter difficulties when attempting to represent the extensive permutations of transactional and procedural interactions across an entire network. As such, limitations in processing capabilities hinder the ability to produce comprehensive and dynamic models, resulting in fragmented or incomplete depictions of these relationships. This constrains computing device ability to analyze, plan, and improve processes across large scale networks and systems that are useful for more efficient operations.

The techniques described herein provide a technical solution through the development of a node graph architecture designed for real-time integration and analysis of large data sets. This architecture can dynamically construct node graphs that encapsulate different permutations of input-output connections within an end-to-end framework. Advanced algorithms can be deployed to continuously update and reconcile the graph structure as new data inputs become available. This includes identifying and relating comprehensive network nodes, allowing the system to seamlessly integrate diverse data points and maintain an up-to-date, accurate representation of the large scale network that continuously grows and changes.

The implementation of real-time node graph construction results in several technical enhancements. This construction provides continuous data integration into the node graph with continuous updates to the nodes and the edges between nodes within the node graph, ensuring that systems have up-to-date information streams. Accordingly, the construction can eliminate or reduce latency in data availability. The node graph structure facilitates efficient data indexing and retrieval, allowing for faster access to pertinent system relationships than conventional systems data storage and retrieval techniques or data storage and retrieval techniques that involve a node graph data structure. This capability can facilitate swift propagation of updates across the system, thus enhancing the system's responsiveness and scalability.

The technical problem addressed by improving data retrieval in node graphs entails the inefficiencies and inaccuracies associated with accessing relevant information from complex graph data structures. Conventional methods of data retrieval can struggle to efficiently navigate vast graph networks, especially when attempting to extract pertinent details related to sub-graph data structures that represent specific value chains. These challenges arise from redundant or unoptimized search processes, which often lead to increased retrieval times and higher computational costs, while failing to effectively pinpoint or prioritize the most relevant data subsets necessary for analysis.

The techniques described herein offer a technical solution by implementing advanced data retrieval through the structure of node graphs, particularly focusing on sub-graph data structures within these networks. This solution includes algorithms that can intelligently navigate the node graph, identifying sub-graph data structures that correspond to specified value chains or sub-graph data structures. Such algorithms can improve search paths and employ heuristic techniques that reduce retrieval time and computational overhead. By structuring data access around the segmentation of the graph into sub-graph data structures, the system can more efficiently target and extract relevant information.

The improved data retrieval techniques yield several technical enhancements in accessing and utilizing specific subsections of a broader node graph. These techniques increase the precision of data query results, ensuring high accuracy by effectively filtering out irrelevant data points. They also enhance retrieval efficiency and accuracy that reduce query response times, allowing fast access to relevant data subsets. This facilitates real-time data analytics capabilities, enabling systems to quickly process and analyze specific value chain segments. The improved retrieval mechanisms support enhanced data throughput and minimize bottlenecks in information processing, contributing to the system's overall responsiveness. Additionally, these techniques improve and/or optimize computational resource allocation by minimizing data redundancy and ensuring efficient utilization of processing power across networked system.

The technical problem associated with federated systems and the control over node graph sharing arises from the need to balance collaborative data integration against data privacy and sovereignty constraints. In traditional centralized data systems, sharing comprehensive data sets poses risks to confidential information and often violates regional data protection regulations. As organizations engage in shared networks, the challenge is to allow effective collaboration while ensuring that sensitive elements of the node graph remain protected and are only shared with authorized entities.

The techniques described herein introduce a federated system architecture designed to control specific node graph sharing, thus mitigating privacy concerns while still facilitating collaborative benefits. This system can segment the node graph into isolated private enclaves for each participant. Within these enclaves, data remains secure and local, accessible solely to the owner. Federated learning techniques are employed to derive shared insights without actual data transmission, enabling the selective sharing of insights rather than raw data. The system allows participants to define granular sharing controls, specifying which segments of the node graph are accessible and under what conditions, ensuring alignment with privacy and regulatory standards.

The implementation of federated systems with controlled node graph sharing results in several technical improvements. These systems uphold robust data privacy through decentralized data management, minimizing the risk of exposure by keeping data within local storage environments. By utilizing federated learning, the system aggregates insights without raw data transfer, maintaining data integrity and sovereignty across network nodes. This decentralized approach reduces the attack surface for potential breaches, significantly enhancing system security. Additionally, the architecture enables seamless integration of proprietary data into a collective analytical model, optimizing inter-organizational data processing without compromising the proprietary data. This configuration allows for efficient parallel processing and model refinement, facilitating advanced analytics and machine learning applications across distributed environment The technical problem in networked systems, particularly within the context of systems operating across the value chain, is the challenge of seamless communication and data exchange with a central system. Traditional networked systems often experience latency, data inconsistency, and bottlenecks when numerous disparate systems attempt to update and retrieve information over a central network. These issues are exacerbated by the scale and complexity inherent in value chains, which traverse multiple entities and geographical locations, necessitating robust and efficient communication mechanisms to maintain coherence and synchronization of data across the network.

The techniques described herein propose a technical solution through the implementation of an advanced graph node architecture that facilitates efficient communication between systems across the value chain and a central system. This solution can involve configuring the central system as a nodal hub, where each node in the architecture represents specific entities or processes within the value chain. Alternatively, the solution can involve configuring decentralized nodes that communicate with no central hub, achieving decentralized communication and privacy. These nodes are interconnected in a manner that reflects the actual input-output relationships, allowing for streamlined data propagation and retrieval. The architecture can employ algorithms that dynamically adjust node connections based on network traffic, ensuring optimized data routing that minimizes latency and improves overall efficiency.

The implementation of a graph node architecture within networked systems enhances several technical aspects across the value chain. First, the architecture enables real-time data synchronization, reducing discrepancies and mitigating the risk of data inconsistency. This facilitates immediate data availability, enhancing the precision of analytics and decision-support systems. Second, the intelligent routing algorithms adjust node connections dynamically, which optimizes data flow and reduces latency throughout the network. This results in faster data processing times and improves system responsiveness under varying load conditions.

Additionally, the architecture inherently supports fault tolerance by maintaining alternative pathways for data communication in the event of a node failure, thereby ensuring continuous operation and system reliability. Overall, the advanced graph node architecture strengthens the technical infrastructure needed for efficient data exchange, contributing to a more robust and agile value chain network.

The technical problem associated with tracking real-world events, processes, and occurrences, such as the production and transportation of goods within a graph node system, stems from the complexity of accurately representing and managing the dynamic and interconnected nature of these physical activities. Traditional systems often lack the capability to integrate multiple aspects of physical processes, such as changes in location, status, and characteristics, within a cohesive and responsive framework. This leads to inefficiencies in monitoring the transformation and movement of goods, making it challenging to manage logistics, ensure compliance with transportation restrictions, and capture the nuanced transformation characteristics of inputs into outputs.

The techniques described herein provide a technical solution through the implementation of an intelligent node graph system that can model and track the multifaceted nature of networking events in real time. The system can use advanced data analytics to map and update each node's attributes as networked items progress through various stages of their lifecycle, such as from creation, through transportation, to final transformation. Each node within this architecture can represent specific goods, transportation modes, or transformation processes, capturing relevant data points, such as location, condition, and transformation metrics. This setup allows the system to dynamically allow or restrict transportation based on predefined criteria and regulatory requirements, integrating these constraints into the decision-making functionality governing the network.

The implementation of this graph node system results in several technical effects useful to managing physical processes. The system enhances data acquisition and integration capabilities by providing precise real-time updates of physical attributes and changes within the network. This significantly improves monitoring accuracy by reducing dependency on manual tracking, thereby minimizing tracking errors. The architecture supports the orchestration of logistics operations by facilitating data-driven adjustments and enabling instantaneous data updates to relevant nodes. Automated enforcement of restrictions through system integration enhances compliance and regulatory adherence within the network. The standardized data framework within the system supports interoperability across different technological platforms, facilitating seamless data exchange and system integration. Overall, the system optimizes computational resources by structuring heterogenous data inputs into a cohesive, scalable architecture, improving the overall reliability and efficiency of monitoring events and processes.

The technical problem related to enabling collaborations between users on a graph network while tracking products lies in the challenge of facilitating seamless and secure data exchanges among diverse entities. Traditional systems struggle with synchronizing real-time updates and ensuring compatibility across different data formats. Moreover, protecting sensitive information while still allowing effective collaboration presents a significant technical hurdle. These issues can lead to inconsistencies and inefficiencies, impacting the effectiveness of the collaborative workflow.

The techniques described herein offer a technical solution through the development of an advanced graph network architecture. This architecture supports secure, real-time collaboration by employing cryptographic protocols and robust access controls, ensuring that data confidentiality is maintained. It provides mechanisms for integrating diverse data inputs into a cohesive structure, enabling consistent updates and data visibility across the network. By implementing dynamic access controls, the system can facilitate efficient information sharing that aligns with user roles and collaborative activities.

The implementation of this collaborative graph network results in several technical effects. The system ensures real-time data synchronization across users, minimizing discrepancies and enhancing the consistency of information. Secure data exchange can be facilitated through encryption and access control measures, restricting access to authorized users and preserving data confidentiality. The architecture integrates disparate data inputs into a unified format, enhancing data coherence across various systems. Additionally, adaptive management of user permissions through dynamic access controls enables efficient collaboration, ensuring data sharing aligns with security policies. These improvements contribute to a more resilient and efficient framework for tracking products and facilitating user collaboration within the graph network.

The implementations of embodiments of the present solution results in several technical advancements that significantly enhance system capabilities. Improved data retrieval algorithms ensure high accuracy and reduce query response times, facilitating real-time analytics. Intelligent node graph constructions can enable continuous data integration, precise monitoring, and efficient parallel processing, improving resource allocation and system responsiveness. Federated systems can uphold data privacy while allowing collaborative information sharing, enhancing system security and integrity. Advanced graph node architectures can provide real-time synchronization and fault tolerance, contributing to robust data exchange across the value chain. Systems for tracking physical events and facilitating user collaboration improve monitoring accuracy and regulatory compliance while supporting seamless data integration and communication. Overall, these solutions collectively optimize system reliability, efficiency, and the technical infrastructure needed for streamlined operations across complex network systems.

D. Systems and Methods for Reduced Computer Resources and Faster Traversal when Querying a Network Graph Data Structure using a Matrix in a Computer-Readable Array Format A computing system can maintain a network graph data structure that models a set of relationships and interactions between entities. The network graph data structure may store a network of nodes and edges, where the nodes represent entities such as people, organizations, devices, or processes, and the edges represent the relationships or operational interactions (e.g., network operations) between those entities. For example, a node may represent a manufacturing entity that receives inputs from various input nodes representing supplier or input entities, and the node may use the inputs to generate a networked item. In some instances, the node may use the inputs in different quantities to generate the networked item. For example, the node may receive a first quantity of first input from a first input node and a second quantity of second input from a second input node, and may generate the networked item using the first quantity of the first input and the second quantity of the second input.

There may be a certain amount of emissions (e.g., carbon emissions) associated with generating networked items. For example, the manufacturing entity may use one or more technologies to process the inputs received from input entities and generate an output (e.g., a product). In some instances, a computing system tasked with calculating the emissions associated with a node may not have access to certain information associated with the input nodes. For example, the computing system may only have access to information associated with operations of the node when calculating emissions. This may cause the system to overlook emissions caused by input nodes when calculating emissions, thereby causing inaccurate emissions calculations for nodes. Further, this may restrict manufacturers from being notified of input entities associated with above average emissions values, thereby stalling emissions improvements for manufacturers seeking to replace higher-emissions input entities with lower-emissions input entities.

In some instances, querying a network graph data structure may present certain technical challenges. As the number of nodes and edges in the network graph data structure increases (e.g., as the computing system ingests electronic records regarding network operations and/or nodes), recursively traversing the network graph data structure to track relationships between nodes and aggregate attributes can become computationally expensive. For example, each query may require a server to access and/or process large subgraph data structures, join data from a plurality of network entities, and perform calculations using large datasets. As a result, querying the network graph data structure may result in high latency and high computational resource consumption as the server traverses the network graph data structure. Additionally, given the increasing size of the network graph data structure, the computing system may retrieve irrelevant data that can operate as noise or improperly bias any processing of the retrieved data. These technical challenges may be emphasized when network graph data structures are queried to calculate emissions values for networked items generated by entities of the network graph data structure, as emissions of the various inputs used to generate the networked items may be considered in addition to entity-generated emissions when generating the networked items.

To address these limitations, a computing system can use a network graph data structure that models an emissions chain associated with a node and its corresponding input nodes for generating a networked item. For a given node, the computing system may identify a matrix identifying quantities of inputs and outputs of a network operation used for generating the networked item. For example, the matrix may indicate a quantity of a first input and a quantity of a second input needed to generate a quantity of a first output. The computing system may identify a plurality of input nodes connected to the node by a plurality of edges. For example, the computing system may identify a first input node to supply the first input and a second input node to supply the second input to the node. The computing system may generate weights for the input nodes based on the quantities of inputs that the respective input nodes supply to the node. For example, the computing system may generate a first weight for a first input node that provides a first portion of an input to the node, and a second weight for a second input node that provides a second portion of the input to the node. The computing system may use the matrix and the weights to generate an emission value associated with the networked item that considers emissions caused by both the input nodes and the node when generating the networked item.

By using matrix data structures in a computer-readable array format to guide queries of the network graph data structure, the systems and methods described herein may improve querying efficiency with respect to querying network graph data structures. By encoding the quantities of inputs and outputs of each node as a matrix, the system can rapidly access and process relevant data without having to repeatedly traverse or join complex subgraphs of the network graph data structure. For example, the matrix data structures may allow the computing system to leverage array-oriented operations, which may be faster and more resource-efficient than recursive graph traversal. As a result, the overall latency and processing overhead associated with emissions querying may be reduced.

Figure 4A:
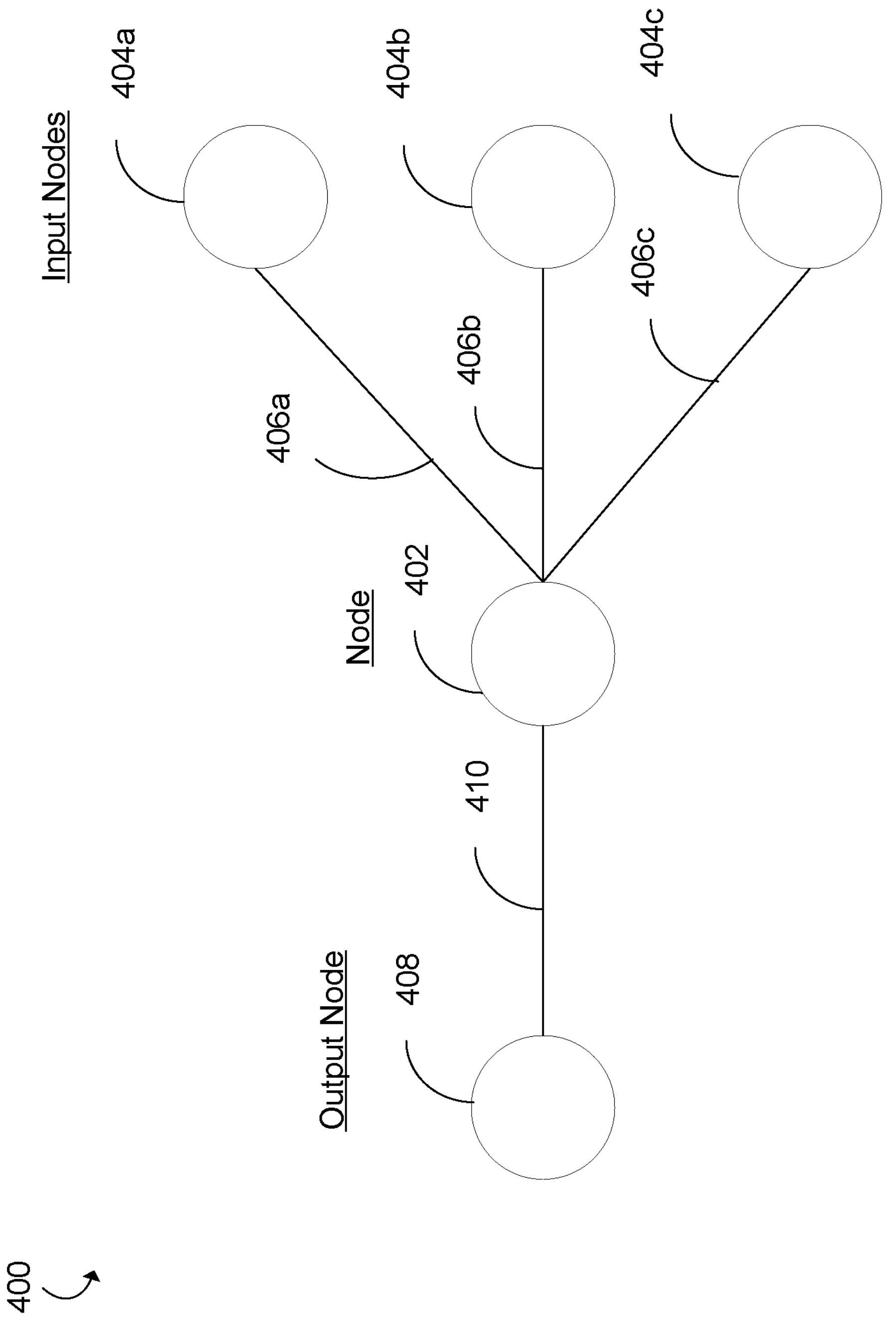
FIG. 4A illustrates a network graph data structure associated with emissions values for networked items, in accordance with one or more implementations.

FIG. 4A is a sub-graph data structure 400, according to some implementations. In some implementations, the sub-graph data structure 400 may include one or more features of the network graph data structure 336 with reference to FIGS. 3B and 3C and/or the features of the sub-graph data structure 372 with reference to FIG. 3D. The sub-graph data structure 400 can represent supply and consumption tiers for generating or creating networked items and then distributing the generated networked items. For example, the sub-graph data structure 400 can include input nodes 404*a-c* (also referred to collectively as "input nodes 404") that provide inputs to node 402 as indicated by edges 406*a-c* (also referred to collectively as "edges 406"). As another example, the sub-graph data structure 400 can include node 402 that distributes generated networked items to output node 408 as indicated by edge 410.

The sub-graph data structure 400 may represent the generation of a networked item to the output node 408. In some implementations, each node and edge within the sub-graph data structure 400 can be associated with one or more emissions attributes that quantify the emissions resulting from a particular process or material transfer associated with the respective node or edge. For example, a node may include (e.g., encode) emissions data reflecting emissions associated with performing network operations representing transforming inputs from one or more nodes. As another example, an edge may include (e.g., encode) emissions data reflecting emissions associated with distributing outputs of nodes to other nodes. As referred to herein, emissions may include, but are not limited to, carbon emissions, sulfur emissions, air pollution, water pollution, or other emissions that are generated as a result of material production, processing, transportation, or distribution activities within the sub-graph data structure 400. As described herein, the emission attributes may be or instead be an environmental impact attribute, such as deforestation risk, water usage, biodiversity tracking, etc.

The node 402 (e.g., a location or facility of an entity represented by the node 402) may be configured to perform network operations. The node may correspond to a location of an entity in the sub-graph data structure 400. The network operation may involve transforming one or more inputs (e.g., from the input nodes 404*a-c*) into one or more outputs (e.g., to provide to the output node 408). As referred to herein, a network operation may encompass any activity or process that converts incoming materials or resources (e.g., natural resources, computational resources) into a different form, assembly, or product, such as a networked item. For example, the network operation may include or represent manufacturing, processing, or assembly activities. The network operation may be associated with emissions of varying scope. For example, the network operation may be associated with emissions directly attributed to the network operation, such as emissions from the consumption of resources during the network operation. As another example, the network operation may be associated with emissions attributed to off-site production of resources that are consumed during the network operations. As yet another example, the network operation may be associated with emissions attributed to upstream or downstream activities in the sub-graph data structure 400, such as the production and transportation of inputs to the node 402 and/or outputs from the node 402. Accordingly, emissions of some/all scopes may be considered when evaluating the emissions of the node 402, as described herein.

As shown, the node 402 may receive inputs from the input nodes 404*a-c* to apply to the network operation. The input nodes 404 may represent suppliers that provide various materials, components, or resources required for the network operation to the node 402. Each input node 404 may supply a distinct type and/or quantity of input, such as raw materials, intermediate goods, or other resources, which can be used by the entity (e.g., represented by the node 402) to generate the networked item. Each of the input nodes 404 may include (e.g., encode) emissions information. For example, an input node 404 may include emissions attributes that quantify the emissions associated with producing and delivering the supplied input. These emissions attributes can be based on the production technology, geographic location, and/or supply chain practices of the input node 404, thereby facilitating a context-based attribution of emissions to each input.

As shown, the node 402 may provide outputs (e.g., networked items) to the output node 408 as a result of the network operation. The output node 408 may represent a downstream entity in the sub-graph data structure 400 (e.g., value chain), such as a customer, distributor, or other entity that consumes the networked items produced by the node 402. The transfer of outputs from node 402 to output node 408 can be associated with additional attributes, such as information about the quantity and type of networked items transferred, and/or any emissions resulting from the distribution of the outputs.

As shown, the edges 406 and 410 may represent connections between nodes (e.g., the output node 408, the node 402, the input nodes 404) in the sub-graph data structure 400, and may indicate the flow of resources (e.g., inputs, outputs, networked items, etc.) between entities. The edges 406, which connect the input nodes to the node 402, may encode attributes such as the type and amount of input transferred, and/or emissions associated with the transportation and/or delivery of the inputs. The edge 410, which connects the node 402 to the output node 408, may include information regarding the output quantity, distribution details, and emissions generated during the distribution of networked items from the node 402 to the output node 408.

Figure 4B:
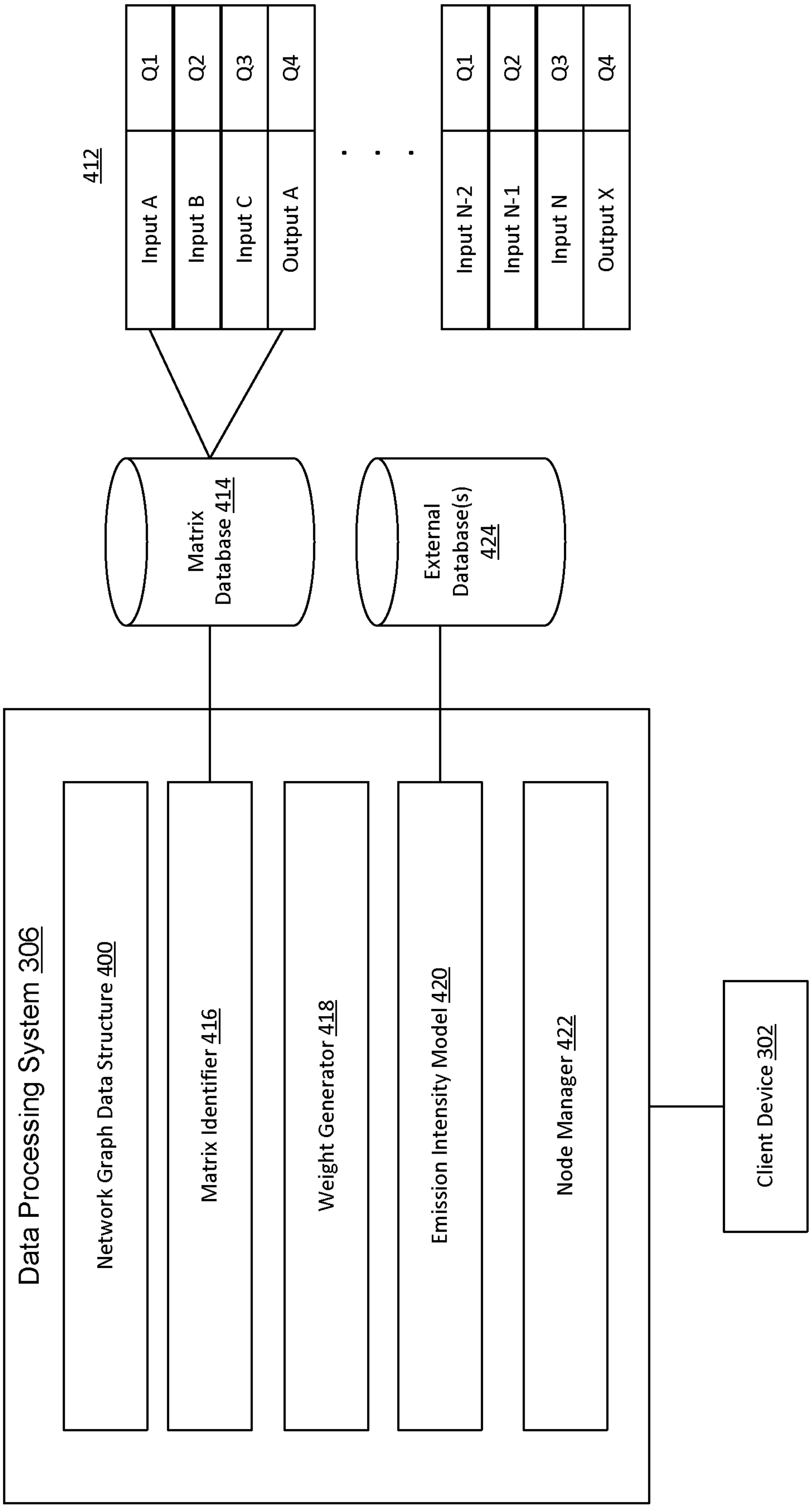
FIG. 4B illustrates an example system for querying a network graph data structure using constraints from another data structure, in accordance with one or more implementations.

Referring to FIG. 4B, the sub-graph data structure 400 may be hosted or maintained by the data processing system 306. In some implementations, components of the data processing system 306 may be capable of retrieving data from the sub-graph data structure 400 and/or other data structures (e.g., databases, data sources) available to the data processing system 306. As described herein, the data processing system 306 may use a matrix data structure to query and retrieve data from the sub-graph data structure 400, such as for evaluating the emissions of value chains represented by the sub-graph data structure 400. For example, the data processing system 306 may query the network graph data structure to retrieve emissions attributes from one or more nodes of the sub-graph data structure 400 and/or other data sources. The data processing system 306 can generate emission intensities of each of the nodes of the sub-graph data structure 400 using one or more models. The data processing system 306 can write flags (e.g., to the client device 302) into nodes of the sub-graph data structure 400 that are the high contributors to the emissions of the value chain. As shown, the data processing system 306 may be communicably coupled with a matrix database 414, one or more external databases 424 (e.g., hosted on remote computing devices), and the client device 302.

Referring to FIGS. 4A and 4B, the node 402 (e.g., the entity associated with the node 402) may perform a plurality of network operations. For example, the node 402 may receive various combinations of inputs from the input nodes 404, and may apply (e.g., perform, execute, etc.) a network operation using the inputs. The network operation may result in the node 402 generating an output, which may be a networked item. As such, each network operation of the node may be associated with distinct (e.g., discrete) sets of inputs, and result in a different output (e.g., a networked item, an instance of a networked item, or a component of a networked item, such as the final networked item of a sub-graph data structure to value chain). As an example, a first network operation for the node 402 may involve receiving a first quantity of first input from a first input node 404*a*, a second quantity of second input from a second input node 404*b*, and a third quantity of third input from a third input node 404*c*. The node 402 may apply the first network operation to the first input, the second input, and the third input, resulting in an output of a certain quantity of output for a networked item. For other network operations associated with the node 402, the node 402 may receive different quantities of different inputs from various input nodes 404, and may output certain quantities of various outputs.

The plurality of network operations associated with the node 402 (or other nodes of the sub-graph data structure 400) may be represented in or as a matrix 412. The matrix 412 may be encoded in a computer-readable array format, such as a list of two-dimensional arrays, a three-dimensional array table, or other structured data format that enables storage and processing of data of the network operations by the data processing system. The matrix encoded in the computer-readable array format can define, in advance of query execution, a constrained set of graph edges and nodes eligible for traversal for a given network operation. Because the matrix is stored in an array format, the data processing system 306 can access network operation data using direct array indexing rather than pointer-based traversal of graph edges, reducing cache misses and memory indirection during query execution.

In an example, the matrix 412 can include a list of network operations performed by the node 402. Each row of the matrix 412 can correspond to a different network operation and each column can correspond to an attribute of the respective network operations. For example, the matrix 412 can include rows for network operations performed or involving a particular node. The cells of the row created by intersections of the rows with columns can include attributes of the network operations, such as identifiers of the network operations, identifiers of the networked items of the network operations, identifiers to the nodes involved in the network operations, a quantity (or any other attribute) of the networked item, or any other attributes of the network operations. The identifiers of the network operations and/or the nodes of the network operations can operate as pointers that constrain querying the network graph data structure, such as by directly identifying locations that may be relevant for a particular query for data retrieval. For example, the matrix 412 can be used to identify network operations that correspond to a particular networked item. To determine an attribute for an output (e.g., an emissions value) of the node, the emission intensity model 420 can identify network operations in the matrix 412 that contain an identifier of the networked item corresponding to the output. The emission intensity model 420 can identify the identifiers of the network operations and/or nodes in the rows corresponding to the network operations. The emission intensity model 420 can use the identifiers to retrieve values that correspond to generate the value for the output. In doing so, the data processing system can avoid parsing every edge connected with the node when querying data pertaining to the output.

In an example, the network operations can correspond to different networked items. For each network operation of the node 402 corresponding to a particular networked item (e.g., a networked item generated in a value chain), the matrix 412 may indicate quantities of inputs (e.g., from the input nodes 404) to the node 402 and quantities of outputs generated by the node 402 using the inputs. Regarding the inputs, the matrix 412 may indicate the input node 404 corresponding to each input, the type of input being supplied, and/or the quantity of input being supplied. For example, for a given network operation, the matrix 412 may specify that a first input node 404*a* provides a first amount of an input A, a second input node 404*b* provides a second amount of an input B, and a third input node 404*c* provides a third amount of an input C. Regarding the outputs, the matrix 412 may indicate the type and/or quantity of output (e.g., networked item) generated by the node 402. For example, the matrix 412 may indicate that the first amount of input A, the second amount of input B, and the third amount of input C results in a fourth amount of output A.

Each node in the sub-graph data structure 400 may be associated with at least one respective matrix 412 (e.g., as a matrix data structure). Each matrix 412 may be stored in a matrix database 414. The matrix database 414 may be stored in at least one of a computing device, a remote server, a server bank, a remote device, and/or other possible computer hardware and/or computer software with storage capabilities. For example, the matrix database 414 may be a data repository, a data structure, or a storage system configured to organize an index (e.g., by identifiers of the respective nodes) each matrix 412 of the sub-graph data structure 400. In some implementations, the matrix database 414 may be accessible to one or more components of the data processing system 306. For example, the data processing system 306 may retrieve a matrix 412 from the matrix database 414 for processing. As another example, the data processing system 306 may update (e.g., modify, add, remove) a matrix 412 based on changes to the sub-graph data structure 400, such as based on the node being involved in another network operation.

In some implementations, the matrix database 414 may be indexed using identifiers of the respective nodes of the sub-graph data structure 400 and/or identifiers of the network operations of the respective nodes. The identifiers can facilitate querying the matrix database 414 based on the nodes for which the queries are being performed. For example, the data processing system 306 may search the matrix database 414 for a matrix 412 associated with the node 402 by using an identifier of the node 402 and/or an identifier of the network operation corresponding to the matrix 412 (e.g., if the node 402 is associated with multiple network operations). In some implementations, the identifier of the network operation is an identifier of an output (e.g., networked item) generated as a result of the networked operation.

The data processing system 306 is shown to include the sub-graph data structure 400, a matrix identifier 416, a weight generator 418, an emission intensity model 420, and a node manager 422. The sub-graph data structure 400, the matrix identifier 416, the weight generator 418, the emission intensity model 420, and/or the node manager 422 may include hardware and/or software components that can be used to execute functionalities associated with the data processing system 306. In some examples, the sub-graph data structure 400, the matrix identifier 416, the weight generator 418, the emission intensity model 420, and/or the node manager 422 may be communicably coupled with one another and/or the matrix database 414, the one or more external databases 424, and/or the client device 302. In some implementations, the data processing system 306, the matrix database 414, one or more external databases 424, and/or the client device 302 may communicate directly or via a network (e.g., a wireless communication network). The data processing system 306 may use the components 416-422 to query the sub-graph data structure 400 for data retrieval and processing to determine emissions associated with the respective nodes of the sub-graph data structure 400.

The matrix identifier 416 may retrieve a matrix 412 from the matrix database 414. The matrix identifier 416 may retrieve the matrix 412 based on an indexing method of the matrix database 414. For example, if the data processing system 306 needs to process emissions data for a specific network operation performed by the node 402, the matrix identifier 416 can use the identifier of node 402 and/or an identifier corresponding to the particular network operation or output type, to query the matrix database 414 to identify and/or retrieve the matrix 412 that corresponds to, maps to, or is otherwise associated with the identifier used in the query.

The weight generator 418 may receive (e.g., retrieve, obtain, etc.) the matrix 412 from the matrix identifier 416 associated with the node 402. The weight generator 418 may use the matrix 412 and/or the sub-graph data structure 400 to identify a plurality of input nodes 404. For example, the weight generator 418 may use the matrix 412 to identify the inputs associated with a network operation of the matrix 412. The weight generator 418 can identify the edges corresponding to the inputs that connect input nodes 404 with the node 402. The weight generator 418 can query those edges to identify the input nodes 404 connected with the same edges.

For each of the input nodes 404 (e.g., the identified input nodes), the weight generator 418 may generate a weight for each of one or more attributes of one or more technologies used by the input nodes 404 based on quantities of inputs provided by a respective input nodes 404 to the node 402 for the network operation. According to an example implementation, the node 402 may receive a first quantity (Q1) of first input from a first input node 404*a*, a second quantity (Q2) of second input from a second input node 404*b*, and a third quantity (Q3) of third input from a third input node 404*c*, which the node 402 uses to perform the network operation and generate a fourth quantity (Q4) of output (e.g., networked item). To generate the weights for each of the inputs, the weight generator 418 may determine a ratio of each quantity of input to the total quantity of inputs used by the node 402. For example, the weight generator 418 may generate a first weight (W1) for the first input by determining Q1 divided by the sum of Q1, Q2, and Q3 (e.g., $W1=Q1/(Q1+Q2+Q3)$).

By determining weights for each of the inputs, the data processing system 306 may evaluate the relative impact the emissions of each input node 404 has on the emissions of the value chain for the node 402. For example, if one input node 404 provides a larger portion of the total input, its associated emissions will have a greater influence on the overall emissions attributed to node 402. Conversely, if another input node 404 contributes a smaller quantity of the total input, its emissions will have less impact on the total value chain emissions for node 402. By applying these weights when combining emissions data from each input node 404, the data processing system 306 facilitates emissions calculations that reflect the proportional contributions of each supplier.

The emission intensity model 420 may use one or more models (e.g., computer models, machine learning models, etc.), such as support vector machines, neural networks, random forests, etc., to generate emission intensities for each input from each input node 404. To generate the emission intensities, the emission intensity model 420 may use information from the sub-graph data structure 400, the weights from the weight generator 418, and/or information from the one or more external databases 424 as inputs to the one or more models. As referred to herein, the one or more models of the emission intensity model 420 may include any/all of language models (e.g., large language models (LLMs)), entity resolution models, and/or inference models, among other model types.

As used herein, an emission intensity may refer to a quantitative measure of the environmental impact of an input generated per unit of output. For example, emission intensity may be expressed as kilograms or metric tons of $CO_2$ equivalent per ton of material produced, per unit of product manufactured, or per kilowatt-hour of energy consumed. Emission intensity can also capture the relative efficiency or sustainability of a particular process, technology, or supplier by comparing the environmental impact across different operations or entities in the value chain.

In some implementations, the emission intensity model 420 may retrieve attributes of the input nodes 404 from the sub-graph data structure 400 to be used as inputs to the one or more models of the emission intensity model 420. The sub-graph data structure 400 may store various attributes of the nodes of the sub-graph data structure 400. In some implementations, the sub-graph data structure 400 may store the attributes in association with corresponding nodes by edges (e.g., edge data structures) connecting the attributes with the corresponding nodes. The emission intensity model 420 may query the edges of the sub-graph data structure 400 to retrieve supplier attributes of the input nodes 404 to use as an input to the one or more models of the emission intensity model 420 to generate the emission intensities for each input.

As described herein, the attributes may include any/all of geographic coordinates, production types, technology identifiers, network operation records, and/or input-output relationships. For example, a first input node 404*a* may have a first attribute indicating geographic coordinates of the first input node 404*a*. As another example, the first input node 404*a* may have a second attribute indicating a production method corresponding to the supplied input, such as "electric arc furnace" or "blast furnace." As another example, the first input node 404*a* may have a third attribute indicating a technology identifier representing a specific equipment model or technology in use by the supplier. As another example, the first input node 404*a* may have a fourth attribute including a network operation record indicating a specific network operation executed by the first input node 404*a*, its timing, and/or the corresponding input-output flow of the network operation. As yet another example, the first input node 404*a* may have a fifth attribute including input-output relationships between the first input node 404*a* and other nodes of the sub-graph data structure 400, such as "100 kg of Input A+50 kg of Input B yields 1 unit of Output C." Each of these attributes may be connected to a respective input node 404 via an edge of the sub-graph data structure 400.

The one or more external databases 424 may include at least one of a computing device, a remote server, a server bank, a remote device, and/or other possible computer hardware and/or computer software with storage capabilities. For example, the one or more external databases 424 may be a data repository or storage system configured to store information usable by the emission intensity model 420 when generating emission intensities for each of the inputs. In some implementations, the one or more external databases 424 may include relationships between technology types and entities indicated by the nodes of the sub-graph data structure 400. For example, for at least some of the nodes of the sub-graph data structure 400, the one or more external databases 424 may store technology type identifiers corresponding to the respective nodes. As a non-limiting set of examples, the technology types may include manufacturing processes such as additive manufacturing, injection molding or casting, energy generation technologies (e.g., solar, wind, or coal-fired power), steel production methods (e.g., electric arc furnace, blast furnace, direct reduced iron), chemical synthesis, automated assembly lines, recycling operations, or water treatment methods, among other examples.

The emission intensity model 420 may retrieve entity identifiers for each of the input nodes 404 based on attributes written into the input nodes 404. For example, a first input node 404*a* may have an attribute indicating an entity (e.g., the supplier). For each of the input nodes 404, the emission intensity model 420 may query the one or more external databases 424 using the entity identifiers to retrieve a technology type identifier for the respective input node 404. For example, the emission intensity model 420 may use the entity identifier for the first input node 404*a* to retrieve a first technology type identifier corresponding to the first input node 404*a*.

In some implementations, the emission intensity model 420 may use the retrieved technology type identifiers as input into the one or more models of the emission intensity model 420 with the weights (e.g., from the weight generator 418) and/or the matrix 412 to generate the emission intensity for each input of each input node 404. For example, the one or more models may apply a calculation or prediction using the technology type identifier to select relevant emissions factors or process-specific data for each input node 404. These emissions factors may then be weighted according to the proportion of input supplied by each input nodes 404, as determined by the weight generator 418. The models may further use the matrix 412 to account for the exact quantity and type of each input received and output produced, combining this information with the emissions factors to determine the total emission intensity attributable to each input.

In some implementations, the one or more external databases 424 may include entity emission intensity values for at least some of the input nodes 404. For example, the one or more external databases 424 may store directly measured or reported emissions intensity values associated with specific entities (e.g., facilities, companies, or production processes) represented by the input nodes 404. These values may include metrics such as kilograms or metric tons of $CO_2$ equivalent emitted per unit of networked item produced. By accessing these entity emission intensity values from the external databases 424, the emission intensity model 420 can incorporate real-world entity-specific emissions data into its calculations, leading to more precise and representative emissions assessments across the sub-graph data structure 400.

In some implementations, the emission intensity model 420 may use the retrieved entity identifiers for each of the input nodes 404 to query the one or more external databases 424 for entity emission intensity values for the input nodes 404. The emission intensity model 420 may use the entity emission intensity values, the weights, and/or the matrix 412 to generate the emission intensity for each input. As an example, the emission intensity model 420 may identify that the first input node 404*a* has an entity identifier "Supplier_X." Using this identifier, the emission intensity model 420 may query the external databases 424 and may retrieve an entity emission intensity value, such as "1.5 kg $CO_2$ per kg of material produced." The emission intensity model 420 may then apply the weight associated with Supplier_X and the quantity data from matrix 412 to calculate the total contribution of Supplier_X to the emission intensity of that specific input. Because the data processing system 306 operates in the middle (e.g., have established connections with the client device 302 and the computing devices storing the external databases 424) between the client device 302 and the external databases 424, the data processing system 306 can operate to use data from the external databases 424 without storing the data locally, all the while the external databases 424 can be separately updated over time.

The emission intensity model 420 may host or store a reference process-technology graph. As referred to herein, the reference process-technology graph may include a curated set of nodes and edges representing standard network operations, technologies, and their corresponding characteristics, such as typical input and output quantities, resource requirements, and emissions factors. In some examples, the reference process-technology graph may define mappings between various production methods and the materials or energy they consume as well as the outputs (e.g., networked items they generate).

In some instances, the sub-graph data structure 400 and/or the one or more external databases 424 may be missing certain data fields associated with the input nodes 404. For example, the one or more external databases 424 may include empty data fields regarding technologies used to generate networked items for at least one of the input nodes 404. The emission intensity model 420 may identify an input node 404 including an empty data field regarding technologies used to generate networked items.

The emission intensity model 420 may use the reference process-technology graph to update the missing data fields. For example, in response to identifying the empty data fields, the emission intensity model 420 can match observed inputs and outputs of edges connecting the input node to another node in the sub-graph data structure 400 in the reference process-technology graph to infer the technologies used by an input node 404 with a missing data field.

According to an example, the emission intensity model 420 may analyze the quantities and types of resources supplied and received by the input node 404, and/or as the network operations associated with the input node 404. The emission intensity model 420 may compare observed data for the input node 404 against standardized data in the reference process-technology graph. If the input and output patterns of the input node 404 align with those of a known technology (e.g., a particular manufacturing or energy generation process), the emission intensity model 420 can infer that the input node 404 is likely to use that specific technology. The emission intensity model 420 may then update the missing data field of the input node 404 to include the inferred technology.

In some instances, certain input nodes 404 may not have direct measured emissions data. This lack of entity-specific emissions information may present certain challenges, as relying solely on generic industry averages or regional estimates may lead to inaccurate emissions calculations and obscure the true environmental impact associated with suppliers. Without accurate emissions data, it may be difficult to pinpoint high-impact suppliers, assess risks, or target mitigation efforts effectively within the value chain. To address this challenge, the emission intensity model 420 may train a machine learning model (e.g., predictive model, such as a neural network, a support vector machine, a random forest, a transformer, a language model, a large language model, etc.) to predict (e.g., generate, infer, etc.) emissions intensities for input nodes 404 lacking direct (e.g., real-time, historical, etc.) measured emissions data.

The emission intensity model 420 may train the machine learning model using facility (e.g., entity) attributes, inferred or observed technologies, and/or weighted supplier emissions as labels or features, and using measured emissions intensities from the one or more external databases 424 as labels. For example, the facility attributes may include location, production capacity, age of the facility, or input-output ratios, among other attributes. As another example, the inferred or observed technologies may include manufacturing processes such as additive manufacturing, injection molding or casting, energy generation technologies (e.g., solar, wind, or coal-fired power), steel production methods (e.g., electric arc furnace, blast furnace, direct reduced iron), chemical synthesis, automated assembly lines, recycling operations, or water treatment methods, among other examples. As yet another example, the weighted supplier emissions may include calculated or estimated emissions per unit of input, such as "1.2 kg $CO_2$e per kg of material from Supplier A (weighted at 70%)" and "0.9 kg $CO_2$e per kg of material from Supplier B (weighted at 30%)."

To train the machine learning model, the emission intensity model 420 may pair the features (e.g., facility attributes, inferred or observed technologies, weighted supplier emission) with labels (e.g., measured emissions intensity values) obtained from the one or more external databases 424, which serve as ground-truth labels for training. Using these feature-label pairs, the emission intensity model 420 can apply machine learning training procedures, such as feature normalization, dataset splitting, and/or iterative optimization, to fit the machine learning model to accurately predict emissions intensity for input nodes 404. After training, the model may be validated and tested to ensure reliability. In an example, the emission intensity model 420 can use back propagation techniques with a loss function to adjust the weights of the machine learning model based on the differences between outputs generated based on the features and the labels paired with the features.

The emission intensity model 420 may execute the machine learning model to predict an emissions intensity for an input node 404 lacking direct measured emissions data. As an example, when an input node 404 does not have measured emissions data, the emission intensity model 420 can input the attributes of the facility corresponding to the input node 404, inferred or observed production technologies, and/or weighted supplier emissions into the trained machine learning model. Based on these features, the machine learning model may output a predicted emissions intensity value for the input node 404. This predicted emissions intensity value can then be used in subsequent emissions calculations, which may allow input nodes 404 without direct emissions data to be accounted for in the overall value chain emissions assessment.

The one or more external databases 424 may store real-time emission data for individual entities represented in the sub-graph data structure 400. For example, the one or more external databases 424 may include continuously updated emissions reports, sensor data, or other records for the input nodes. The emission data may include metrics such as $CO_2$ emissions, particulate matter outputs, or other quantified pollutants generated by the entity's operations within predefined intervals (e.g., hourly, daily, yearly, etc.).

In some implementations, the one or more external databases 424 may not store emissions data (e.g., emissions values) for some of the input nodes 404. For example, an input node 404 may not have emissions values if the supplier operates in a region that does not require emissions disclosure, if the supplier is a new facility without historical data, or if the supplier lacks emissions tracking infrastructure. To allow such input nodes 404 to be considered in an emissions analysis for the sub-graph data structure 400, the emission intensity model 420 may train a computer model to generate emission values for entities (e.g., input nodes 404).

To train the computer model, the emission intensity model 420 may identify one or more input nodes in the sub-graph data structure 400 that store technology characteristic data for the entity of each of the one or more input nodes. For example, the emission intensity model 420 may locate input nodes 404 that have recorded technology-related attributes, such as production methods (e.g., electric arc furnace, blast furnace), locations, or equipment types (e.g., solar panel array, gas turbine). The technology characteristic data may provide context about the operational processes used at each input node 404.

The emission intensity model 420 may match the input nodes 404 to identifications of entities in the one or more external databases 424 storing real-time emission data for the entities. According to an example implementation, if a first input node 404*a* represents a steel facility with a recorded production method such as "electric arc furnace" that is located in Germany, the model can search the one or more external databases 424 for entities with similar technology attributes. In response to identifying a match, the emission intensity model 420 may retrieve real-time emission data for that entity. The emission intensity model 420 may correlate the technology characteristic data with real-time emission data based on matches between the input nodes 404 and the identifications of the entities in the one or more external databases 424. According to an example implementation, the emission intensity model 420 may link the production method "electric arc furnace" and geographic location "Germany" from the first input node 404*a* to a record of the one or more external databases 424 showing that a steel facility in Germany using an electric arc furnace emits 1.2 kg $CO_2$ per kilogram of steel produced. By correlating the technology characteristic data with the real-time emission data, the emission intensity model 420 can build a dataset that indicates correlations between technological characteristics and real emission values.

The emission intensity model 420 may train the computer model to generate emission values for entities based on the correlated data (e.g., correlations between technological characteristics and real emission values). For example, the emission intensity model 420 may use the dataset that pairs technology characteristics (e.g., production method, equipment type, etc.) with real-time emission values retrieved from external databases 424 to train a computer model (e.g., machine learning model, statistical regression, etc.). This training process allows the computer model to learn the relationships between various technological characteristics and their corresponding emissions output. Once trained, the computer model can predict emission values for other entities (e.g., input nodes 404) by analyzing their technological characteristics, even if those entities do not have direct emission measurements available. This approach may fill data gaps and allow comprehensive emissions analysis across the sub-graph data structure 400 including nodes that do not have direct emissions measurements.

In some instances, an input node 404 may be associated with an unobserved input. As referred to herein, an unobserved input may refer to an input supplied to the node 402 from an input node 404 for which the data processing system 306 and/or the one or more external databases 424 lacks data regarding its origin, technology, or emissions intensity. As an example, if the node 402 receives electricity from an input node 404, but the data processing system 306 lacks details about the fuel mix or energy source used to generate that electricity, the electricity would be considered an unobserved input. As another example, if a chemical or alloy is sourced from an input node 404 without records identifying its manufacturing origin or technology, the chemical or alloy may be an unobserved input.

The one or more external databases 424 may include information regarding technologies and emissions factors in various geographic regions. For example, the one or more external databases 424 may store emissions factors associated with different production technologies, such as electric arc furnaces or blast furnaces, across multiple countries or regions. The one or more external databases 424 may include average emissions values for networked items manufactured in particular regions, differentiated by industry sector or production type. As such, the one or more external databases 424 may allow the emission intensity model 420 to reference regional or technology-specific emissions data to assign emissions intensities to unobserved inputs. In some implementations, the one or more external databases 424 may store emissions values at various geographic granularities. For example, emissions values may be available at the global, national, state, provincial, or city level, among other examples, depending on the scope of the one or more external databases 424. The varying geographic granularity enables the emission intensity model 420 to select the most appropriate emissions intensity for an unobserved input based on the reported location or origin.

To assign emissions intensities to unobserved inputs, the emission intensity model 420 may determine the most granular geographic region for which a corresponding technology and emissions factor is available in the one or more external databases 424. According to an example implementation, if an unobserved input is associated with a supplier located in France, but exact entity details are missing, the emission intensity model 420 may check the one or more external databases 424 for the most granular emissions factor available. If the one or more external databases 424 provides emissions data for electricity in France at the regional level, the model may use a regional emissions factor for the technology for that specific area. If only national-level data is available, the emission intensity model 420 may default to the emissions factor for France as a whole. In some implementations, the emission intensity model 420 may assign the unobserved input an emissions intensity based on an average domestic grid-level emissions of the determined region. For example, if the unobserved input is electricity supplied to a facility in France and the one or more external databases 424 only provide emissions data at the national grid level, the emission intensity model 420 may assign the input an emissions intensity corresponding to the average $CO_2$ emissions per kilowatt-hour for France's electricity grid.

While emission intensities for the nodes of the sub-graph data structure 400 may be calculated (e.g., determined, assigned, generated, etc.) based on network operations involving inputs and outputs, there may be certain emissions generated by supplying (e.g., transporting) the inputs and outputs between the various nodes of the sub-graph data structure 400. For example, the input nodes 404 may have certain emission values associated with providing the inputs to the node 402, and the node 402 may have certain emission values associated with providing the outputs (e.g., the networked item) to the output node 408. The emissions values may be encoded in the edges (e.g., edges 406, edge 410) connecting the nodes of the sub-graph data structure 400.

In some implementations, the emission intensity model 420 may determine transfer-related emissions between source (e.g., input) and destination (e.g., output) nodes of the sub-graph data structure 400. The transfer-related emissions may be based on transfer distances between the source and destination nodes. For example, the transfer distances may represent a geographic distance between an input node that provides an input and the destination node that receives the input (e.g., using stored geospatial coordinates for each node). In some implementations, the transfer distances may be based on a recorded network operation mode. For example, the transfer distance may indicate a distance between the source and destination nodes using a specified network operation mode. The recorded network operation modes may refer to methods or systems used to transfer inputs and outputs between nodes of the sub-graph data structure 400. For example, a first network operation mode may specify that networked items are transported by truck, a second network operation mode may indicate rail transport, a third network operation mode may correspond to shipping by sea, and a fourth network operation mode may represent air freight.

To determine the transfer-related emissions between source and destination nodes, the emission intensity model 420 may multiply the transfer distances by mode-specific emissions factors and network operation weights from network operation records. As referred to herein, the mode-specific emissions factors may be coefficients or values representing the average emissions generated per unit distance per unit mass for a particular network operation mode (e.g., transportation mode). As referred to herein, the network operation weight may be numerical values indicating the share or quantity of input being transferred in a given operation, relative to the total volume of material flows in the value chain. According to an example implementation, if 50 tons of a particular input are transported 1,000 kilometers by truck from an input node 404 to the node 402, the emission intensity model 420 may use a truck-specific emissions factor to calculate the emissions generated by the transfer. In this case, the model would multiply the transfer distance by the mode-specific emissions factor and the network operation weight to obtain the transfer-related emissions for the particular input.

In some instances, each of the input nodes 404 may provide a different input to the node 402. In such instances, the emission intensity model 420 may determine emission intensities for each of the input nodes 404 separately. In some instances, some of the input nodes 404 may provide the same input to the node 402. For example, a first input node 404*a* may provide a first quantity of first input to the node 402, and a second input node 404*b* may provide a second quantity of the first input to the node 402. In such instances, to determine the emission intensity for each input, the emission intensity model 420 may aggregate emissions intensities for each of the input nodes 404 that supply the same input to the node 402.

The emission intensity model 420 may identify multiple entities (e.g., input nodes 404) that provide a single input to the entity (e.g., the node 402) using the edges 406 between the input nodes 404 and the node 402. For example, the emission intensity model 420 may determine that the node 402 receives the same input from a first input node 404*a*, a second input node 404*b*, and a third input node 404*c* by querying the edges 406. The emission intensity model 420 may determine quantities of input to the node 402 based on data stored in data structures of the edges 406. For example, the edge 406*a* between the first input node 404*a* and the node 402 may indicate a transfer of 45 tons of input, the edge 406*b* between the second input node 404*b* and the node 402 may indicate 30 tons of input, and the edge 406*c* between the third input node 404*c* and the node 402 may indicate 25 tons of input.

The emission intensity model 420 may weight technological characteristics of the node 402 based on the quantities of the inputs corresponding to the technological characteristics of the entity that the node 402 represents. For example, if node 402 receives 45 tons of input produced using a first technology from the first input node 404*a*, 30 tons of input produced using a second technology from the second input node 404*b*, and 25 tons of input from the third input node 404*c* using a third technology, the emission intensity model 420 may assign a higher weight (e.g., a proportionally higher weight) to the technological characteristics associated with the first input node 404*a* due to its larger contribution to the total input. By weighting the technological characteristics based on their respective contribution to the total inputs, the emission intensity model 420 may allow the emissions intensity calculated for node 402 to reflect the proportional impact of each production technology based on the quantities of input supplied.

The emission intensity model 420 may host or store a technology matrix. As referred to herein, the technology matrix may encode network operations performed between the input nodes 404 and the node 402 according to the weights of the technological characteristics corresponding to the inputs of the network operations. The technology matrix may serve as a structured representation detailing how various inputs supplied to node 402 are associated with different technologies or production methods used by the input nodes 404 (e.g., to generate corresponding output nodes or the inputs into the next node) 7. For example, each row in the technology matrix may correspond to a specific input, and each column may represent a particular technological characteristic or process. The entries in the technology matrix reflect the quantity or proportion of each input sourced from each technology, weighted by how much each supplier contributes to the total input.

The emission intensity model 420 may generate an average embedded emission intensity for the input nodes 404. The emission intensity model 420 may do so by using a function of the technology matrix. In some implementations, the emission intensity model 420 may apply a weighted average function to the technology matrix, combining the emissions intensities of each input node 404 according to their respective contribution to the total input. For example, if the first input node 404*a* provides a larger share of input using a first technology and the second input node 404*b* provides a smaller share of input using a second technology, the model may proportionally reflect these impacts in the average embedded emission intensity.

In some implementations, the emission intensity model 420 may use the average embedded emission intensity to generate the emissions intensity for each input of each input node 404 of the plurality of input nodes 404. For example, the emission intensity model 420 may use the average embedded emission intensity along with the weights (e.g., from the weight generator 418) and the matrix 412 to generate the emissions intensity for each input. According to an example implementation, if the first input node 404*a*, the second input node 404*b* and the third input node 404*c* collectively provide a first input to the node 402, the emission intensity model 420 may first calculate the average embedded emission intensity for all inputs of the first input using the technology matrix and weighted contributions from each input node 404. Then, using the weights that represent the share of the first input provided by each input node 404 and the input quantities from the matrix 412, the emission intensity model 420 may combine these values to assign an emissions intensity to the input associated with each individual input node 404. For example, if the first input node 404*a* is responsible for 50% of the first input, the second input node 404*b* is responsible for 30% of the first input, and the third input node 404*c* is responsible for 20% of the first input, their respective emissions intensities may be determined by the average embedded emissions value adjusted according to their weighted share and the total input quantity specified in matrix 412. This approach may allow the emissions intensity for each input node 404 to accurately reflect both the supplier-specific technology characteristics, and their proportional contribution to the input used by node 402.

As described above, the emission intensity model 420 may generate an emissions intensity for each input of each input node 404 used to generate the networked item of the node 402. The emission intensity model 420 may calculate an emission of the networked item based at least on the emission intensities of the inputs of the input nodes 404. For example, the emission intensity model 420 may multiply the emission intensity of each input and its corresponding value from the matrix 412 to generate an emissions value corresponding to the respective inputs. The emission intensity model 420 may then sum each emissions value for each input to calculate the emission of the networked item. In some implementations, the emission intensity model 420 may include the transfer-related emissions in the calculation of the emission of the networked item. For example, the emission intensity model 420 may sum each emissions value for each input and each transfer-related emissions value for each input to calculate the emission of the networked item.

According to an example implementation, the emission intensity model 420 may determine the emission of a networked item by first computing the emissions intensity for each input received from various input nodes 404, such as calculating 1.6 kg $CO_2$ per kg of steel from a first input node 404*a* and 2.2 kg $CO_2$ per kg of aluminum from a second input node 404*b*. The emission intensity model 420 may then multiply these emissions intensities by the respective quantities specified in matrix 412, such as 100 kg of steel and 50 kg of aluminum, yielding emissions values of 160 kg $CO_2$ and 110 kg $CO_2$, respectively. The model may sum these emissions values for all inputs to obtain an emission subtotal for the networked item. If transfer-related emissions are to be considered, the emission intensity model 420 may also calculate the transfer-related emissions resulting from transporting each input, such as 10 kg $CO_2$ for steel and 7 kg $CO_2$ for aluminum, and the emission intensity model 420 may add these values to the subtotal to calculate the emission for the networked item.

The node manager 422 may perform one or more operations with respect to the sub-graph data structure 400 based on the emissions of the networked items in the sub-graph data structure 400. In some implementations, the node manager 422 may compare the emission of the networked item of the node 402 to a threshold (e.g., a threshold emission). The threshold can be a value or can be any defined rule or criteria stored in memory. In some implementations, the threshold may be based on regulatory requirements, environmental standards, industry benchmarks, or internal sustainability goals set by the value chain. For example, the threshold may represent the maximum allowable emissions for a particular networked item.

In response to an emission of a networked item exceeding the threshold for the respective networked item, the node manager 422 may determine which input nodes 404 are the highest contributors to the emission of the networked item. This determination may be based on a relative aggregate emission of inputs provided by each of the input nodes 404 to the node 402. According to an example implementation, the node manager 422 may analyze the emissions values associated with each input by input nodes 404 to node 402, as calculated by the emission intensity model 420. For example, if a first input node 404*a* is responsible for 60% of the emissions associated with a first input, a second input node 404*b* is responsible for 25% of the emissions associated with the first input, and a third input node 404*c* is responsible for 15% of emissions associated with the first input, the node manager 422 may identify a first input node 404*a* as the highest contributor to emissions with respect to the first input.

The node manager 422 may write a flag to one or more of the input nodes 404 that are determined to be the highest contributors to the emission of the networked item. For example, if a particular input node 404 is determined to contribute the largest share of emissions relative to other input nodes 404 for a given input, the node manager 422 may write or associate a flag to the input node 404 within the sub-graph data structure 400. In some implementations, the node manager 422 may do so only or further in response to determining the input node 404 providing having an emission contribution value that contributes to the networked item that exceeds or otherwise satisfies a threshold. In some implementations, the flag may be viewable on the client device 302, and may be used to alert system administrators that the input node 404 is a primary contributor of emissions for the networked item.

In some implementations, the node manager 422 can generate flags in downstream nodes using the matrices 412. For example, responsive to the emission of the networked item at the location of the entity exceeding the threshold, the node manager 422 can write (e.g., automatically write) a flag to an output node of the networked item connected with the node through an edge corresponding to the networked item. In another example, the node manager 422 can use a matrix 412 for the node to generate an emissions value for an edge connecting the node with an output node (e.g., the output node 408) for the networked item. The node manager 422 can do so, for example, by identifying the inputs provided by the input nodes. The node manager 422 can identify an edge that corresponds to the networked item that corresponds to the inputs from the input nodes. The node manager 422 can identify a technology that the node implements to convert the inputs into the output that goes to the output node. The node manager 422 can use the technology matrix to determine an emission for the networked item at the node and/or for the output to the output node connected with the node. The node manager 422 can compare the emission to a threshold or any other rules or criteria. Responsive to determining the emission exceeds or otherwise does not satisfy the threshold or rule or criteria, the node manager 422 can write a flag into the output node and/or the node, in some cases corresponding to an indication of the networked item.

In some implementations, the node manager 422 may perform one or more remediation or mitigation actions with respect to the sub-graph data structure 400 in response to the emissions for the networked item exceeding the threshold. For example, the node manager 422 may recommend or automatically adjust input node 404 selection in the sub-graph data structure 400 by decreasing inputs from input nodes 404 identified as high contributors to emissions, and increasing inputs from input nodes 404 with lower emissions intensity. The node manager 422 can do so, for example, by identifying another node that is configured to generate the same output as the input provided by the high contributing node. The node manager 422 can make such a determination based on the attributes of the node and/or based on edges indicating outputs of the node matching the input provided by the high contributing node. The node manager 422 can reorganize the edges to reroute the edges through the newly identified node instead of the high contributing node. The node manager 422 can similarly adjust the routing for the networked item from any nodes in which the node manager 422 generates a flag. In doing so, the node manager 422 can create a new sub-graph data structure for the networked item (e.g., the value chain of the networked item) and/or adjust the existing sub-graph data structure for the networked item. The node manager 422 can similarly iteratively evaluate and/or generate flags for individual nodes (e.g., each individual node) of a sub-graph data structure for the networked item and/or any number of sub-graph data structures.

By implementing such mitigation techniques, the node manager 422 may implement modifications to the sub-graph data structure 400. For example, the node manager 422 may replace a first input node 404*a* for a first input with a second input node 404*b* for the first input that has a lower emissions intensity than the first input node 404*a*. Thus, in the aggregate, generation of a networked item impacted by the replacement may be reduced. The node manager 422 can repeat this process for any number of networked items, nodes, and/or sub-graph data structures any number of times, over time, and/or in response to requests, to gradually reduce the impact of carbon emissions of network operations represented in the network graph data structure, and do so with less latency using fewer processing resources with the matrix data structure to guide queries for the process.

In some implementations, the node manager 422 can modify (e.g., automatically modify) nodes and/or edges in the network graph data structure using task objects and digital records for networked items. For example, responsive to determining a node for a networked item corresponds to a value exceeding or otherwise satisfying or not satisfying a threshold, the node manager 422 can automatically generate a digital record (e.g., a file or data package configured to display data of nodes represented in the network graph data structure, such as nodes of a sub-graph data structure corresponding to generating a networked item) for the networked item. The node manager 422 can do so, for instance, by identifying each of the nodes that are connected with each other in the sub-graph data structure containing the node and a node profile for the networked item. The node manager 422 can generate a task object (e.g., a data structure) containing one or more fields. The fields can include defined values or text that correspond to specific attributes of a task to be completed, such as a text request for data identifying the emissions (or other attribute) at the input node flagged as a high contributed or emissions for the output. The node manager 422 can store the task object and the identified nodes in the digital record. The node manager 422 can transmit the digital record to a computing device of the input node, which the node manager 422 can identify from an address value (e.g., an IP address, a MAC address, etc.) identified as an attribute in the input node.

The computing device of the input node can receive the digital record in a message. Responsive to receiving the digital record, the computing device can update the digital record or the node with updated data, such as an updated emission value or an updated value indicating the technology used to generate the networked item. For example, in some cases, responsive to receiving the digital record, the computing device can display the emission value for the input node and/or the technology implemented by the node to generate the output into the node flagged for having the emission value exceeding the threshold. A user accessing the computing device can view the emission value and/or technology and provide an input modifying one or both of the emission value and/or the technology. In some cases, the computing device can automatically compare the value in the node to stored values of the same type. Responsive to detecting a difference, the computing device can retrieve the stored values from memory. The computing device can transmit the differing values to the data processing system, either in separate messages with identifications of the node that corresponds to the value or in a data package containing the digital record as an augmented digital record.

The data processing system can use the modified values to modify the node in the network graph data structure. For example, the data processing system can receive the values in the message and/or the augmented digital record. The data processing system can identify values in the message and/or from the augmented digital record. The data processing system can update the input node to include the values, such as by modifying the field-value pairs that correspond to the emission value or the technology in the node. In cases in which the modified value is for a technology of the node, the data processing system can update the technology matrix for the node with the new technology value.

Updating the values for the node can trigger querying the sub-graph data structure for the networked item. For example, responsive to modifying the updated or modified value or values for the node, the data processing system can use the matrices corresponding to the updated node and/or each node of the sub-graph data structure to generate emission values for the respective nodes as described herein. The data processing system can compare the emission values to the threshold and repeat the process. The data processing system can repeat the process any number of times for any number of nodes of the sub-graph data structure. In doing so, the data processing system can limit processing and updates to the sub-graph data structure only when there are detected errors, and do so in a collaborative manner while reducing the compute and resources that may be required when implementing machine learning or artificial intelligence technology.

Figure 4C:
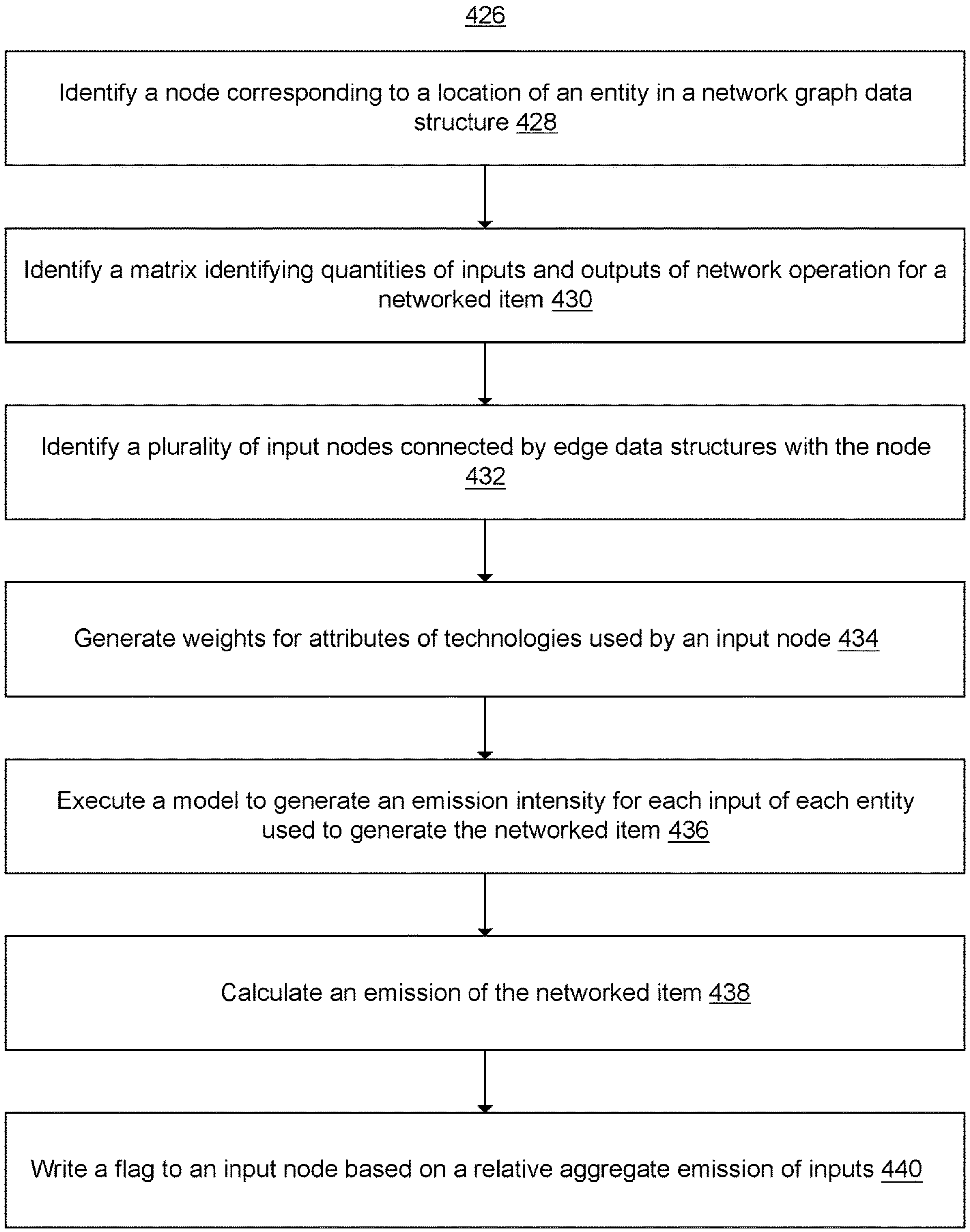
FIG. 4C illustrates an example flowchart of a process for querying a network graph data structure using constraints from another data structure, in accordance with an implementation.

FIG. 4C illustrates an example flowchart of a process 426 for querying a network graph data structure using constraints from another data structure, in accordance with an implementation. A data processing system (e.g., the data processing system 306, shown and described with reference to FIG. 3A) can perform the process 426 to reduce querying time of a network graph data structure with a second matrix data structure, such as to calculate emissions for a network graph data structure representing the network between entities for networked item generation and/or transportation. The process 426 can include any number of operations or additional operations and the operations may be performed in any order.

At operation 428, a server may identify a node corresponding to a location of an entity in a network graph data structure. The network graph data structure may store a network of nodes and edges between the nodes. The network graph data structure may digitally represent types of relationships between locations of entities represented by the network of nodes and networked items (e.g., generated by the nodes). The network of nodes may include pairs of nodes each including a source node connected with a destination node by an edge data structure. The edge data structure may indicate a particular networked item transferred from the source node to the destination node. For example, with reference to the sub-graph data structure 400 of FIG. 4A, the edge 410 may connect a source node (e.g., the node 402) with a destination node (e.g., the output node 408).

At operation 430, the server may identify a matrix encoded in a computer-readable array format identifying quantities of inputs and outputs of a network operation for a networked item. In some implementations, the matrix may identify a plurality of network operations between the location of the entity and one or more other locations of entities represented in the network graph data structure. In such implementations, the matrix may include data for each of the plurality of network operations, such as the quantities of inputs and outputs of the plurality of network operations for networked items. For example, with reference to the matrix 412 of FIG. 4B, the matrix 412 may indicate quantities of inputs and outputs of network operations of the nodes of the sub-graph data structure 400.

At operation 432, the server may identify a plurality of input nodes connected by edge data structures (e.g., edges) with the node (e.g., the node corresponding to the location of the entity). The input nodes may provide inputs for the network operation for the networked item. For example, with reference to the sub-graph data structure 400 of FIG. 4A, the input nodes 404 may provide inputs for a network operation of the node 402. Each of the input nodes 404 may be connected to the node 402 via one of the edges 406.

At operation 434, the server may generate weights for attributes of technologies used by an input node. The weights may be based on the quantities of inputs provided by an entity, input provider, or supplier of the input node used for the network operation to generate the networked item. For example, if multiple input nodes provide inputs for a network operation, the server can calculate a weight for each input node representing its proportional contribution to the total amount of that input. These weights enable the system to attribute the emissions or environmental impact of each input node according to the actual quantity it supplies, such that the calculated emission for the networked item reflects the scale of contributions from all suppliers.

At operation 436, the server may execute a model to generate an emission intensity for each input of each supplier used to generate the networked item. The server may use the weights for the plurality of input nodes and the matrix to generate the emission intensity for each input of each supplier of the plurality of suppliers used to generate the networked item. For example, the server may input the weights representing each supplier's share of the inputs, along with the matrix detailing the types and quantities of inputs used for the network operation, into an emission intensity model. The model may combine these values with emissions factors or attributes associated with each input node to compute the emissions intensity attributable to each supplier's input.

In some implementations, the model may generate the emissions intensities for the inputs by retrieving reported or measured emissions values from external databases. These entity-specific emissions intensities may provide a facility-level assessment of environmental impact associated with the supplied input of each input node. In some implementations, when direct measured emissions data is unavailable for a supplier, the model may generate emissions intensities based on region-specific, network operation-specific, and/or technology-specific emissions factors and attributes. For example, the system may reference average emissions factors from databases corresponding to the supplier's geographic location, technologies used, or based on the type of network operation performed by the supplier.

In some implementations, multiple suppliers may provide the same input to the entity. The model may calculate a weighted average emissions intensity for the input. For example, the model may generate weights based on the proportion of the input provided by each supplier, and combining these weights with the suppliers' individual emissions intensities using a technology matrix. In some implementations, the model may use machine learning or predictive modeling to estimate emissions intensities for suppliers. The model may be trained on features such as entity attributes, technologies, geographic location, and/or historical emissions patterns.

In some implementations, the model may use inference-based techniques based on a reference process-technology graph to estimate emissions intensities for suppliers that have missing or incomplete data fields. By matching observed input and output flows with standardized process profiles, the model may determine probable production technologies and assign emissions factors accordingly. In some implementations, for unobserved inputs that cannot be definitively linked to a specific supplier or technology, the model may assign emissions intensities using local processing. For example, the model may select a default or region-based emissions factor for the most granular and relevant data available. In some implementations, the model may calculate transfer-related emissions, such as those generated by transporting resources between nodes. The model may compute the transfer-related emissions using geospatial distances, transportation modes, mode-specific emissions factors, and/or input quantities.

At operation 438, the server may calculate an emission of the networked item. The server may calculate the emission of the networked item based on the emission intensities of the inputs of the plurality of suppliers. For example, the server may multiply the emission intensity associated with each input from each supplier by the corresponding quantity of that input used in generating the networked item. The server may then sum these emissions values across all suppliers and inputs to determine the total emission associated with the networked item. In some implementations, the server may also include transfer-related emissions, such as emissions generated by transporting inputs from suppliers to the entity for the network operation, by adding these values into the emission calculation.

At operation 440, the server may write a flag to an input node based on a relative aggregate emission of inputs. In some implementations, in response to the emission for the networked item at the location of the entity exceeding a threshold, the server may write the flag to the input node. The flag may be based on a relative aggregate emission of inputs provided by a supplier of the input node to the location of the entity. For example, if a particular input node is determined to contribute a disproportionately high share of the total emissions associated with the inputs used to generate the networked item, the server may write a flag to that input node in the network graph data structure. This flag can be used to alert system administrators of the supplier's contribution to the emission value, potentially facilitating remediation actions such as supplier review or replacement.

In a non-limiting example, the data processing system can store a network graph data structure representing locations of entities as nodes and transfers of networked items as edges. Each edge data structure can indicate a particular networked item transferred from a source node to a destination node. The data processing system can identify a node corresponding to a location of an entity for which an emissions query is to be performed. The data processing system can also identify a matrix encoded in a computer-readable array format that identifies a plurality of network operations between the entity location and one or more other entity locations. The matrix can store, in array-addressable positions, quantities of inputs and outputs for each network operation for the networked item. The array can allow the data processing system to obtain operation quantities using direct array access rather than repeatedly traversing multiple edges and intermediate nodes during the query. In some cases, the matrix can include identifications of network operations involving the node, which can facilitate faster querying when The data processing system can use the matrix data structure to facilitate and/or constrain queries for particular network operation data processing. For example, the data processing system can receive a request or otherwise an identifier of a network operation involving a networked item. The data processing system can use the identifier to identify a particular matrix corresponding to the network operation and/or a node involved in the network operation. The data processing system can identify a plurality of input nodes connected by edge data structures with the identified node and providing inputs for the network operation for the networked item based on the matrix. In doing so, the data processing system can use the matrix to pinpoint the location of the node and the edges relative to the network operation for the processing, enabling the data processing system to avoid processing what can be thousands of other edges connected with the node that are related to other network operations or networked items. For example, because the matrix restricts traversal to a subset of nodes identified prior to traversal, the server avoids recursive traversal of unrelated subgraphs, reducing memory accesses and processor cycles during execution.

The data processing system can use the matrix data structure to provide context for processing the data of the edges connecting the node with input nodes for the network operation. For example, for each input node, the data processing system can generate a weight for each of one or more attributes of one or more technologies used by a supplier associated with the input node. The weights can be generated based on the quantities of the inputs provided by the supplier for the network operation. To reduce querying time, the data processing system can read the quantities from the matrix in the computer-readable array format for each input node, instead of issuing separate graph traversals to infer or aggregate quantities from multiple upstream relationships, or otherwise use the identifications of the network operations in the matrix to identify the edges connected to the node or respective input nodes to query such data, thereby reducing the number of graph queries and the amount of traversal work performed per input node.

The data processing system can execute a model using as input the weights for the plurality of input nodes and the matrix to generate an emission intensity for each input of each supplier of a plurality of suppliers used to generate the networked item. The data processing system can calculate an emission value of the networked item based at least on the emission intensities. If the data processing system determines that the emission at the entity location exceeds a threshold, the data processing system can write a flag to an input node of the plurality of input nodes in the network graph data structure based on a relative aggregate emission of inputs provided by the supplier of the input node to the entity location. In this example, by using the matrix as an array-formatted operational representation that the model can consume in bulk, the data processing system can reduce repeated graph traversal during the query workflow and can complete the emissions query with reduced computer resources and faster traversal than a graph-only querying approach.

The systems and methods described herein can be used for other types of attributes. For example, the data processing system can store one or more matrices for other environmental impact attributes (e.g., deforestation risk, water usage, biodiversity tracking, etc.) with values that correspond to individual network operations and/or nodes involved in the network operations. The data processing system can use respective matrices to query the network graph data structure with faster traversal during bulk processing and updating of the network graph data structure.

Some of the description herein emphasizes the structural independence of the aspects of the system components or groupings of operations and responsibilities of these system components. Other groupings that execute similar overall operations are within the scope of the present application. Modules can be implemented in hardware or as computer instructions on a non-transient computer readable storage medium, and modules can be distributed across various hardware or computer-based components.

The systems described above can provide multiple ones of any or each of those components and these components can be provided on either a standalone system or on multiple instantiation in a distributed system. In addition, the systems and methods described above can be provided as one or more computer-readable programs or executable instructions embodied on or in one or more articles of manufacture. The article of manufacture can be cloud storage, a hard disk, a CD-ROM, a flash memory card, a PROM, a RAM, a ROM, or a magnetic tape. In general, the computer-readable programs can be implemented in any programming language, such as LISP, PERL, C, C++, C#, PROLOG, or in any byte code language such as JAVA. The software programs or executable instructions can be stored on or in one or more articles of manufacture as object code.

Example and non-limiting module implementation elements include sensors providing any value determined herein, sensors providing any value that is a precursor to a value determined herein, datalink or network hardware including communication chips, oscillating crystals, communication links, cables, twisted pair wiring, coaxial wiring, shielded wiring, transmitters, receivers, or transceivers, logic circuits, hard-wired logic circuits, reconfigurable logic circuits in a particular non-transient state configured according to the module specification, any actuator including at least an electrical, hydraulic, or pneumatic actuator, a solenoid, an op-amp, analog control elements (springs, filters, integrators, adders, dividers, gain elements), or digital control elements.

The subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatuses. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. While a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices include cloud storage). The operations described in this specification can be implemented as operations performed by a data processing apparatus on data stored on one or more computer-readable storage devices or received from other sources.

The terms "computing device", "component" or "data processing apparatus" or the like encompass various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, app, script, or code) can be written in any form of programming language, including compiled or interpreted languages, declarative or procedural languages, and can be deployed in any form, including as a stand-alone program or as a module, component, subroutine, object, or other unit suitable for use in a computing environment. A computer program can correspond to a file in a file system. A computer program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatuses can also be implemented as, special purpose logic circuitry, e.g., an FPGA (field programmable gate array) or an ASIC (application specific integrated circuit). Devices suitable for storing computer program instructions and data can include non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

The subject matter described herein can be implemented in a computing system that includes a back end component, e.g., as a data server, or that includes a middleware component, e.g., an application server, or that includes a front end component, e.g., a client computer having a graphical user interface or a web browser through which a user can interact with an implementation of the subject matter described in this specification, or a combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While operations are depicted in the drawings in a particular order, such operations are not required to be performed in the particular order shown or in sequential order, and all illustrated operations are not required to be performed. Actions described herein can be performed in a different order.

Having now described some illustrative implementations, it is apparent that the foregoing is illustrative and not limiting, having been presented by way of example. In particular, although many of the examples presented herein involve specific combinations of method acts or system elements, those acts and those elements can be combined in other ways to accomplish the same objectives. Acts, elements and features discussed in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular can also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation or embodiment, and references to "an implementation," "some implementations," "one implementation" or the like are not necessarily mutually exclusive and are intended to indicate that a particular feature, structure, or characteristic described in connection with the implementation may be included in at least one implementation or embodiment. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

For example, descriptions of positive and negative electrical characteristics may be reversed. Elements described as negative elements can instead be configured as positive elements and elements described as positive elements can instead by configured as negative elements. For example, elements described as having first polarity can instead have a second polarity, and elements described as having a second polarity can instead have a first polarity. Further relative parallel, perpendicular, vertical or other positioning or orientation descriptions include variations within +/−10% or +/−10 degrees of pure vertical, parallel or perpendicular positioning. References to "approximately," "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

What is claimed is:

1. A system for reduced computer resources and faster traversal when querying a network graph data structure using a matrix in a computer-readable array format, comprising:

a server comprising a processor and a memory storing instructions that, when executed by the processor, cause the server to:

identify a node corresponding to a location of an entity in the network graph data structure storing a network of nodes and edges between the network of nodes, the network graph data structure digitally representing types of relationships between locations of entities represented by the network of nodes and networked items, the network of nodes comprising pairs of nodes each including a source node connected with a destination node by an edge data structure indicating a particular networked item transferred from the source node to the destination node;

identify a matrix encoded in a computer-readable array format identifying a plurality of network operations between the location of the entity and one or more other locations of entities represented in the network graph data structure, data for each of the plurality of network operations in the matrix identifying quantities of inputs and outputs of a network operation for a networked item;

identify, using the matrix encoded in the computer-readable array format, a plurality of input nodes connected by edge data structures with the node corresponding to the location of the entity and providing inputs for the network operation for the networked item;

for each of the plurality of input nodes, generate a weight for each of one or more attributes of one or more technologies used by a supplier of the input node used to generate the networked item based on the quantities of the inputs provided by the supplier for the network operation;

execute a model using as input the weights for the plurality of input nodes and the matrix to generate an emission intensity for each input of each supplier of a plurality of suppliers used to generate the networked item;

calculate an emission of the networked item based at least on the emission intensities of the inputs of the plurality of suppliers; and responsive to the emission of the networked item at the location of the entity exceeding a threshold, write a flag to an input node of the plurality of input nodes of the network graph data structure based on a relative aggregate emission of inputs provided by a supplier of the input node to the location of the entity.

2. The system of claim 1, wherein the server is further configured to:

store attributes including geographic coordinates, production type, technology identifiers, network operation records, and input-output relationships in association with corresponding nodes by edge data structures connecting the attributes with the corresponding nodes; and query the edge data structures to retrieve supplier attributes of the plurality of input nodes to use as input into the model to generate the emission intensity.

3. The system of claim 1, wherein the server is further configured to:

retrieve entity identifiers for each of the plurality of input nodes from attributes written into the plurality of input nodes;

query an external database using the entity identifiers to retrieve a technology type identifier for each of the plurality of input nodes; and use the retrieved technology type identifiers as input into the model with the weights and the matrix to generate the emission intensity for each input of each supplier of the plurality of suppliers.

4. The system of claim 1, wherein the server is further configured to:

retrieve entity identifiers for each of the plurality of input nodes from attributes written into the plurality of input nodes;

query an external database using the entity identifiers to retrieve an entity emission intensity value for each of the plurality of input nodes; and use the retrieved entity emission intensity values as input into the model with the weights and the matrix to generate the emission intensity for each input of each supplier of the plurality of suppliers.

5. The system of claim 1, wherein the server is further configured to:

identify, for an input node of the plurality of input nodes containing empty data fields regarding technologies used to generate networked items; and responsive to an identification of the empty data fields, match observed inputs and outputs of edges connecting the input node to another node in the network graph data structure in a reference process-technology graph to infer the technologies used at a location of the input node and associate the inferred technologies with the input node by writing the inferred technologies into the empty data fields.

6. The system of claim 1, wherein the server is further configured to:

train a machine learning model using facility attributes and weighted supplier emissions as features, and using measured emission intensities from an external database as labels; and execute the trained model to predict emission intensity for an input node lacking direct measured emissions data.

7. The system of claim 1, wherein the server is further configured to:

identify one or more input nodes in the network graph data structure that store technology characteristic data for the entity of each of the one or more input nodes;

match the one or more input nodes to identifications of corresponding entities in a database stored on a remote computing device, the database storing real-time emission data for individual entities;

correlate technology characteristic data with real-time emission data based on the matches between the one or more input nodes of the network graph data structure and the identifications of the corresponding entities in the database; and train a computer model to generate emission values for entities based on the correlated technology characteristic data.

8. The system of claim 1, wherein the server is further configured to:

determine, for an unobserved input to an input node, a most granular geographic region for which a corresponding technology and emissions factor is available in an external database; and assign the unobserved input an emission intensity based on an average domestic grid-level emissions of the determined region.

9. The system of claim 1, wherein the server is further configured to:

compute transfer distances between pairs of source and destination nodes using geospatial coordinates and recorded network operation modes; and determine transfer-related emissions by multiplying the computed transfer distances by mode-specific emissions factors and network operation weight obtained from network operation records.

10. The system of claim 1, wherein the server is further configured to:

identify multiple entities that provide a single input to the entity using edges between nodes representing the multiple entities and the entity;

determine quantities of input to the node based on data stored in data structures of the edges;

weight technological characteristics of the node based on the quantities of the inputs corresponding to the technological characteristics of the entity;

encode network operations performed between the multiple entities and the entity into a technology matrix according to the weights of the technological characteristics corresponding to the inputs of the network operations;

generate an average embedded emission intensity for the multiple entities by using a function on the technology matrix; and provide the average embedded emission intensity into the model with the weights and the matrix to generate the emission intensity for each input of each supplier of the plurality of suppliers.

11. The system of claim 1, wherein the server is further configured to:

responsive to the emission of the networked item at the location of the entity exceeding the threshold, write a flag to an output node of the networked item connected with the node.

12. A method, comprising:

identifying a node corresponding to a location of an entity in a network graph data structure;

identifying a matrix encoded in a computer-readable array format, identifying a network operation between the location of the entity and one or more other locations of entities represented in the network graph data structure, data for the network operation in the matrix;

identifying quantities of inputs and outputs of the network operation for a networked item; identifying, using the matrix encoded in the computer-readable array format, a plurality of input nodes connected by edge data structures with the node corresponding to the location of the entity and providing inputs for the network operation for the networked item;

for each of the plurality of input nodes, generating a weight for each of one or more attributes of one or more technologies used by a supplier of the input node used to generate the networked item based on the quantities of the inputs provided by the supplier for the network operation;

executing a model using as input the weights for the plurality of input nodes and the matrix to generate an emission intensity for each input of each supplier of a plurality of suppliers used to generate the networked item;

and calculating an emission of the networked item based at least on the emission intensities of the inputs of the plurality of suppliers.

13. The method of claim 12, further comprising:

storing attributes including geographic coordinates, production type, technology identifiers, network operation records, and input-output relationships in association with corresponding nodes by edge data structures connecting the attributes with the corresponding nodes; and querying the edge data structures to retrieve supplier attributes of the plurality of input nodes to use as input into the model to generate the emission intensity.

14. The method of claim 12, further comprising:

retrieving entity identifiers for each of the plurality of input nodes from attributes written into the plurality of input nodes;

querying an external database using the entity identifiers to retrieve a technology type identifier for each of the plurality of input nodes; and using the retrieved technology type identifiers as input into the model with the weights and the matrix to generate the emission intensity for each input of each supplier of the plurality of suppliers.

15. The method of claim 12, further comprising:

retrieving entity identifiers for each of the plurality of input nodes from attributes written into the plurality of input nodes;

querying an external database using the entity identifiers to retrieve an entity emission intensity value for each of the plurality of input nodes; and using the retrieved entity emission intensity values as input into the model with the weights and the matrix to generate the emission intensity for each input of each supplier of the plurality of suppliers.

16. The method of claim 12, further comprising:

identifying, for an input node of the plurality of input nodes containing empty data fields regarding technologies used to generate networked items; and responsive to the identifying the empty data fields, matching observed inputs and outputs of edges connecting the input node to another node in the network graph data structure in a reference process-technology graph to infer the technologies used at a location of the input node and associating the inferred technologies with the input node by writing the inferred technologies into the empty data fields.

17. The method of claim 12, further comprising:

training a machine learning model using facility attributes and weighted supplier emissions as features, and using measured emission intensities from an external database as labels; and executing the trained model to predict emission intensity for an input node lacking direct measured emissions data.

18. The method of claim 12, further comprising:

identifying one or more input nodes in the network graph data structure that store technology characteristic data for the entity of each of the one or more input nodes;

matching the one or more input nodes to identifications of corresponding entities in a database stored on a remote computing device, the database storing real-time emission data for individual entities;

correlating technology characteristic data with real-time emission data based on the matches between the one or more input nodes of the network graph data structure and the identifications of the corresponding entities in the database; and training a computer model to generate emission values for entities based on the correlated technology characteristic data.

19. One or more non-transitory computer-readable media storing instructions thereon that, when executed by one or more processors, cause the one or more processors to:

identify a node corresponding to a location of an entity in a network graph data structure;

identify a matrix encoded in a computer-readable array format, identifying a network operation between the location of the entity and one or more other locations of entities represented in the network graph data structure, data for the network operation in the matrix identifying quantities of inputs and outputs of the network operation for a networked item; identify, using the matrix encoded in the computer-readable array format, a plurality of input nodes connected by edge data structures with the node corresponding to the location of the entity and providing inputs for the network operation for the networked item;

for each of the plurality of input nodes, generate a weight for each of one or more attributes of one or more technologies used by a supplier of the input node used to generate the networked item based on the quantities of the inputs provided by the supplier for the network operation;

execute a model using as input the weights for the plurality of input nodes and the matrix to generate an emission intensity for each input of each supplier of a plurality of suppliers used to generate the networked item;

and calculate an emission of the networked item based at least on the emission intensities of the inputs of the plurality of suppliers.

20. The one or more non-transitory computer-readable media of claim 19, wherein the instructions further cause the one or more processors to:

responsive to the emission of the networked item at the location of the entity exceeding a threshold, write a flag to an input node of the plurality of input nodes of the network graph data structure based on a relative aggregate emission of inputs provided by a supplier of the input node to the location of the entity.

* * * * *